(12) United States Patent
Mizutani et al.

(10) Patent No.: US 6,714,989 B1
(45) Date of Patent: *Mar. 30, 2004

(54) ATM CONTROLLER AND ATM COMMUNICATION CONTROL DEVICE

(75) Inventors: Mika Mizutani, Tokyo (JP); Tatsuya Yokoyama, Sagamihara (JP); Eizou Hashi, Sagamihara (JP); Osamu Takada, Sagamihara (JP); Yoshiki Watanabe, Kanagawa-ken (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/350,892

(22) Filed: Jul. 12, 1999

Related U.S. Application Data

(63) Continuation of application No. 08/775,022, filed on Dec. 27, 1996, now Pat. No. 5,974,466.

(30) Foreign Application Priority Data

Dec. 28, 1995 (JP) .............................. 7-342199
Jan. 26, 1996 (JP) .............................. 8-12054

(51) Int. Cl.$^7$ .......................... G06F 15/16; H04L 12/00
(52) U.S. Cl. .......................... 709/250; 710/52; 370/419
(58) Field of Search .............................. 709/212, 234, 709/236, 250; 370/395, 419, 465, 466, 473, 389, 391, 392, 412, 413, 395.01, 395.5, 395.3, 229, 230, 231, 236; 710/300, 52

(56) References Cited

U.S. PATENT DOCUMENTS

| | | | |
|---|---|---|---|
| 5,381,413 A | | 1/1995 | Tobagi et al. |
| 5,528,587 A | | 6/1996 | Galand et al. |
| 5,579,302 A | | 11/1996 | Banks |
| 5,604,743 A | * | 2/1997 | Le Guigner et al. ........ 370/392 |
| 5,606,559 A | | 2/1997 | Badger et al. |
| 5,625,625 A | * | 4/1997 | Oskouy et al. ............. 370/474 |
| 5,664,116 A | * | 9/1997 | Gaytan et al. ............. 709/234 |
| 5,666,293 A | | 9/1997 | Metz et al. |
| 5,668,809 A | * | 9/1997 | Rostoker et al. ........... 370/392 |
| 5,682,553 A | * | 10/1997 | Osborne ..................... 370/473 |
| 5,699,532 A | | 12/1997 | Barrett et al. |
| 5,717,691 A | | 2/1998 | Dighe et al. |
| 5,745,684 A | * | 4/1998 | Oskouy et al. ............. 709/250 |
| 5,751,951 A | * | 5/1998 | Osborne et al. ........... 709/250 |
| 5,793,953 A | * | 8/1998 | Yeung et al. .............. 709/250 |
| 6,026,443 A | * | 2/2000 | Oskouy et al. ............. 709/230 |

OTHER PUBLICATIONS

"IDT Advance Information, Segmentation & Reassembly "SAR" Controller for the PCI Local Bus", Integrated Device Technology, Inc., Aug. 1994, pp. 1–11.

"LSIs for ATM–LAN uPD98401/uPD98402", NEC Technical Report, vol. 47, No. 7/1994, S. Kawanaka, pp. 33–39.

(List continued on next page.)

Primary Examiner—Marc D. Thompson
(74) Attorney, Agent, or Firm—Mattingly, Stanger & Malur, P.C.

(57) ABSTRACT

There is provided an ATM controller which can support setting or alteration of protocol processing, and more greatly reduce the load (overhead) of software processing. The ATM controller performs the processing of an ATM layer and an AAL layer between a terminal and an ATM network, and comprises cell transmit control means for transferring a packet from a terminal side to an ATM network side while segmenting the packet into data cells, cell reception control means for reassembling data cells received from the ATM network side into a packet and transferring the packet to the terminal side, a rewritable memory for storing a firmware, and a microprocessor for performing a cell analysis and the processing corresponding to the analysis result.

5 Claims, 48 Drawing Sheets

OTHER PUBLICATIONS

"LSI Logic Corp. Introduces LSI for ATM LAN with R3000 Core", Nikkei Electronics, Apr. 11, 1994, pp. 17–18.

"SARA Chipset Technical Manual", Preliminary, Tran-Switch Corporation, Edition 2, Nov. 1992, pp. 2–4 to 2–8, and 4–15 to 4–17.

NEC Technical Journal, vol. 47, No. 7, Aug. 25, 1994, pp. 33–40.

Kawango et al, "LSIs for ATM–LAN uPD98401/uPD98402".

IEICE Technical Report, SSE91–125, vol. 91, No. 455, Jan. 30, 1992.

T. Yokoyama, "Performance Evaluation of a High–Speed Protocol Processor with Special Purpose Hardware".

* cited by examiner

FIG.5
DATA CELL 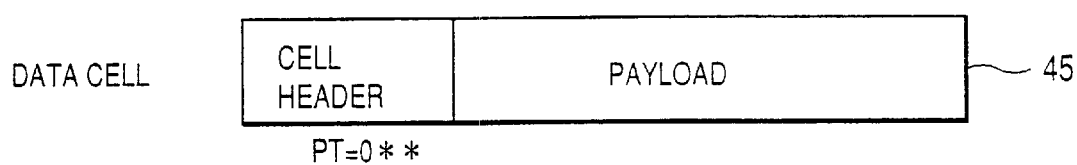
PT=0**
OAM(F5) CELL 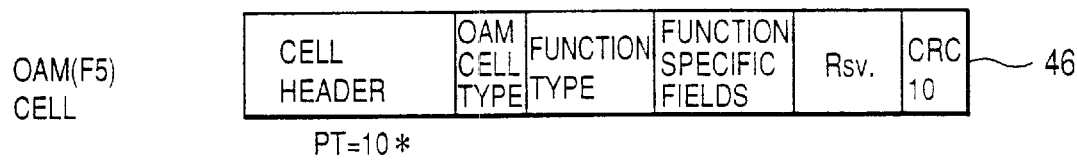
PT=10*
RM CELL 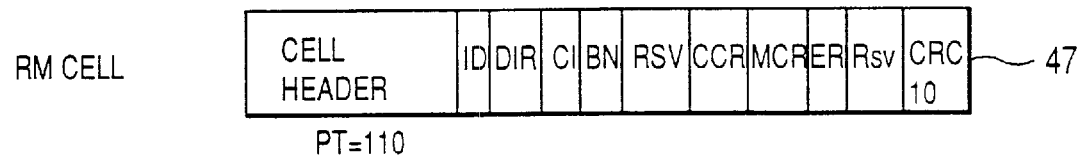
PT=110

FIG. 7

| FUNCTION | | | MPU | WIRED LOGIC |
|---|---|---|---|---|
| TRANSMIT PROCESSING | RECEPTION OF TRANSMIT REQUEST FROM TERMINAL | | ○ | |
| | PREPARATION OF CPCS TRAILER | CRC-32 | | ○ |
| | | OTHER THEN CRC-32 | ○ | |
| | DATA CELL TRANSMIT PROCESSING | CELL SEGMENTATION PROCESSING | | ○ |
| | | CELL TRANSMIT PROCESSING | | ○ |
| | MANAGEMENT CELL (OAM, RM CELL) TRANSMIT PROCESSING | CELL PREPARATION PROCESSING | ○ | |
| | | CELL TRANSMIT PROCESSING | | ○ |
| RECEPTION PROCESSING | DATA CELL RECEIVE PROCESSING | CELL HEADER ANALYSIS | | ○ |
| | | CELL REASSEMBLY ANALYSIS | | ○ |
| | MANAGEMENT CELL (OAM, RM CELL) RECEPTION PROCESSING | CELL HEADER ANALYSIS | | ○ |
| | | CELL RECEPTION PROCESSING | ○ | |
| | ANALYSIS OF CPCS TRAILER | CRC-32 | | ○ |
| | | OTHER THAN CRC-32 | ○ | |
| | PROCESSING WHEN CONGESTION IS DETECTED | | ○ | |
| | RECEPTION NOTIFICATION TO TERMINAL | | ○ | |

RANDOM SCHEDULING PROCESSING OF SCHEDULER

SCHEDULING PROCESSING WITH PRIORITY RANK IN SCHEDULER

PROCESSING UNDER USE OF RATE TABLE BY FIRMWARE

FIG.41
RESTART TRANSMISSION SYSTEM
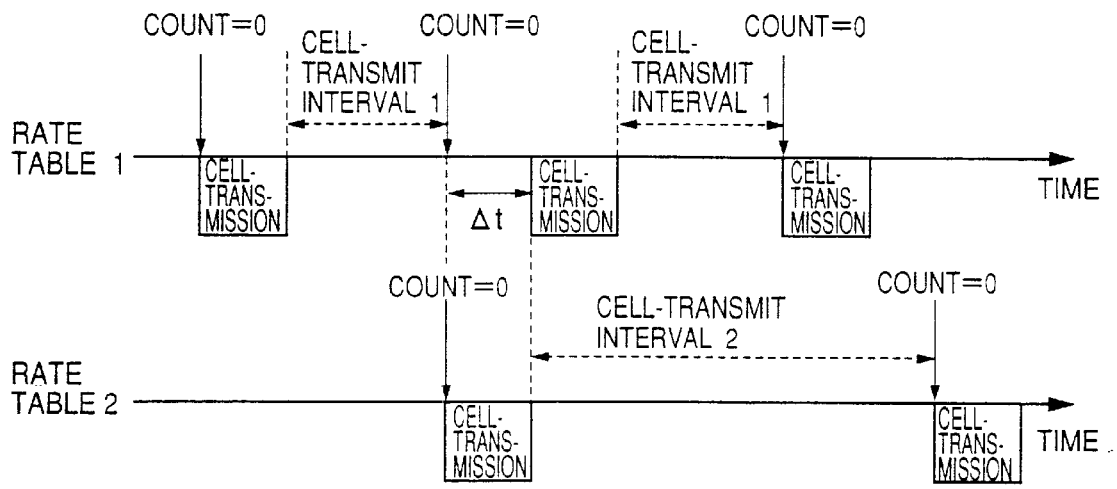
FREE RUN SYSTEM
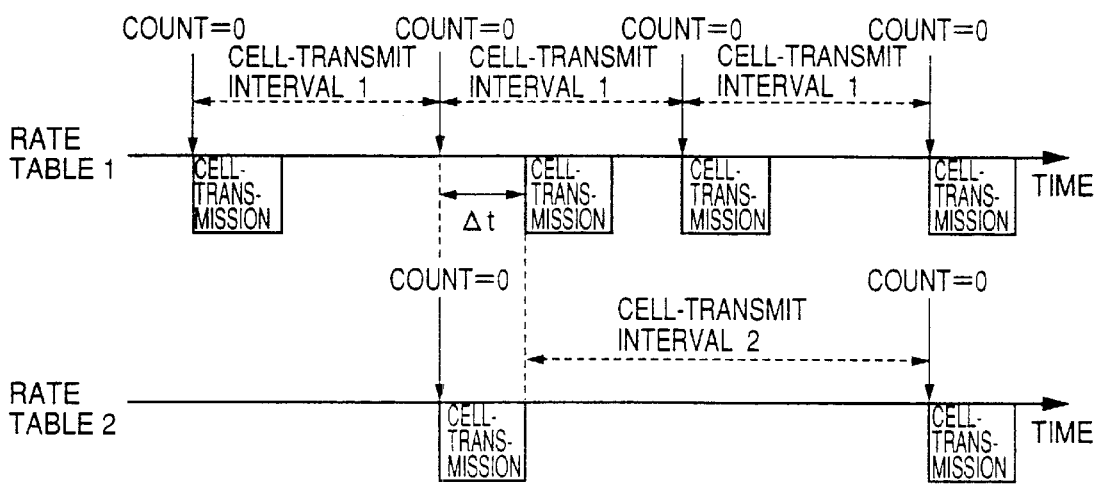

PROCESSING OF RATE SET PROCESSOR

RATE VALUE TRANSFER PROCESSING OF TRANSMIT CELL DMAC

FIG. 46

EXAMPLE OF TRAFFIC MANAGEMENT TABLE 1802

| SERVICE CATEGORY | CURRENT RATE | CONTINUOUS TRANSMIT CELL NUMBER | TRAFFIC MANAGEMENT PARAMETER ||||| |
|---|---|---|---|---|---|---|---|
| | | | PCR | SCR | ACR | MCR | BURST TOLERANCE |
| CBR | PCR1 | — | PCR1 | — | — | — | — |
| VBR | PCR2 | cell-no2 | PCR2 | SCR2 | — | — | burst2 |
| ABR | ACR | — | PCR3 | — | ACR3 | MCR3 | — |
| VBR | 0 | cell-no4 | PCR4 | SCR4 | — | — | burst4 |
| | | | | | | | |
| | | | ⋮ | ⋮ | ⋮ | ⋮ | ⋮ |

1804  1806  1808  1810

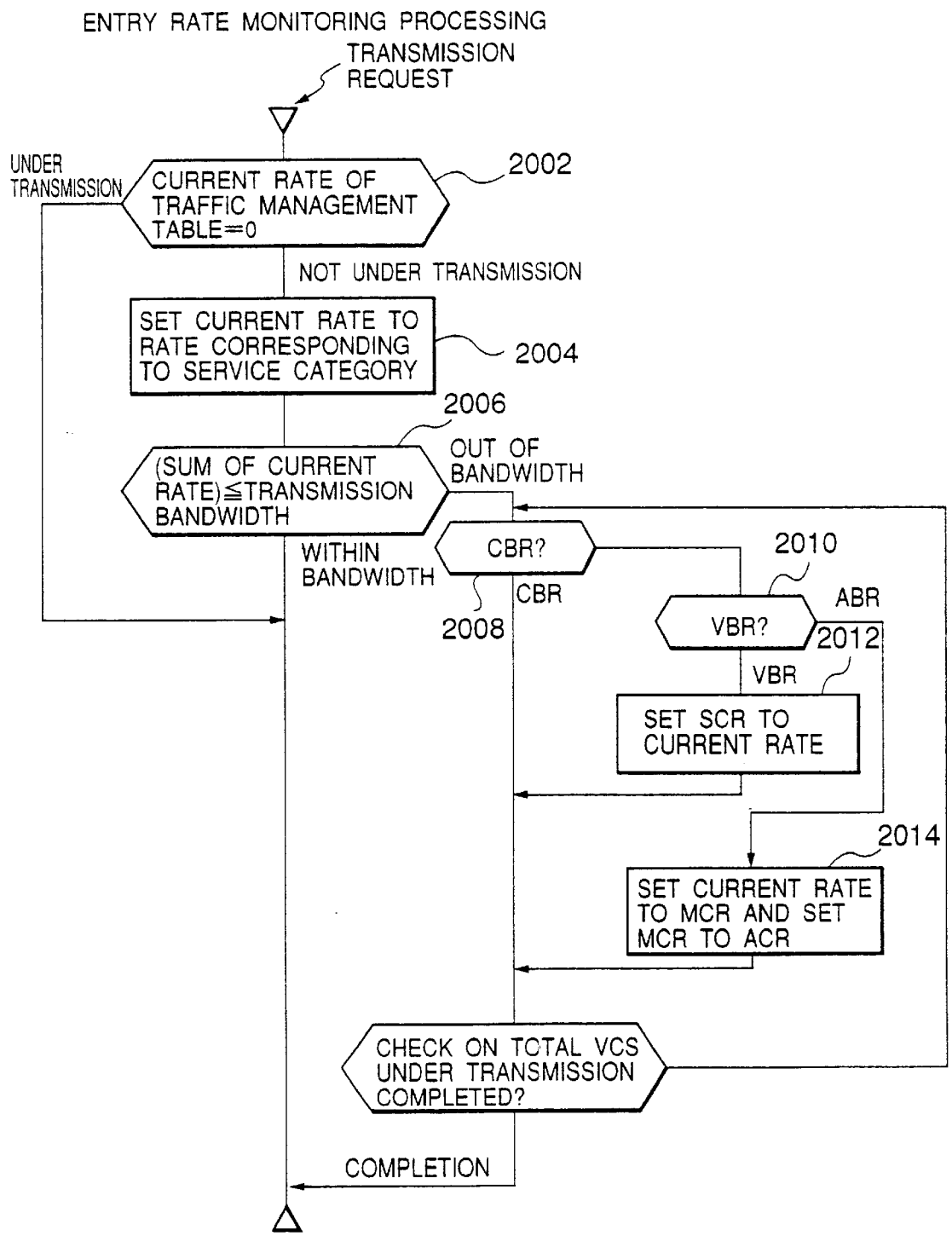

ATM CONTROLLER AND ATM COMMUNICATION CONTROL DEVICE

This is a continuation application of U.S. Ser. No. 08/775,022, filed Dec. 27, 1996, now U.S. Pat. No. 5,974,466.

BACKGROUND OF THE INVENTION

1. Field of the Invention

The present invention relates to an ATM (Asynchronous Transfer Mode) communication control device for performing the processing of a subordinate (lower layer) portion of an ATM protocol between a terminal and an ATM network, and an ATM controller which shares the processing in the device.

2. Description of Related Art

In an ATM network, communication is performed according to an ATM protocol between an ATM communication control device and plural terminals which are connected to the ATM communication control device through lines. The ATM communication control device serves to share various kinds of processing of a subordinate (lower layer) portion of the ATM protocol to divide a variable-length packet generated at a terminal into fixed-length cells and then transmit the fixed-length cells to a line, and also serves to generate a packet on the basis of cells received through a line and deliver the packet thus generated to a terminal. The ATM protocol is being standardized by an ATM forum on the basis of the recommendation of the ITU (International Telecommunication Union).

There has been hitherto proposed an ATM controller which realizes, by an LSI, ATM layer processing for performing cell transmitting and receiving control and AAL (ATM Adaptational Layer) processing for performing call segmentation and reassembly (both kinds of processing are hereinafter referred to as "ATM protocol processing") of the processing of the ATM communication control device. For example, In "µPD98401" described in NEC Technical Report (Vol. 47, NO. 7/1994), the ATM protocol processing is achieved by a wired logic whose processing procedure is fixed. According to this technique, the processing speed can be increased, however, the processing content cannot be altered. The ATM protocol contains some kinds of processing which have not yet been standardized, for example, processing for cells of a management system such as OAM (Operation Administration and Maintenance) cells, RM (Resource Management) cells used to protect the network and the end system from congesting, etc. Therefore, the ATM controller is preferably designed to support the alteration of these non-standardized processing.

"ATMizer" as described in Nikkel Electronics (Apr. 11, 1994, No. 605, pp.17–18) is known as an ATM controller which is designed to support the alteration of the processing. This controller contains a microprocessor therein, and it achieves most of the ATM protocol processing containing an analysis work of a cell header, a cell segmentation/reassembly work, etc. by software processing. However, since the software processing needs a lot of overheads, this controller is equipped with a microprocessor having high performance and large scale, and the microprocessor is operated at high speed.

As described above, since the conventional ATM controller needs a microprocessor having high performance and large scale, a fine process technology is required in a manufacturing process, and thus the manufacturing cost thereof is high. Further, since the microprocessor must be operated at high speed, power consumption is also increased.

Nevertheless, at the setting time of a virtual connection (VC) which can be uniquely identified by VPI (Virtual Path Identifier)/VCI (Virtual Channel Identifier) in the ATM, QS (Quality of Service) indicating, for example, how degree the cell delay variation is permitted (i.e., the maximum level of the permitted cell delay variation) In accordance with the type of traffic to be transferred on the virtual connection, and a cell rate can be required to the network and the end system. Actually, a category (class) to be used at the setting time of the VC is selected from four ATM service categories (CBR (Constant Bit Rate):fixed rate service, VBR (Variable Bit Rate): variable rate service, ABR (Available Bit Rate): service for varying the rate in accordance with the congestion of the network, UBR (Unspecified Bit Rate): unspecified and non-guaranteed service) which are defined as functions of the ATM layer, and a cell rate (transmission rate) is requested.

The ATM controller which is necessary to connect to ATM-I AN is required to individually transmit each cell every VC in accordance with a service category declared at the VC setting (signaling) time and at a transmission rate declared at the VC setting time.

The following two methods are known to perform a traffic shaping function which is supported by the existing ATM controller. According to one method, four rate queues are prepared in conformity to two priorities in a hardware, a peak rate is specified in conformity to the rate queue and plural VCs registered in the rate queue are accessed at the specified rate by a round robin system to transmit cells. According to another method, a table in which the order of VCs to transmit the cells is registered is prepared in advance on the basis of the cell rate of the whole VCs, and the table is accessed every fixed period in a hardware to transmit the cell corresponding to the registered VC.

An SARA chip produced by TransSwitch company is known as an ATM controller having the former traffic shaping function, and an ATM SAR chip (IDT77201) produced by Integrated Device Technology company is known as an ATM controller having the latter traffic shaping function.

However, in such a conventional device, in order to perform the transmit traffic control corresponding to a service category and a cell rate which are declared in conformity to a VC and also defined in the ATM protocol, it is needed to consider the cell rate in conformity to the VC by a driver of the ATM controller, and also it is needed to reconsider the schedule of the whole cell rate when a VC is set.

For example, as well known in the prior arts as described above, a table is required to be beforehand prepared for allotment of a peak rate to a rate queue and a schedule.

In general, in a network card for connection to ATM-LAN, the design is made so that no local processor for the driver of the ATM controller is mounted, so that in order to reduce the cost the traffic management corresponding to the VC must be performed in a CPU at the terminal side.

SUMMARY OF THE PRESENT INVENTION

An object of the present invention is to provide an ATM controller and an ATM communication control device which can support the setting or alteration of the protocol processing, and reduce the load (overhead) of firmware processing.

Another object of the present invention is to provide an ATM controller and an ATM communication control device which flexibly support a traffic control which meets various service categories and cell rates which are defined in an ATM layer in the ATM controller.

Another object of the present invention is to an ATM controller and an ATM communication control device which perform a traffic shaping function meeting a cell rate declared in conformity to a VC by a hardware circuit and a firmware (MPU).

Another object of the present invention is to provide an ATM controller and an ATM communication control device which monitor a total traffic amount so as to prevent communication from congesting.

In order to attain the above objects, according to one aspect of the present invention, it is provided that an ATM controller which is connected to an external buffer memory and performs the processing of an ATM layer and an AAL layer of an ATM protocol between a cable and a terminal, includes transfer means for transmitting packet data between the terminal and the buffer memory, cell transmit control means for dividing the packet data from the terminal into data cells and transferring the divided data cells to an ATM network side, payload type judging means for checking a cell header received from the ATM network side to judge whether a cell concerned is a data cell, cell receiver control means for reassembling the data cell identified on the basis of the judgment result of the payload type judging means to generate packet data, and storing the generated packet data into the buffer memory, a program memory for storing and holding a firmware, and a microprocessor for analyzing cells other than the data cell identified on the basis of the judgment result and performing the processing corresponding to the analysis result in accordance with the firmware.

The ATM controller according to the present invention can support the setting or alteration of the ATM protocol processing which is allotted to the microprocessor by rewriting the firmware. Further, it is unnecessary for the microprocessor to identify the type of the cell (type of payload) and also to perform segmentation and reassembly of data cells, so that the firmware processing loads can be reduced.

Further, according to a second aspect of the present invention, an ATM communication control device for performing the processing of an ATM layer, an AAL layer and a PHY (Physical Layer Protocol) of an ATM protocol between a cable and a terminal, includes the mentioned ATM controller, a buffer memory which is connected to the ATM controller, a PHY controller for performing the processing of the PHY layer between the ATM controller and the cable, and a crystal oscillator for driving the PHY controller, the ATM controller being constructed by one chip LSI.

According to another aspect of the present invention, it is provided an ATM controller comprising, an interface circuit to a terminal, an interface circuit to a buffer memory for storing a cell and packet data to be communicated, an interface circuit to a PHY controller for connecting the ATM controller to ATM-LAN, a first data transfer means for transferring packet data between a memory of the terminal and the buffer memory, a second data transfer means for segmenting packet data in the buffer memory into cells and transmitting the cells, a third data transfer means for reassembling received cells into packet data on the buffer memory, an MPU, a memory for storing a firmware executed by the MPU, and a hardware circuit comprising a plurality of transmit managing means each provided for a virtual connection on which cells are communicated, for outputting a cell-transmit request when a time elapsed after a cell transmission on the virtual connection meets a time interval based on a cell rate preliminarily indicated for the virtual connection, and scheduling means for arbitrating transmitted cell-transmit requests and instructing the second data transfer means to transmit cells of the virtual connection corresponding to the cell-transmit request selected upon an arbitration.

The scheduling means may further arbitrate cell transmit requests from the MPU executing the firmware.

Preferably, each transmit managing means has means for changing a time interval for the corresponding virtual connection every time when a plurality of cell transmit requests are output through the corresponding virtual connection.

The ATM controller wherein the service categories may include at least one of the service categories in which a plurality of cell rates are set, and the ATM controller further preferably includes means for switching a cell rate for a virtual connection corresponding to a service category to another cell rate among said a plurality of cell rates in accordance with a total traffic amount in a communication on the total virtual connections, so as to prevent the communication from congesting.

The cell transmit controller has means for altering the cell rate every transmission of plural cells, and cell periodical transferring means.

In the cell transmit controller, the traffic shaping function corresponding to plural VCs can be performed. Further, the cell transmit rate can be altered every transmission of plural cells. A cell-transmit interval managing method may be selected from the cell transmission performed at a fixed period and the cell transmission performed in a fixed time from the completion time of the cell transmission.

Furthermore, the traffic shaping function for plural VCs can be performed both in the cell transmit controller and in the firmware executed in the MPU at the same time. The processing which is to be performed by the cell transmit controller and the firmware can be divided by cell types (payload types) such as a data cell and a management cell, or by a VC basis, for example, for which a high cell rate is declared and a low cell rate is declared.

The firmware which is executed in the MPU can calculate the cell-transmit interval which is matched to each VC and perform the transmit management of the management cell by merely declaring a parameter of a service type defined in the ATM protocol and a cell rate for each VC.

Furthermore, by monitoring the total cell rate during transmission is monitored, the cell rate can be reduced in accordance with the service category every VC when the total cell rate exceeds the transmission bandwidth of the cable.

BRIEF DESCRIPTION OF THE DRAWINGS

FIG. 5 is a diagram showing the construction of each of kinds of ATM cell;

FIG. 7 is a table showing a function sharing table of an MPU and a wired logic;

FIG. 41 is a management system of a cell transmit time in the cell transmit controller;

FIG. 46 is a diagram showing an example of the construction of a transfer traffic control table;

FIG. 48 is a flowchart showing the whole rate monitoring processing in the firmware executed by the MPU.

DETAILED DESCRIPTION OF THE PREFERRED EMBODIMENTS

Preferred embodiments according to the present invention will be described with reference to the accompanying drawings.

FIRST EMBODIMENT

Figure 2:
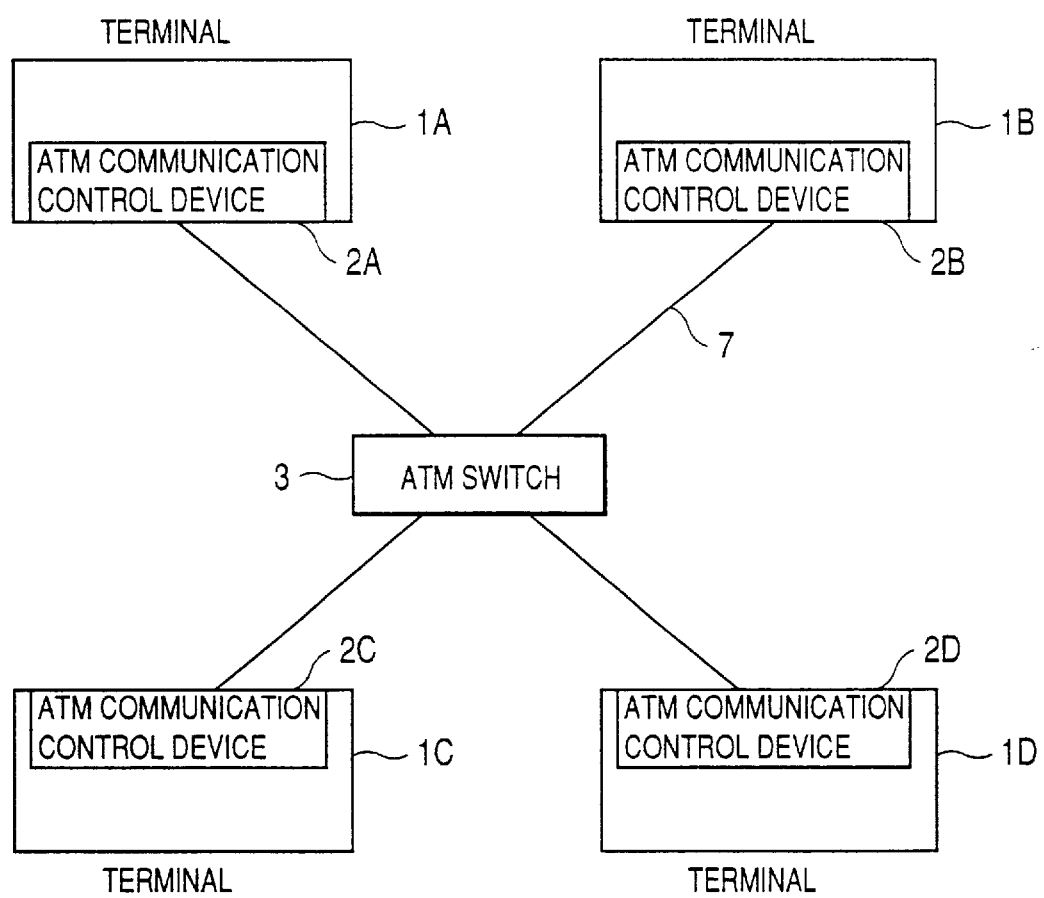
FIG. 2 is a diagram showing the construction of a network system to which the ATM communication control device of the present invention is applied.
Figure 3:
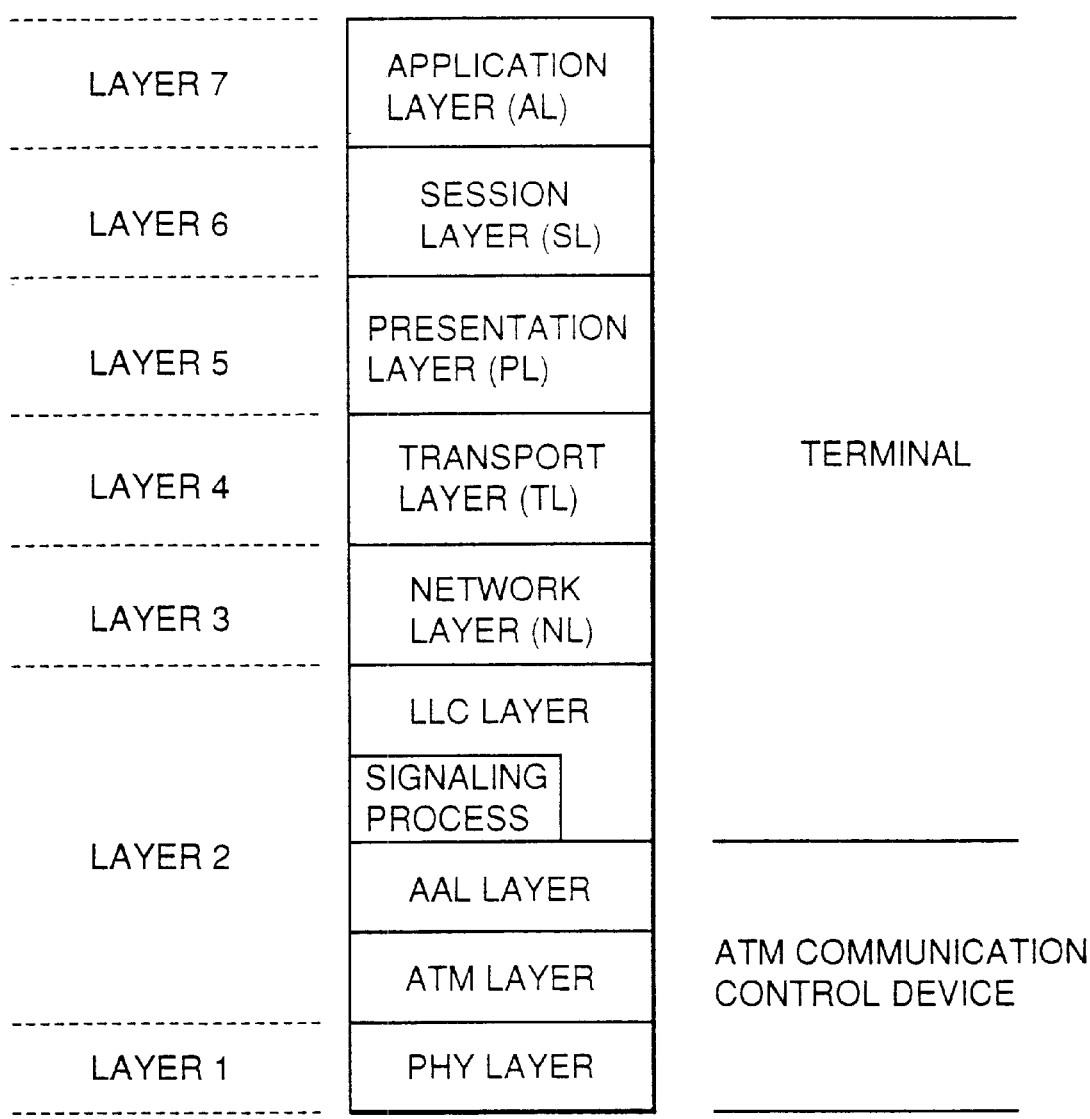
FIG. 3 is a diagram showing a hierarchical structure of a communication protocol layer.

FIG. 2 is a diagram showing the construction of a communication network system to which an ATM communication control device according to a first embodiment of the present invention is applied. In FIG. 2, each of terminals 1 (1A–1D) (this term is defined more broadly than usually used) is connected to an ATM switch 3 through the corresponding ATM communication control device 2 (2A–2D) and a cable 7. FIG. 3 is a diagram showing a layer structure of an ATM communication protocol and a function sharing structure of the terminal 1 and the ATM communication control device 2. As shown in FIG. 3, the processing of lower layers which contain an AAL layer for performing the segmentation and reassembly of cells and lower layers subsequent thereto is charged by the ATM communication control device 2, and the processing of upper layers which contain an LLC (Logical Link Controller) layer containing the signaling processing for establishing an ATM connection is charged by the terminal 1.

Figure 1:
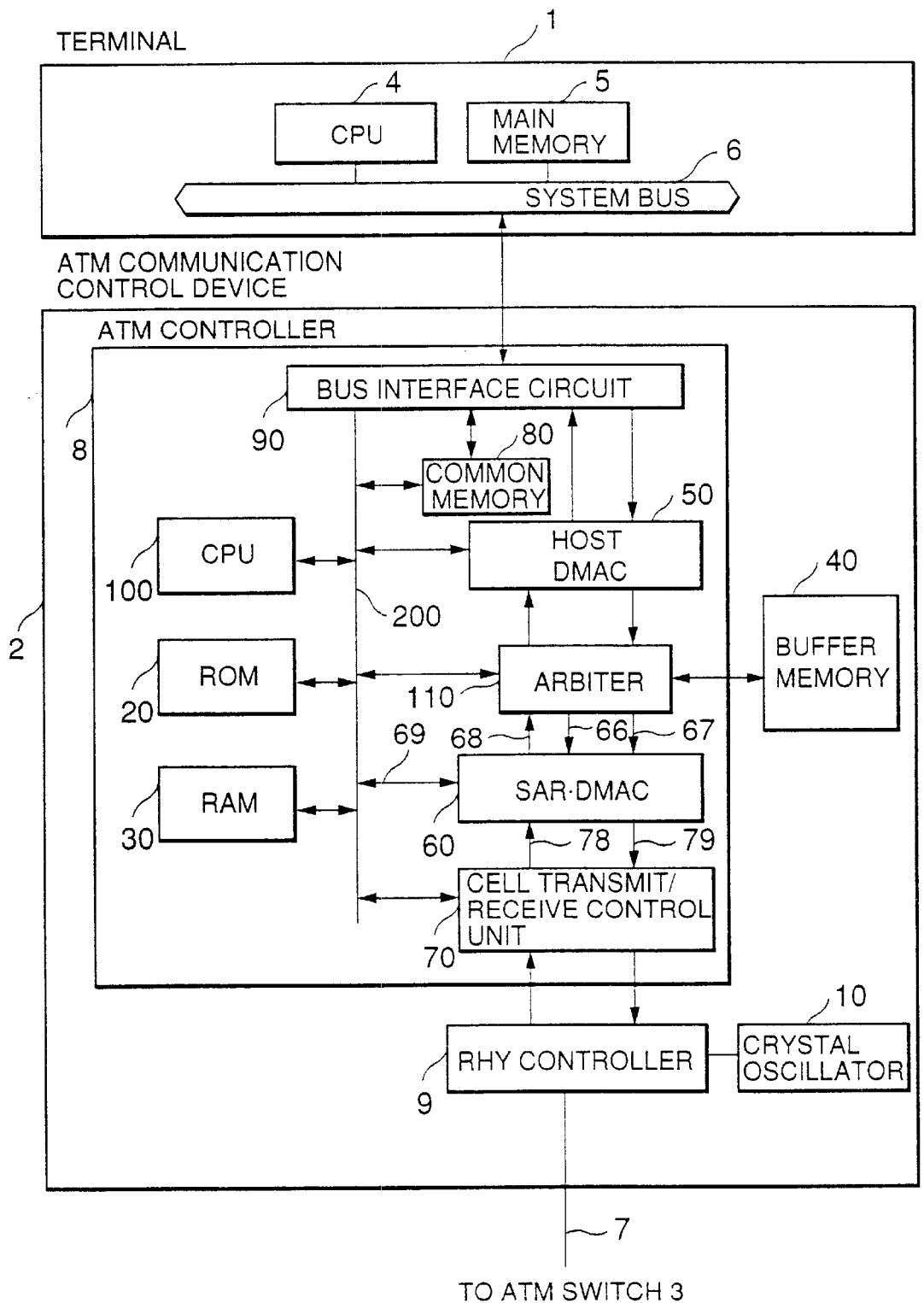
FIG. 1 is a block diagram showing an ATM communication control device and an ATM controller according to the present invention.

FIG. 1 is a block diagram showing an example of the construction of the ATM communication control device 2.

In FIG. 1, the terminal 1 contains various communication elements such as a CPU 4, a main memory 5, a bus 6 connecting these elements to each other, etc. The ATM communication control device 2 is connected to the bus 6, and it is constructed by an ATM controller 8 for performing cell segmentation and reassemble processing, a PHY controller 9 for performing a transfer control of cells to the cable 7, a buffer memory 40 for storing cells to be transmitted and received and information required for the cell segmentation and reassembly, and a crystal oscillator 10 for driving the PHY controller 9.

The ATM controller 8 includes a bus interface circuit 90 for connecting to the bus 6 of the terminal 1, a HOST·DMAC 50 for performing packet transfer between the main memory 5 and the buffer memory 40, an SAR·DMAC 60 for performing the cell segmentation and reassembly on the buffer memory 40, a cell transmit/receive control unit 70 for generating and analyzing cells, an MPU 100, a rewritable ROM 20 for storing a firmware of the MPU 100, a RAM 30 serving as a work memory of the MPU 100, an arbiter 110 for reconciling the access of each of the HOST·DMAC 50, the SAR·DMAC 60, a common memory 80 for sending and receiving control information between the CPU 4 and the MPU 100 and the MPU 100 to the buffer memory 40, a common memory 80 for transmitting and receiving control information between the CPU 4 and the MPU 100, and an internal bus 200 for connecting the elements in the controller to one another. The firmware stored in the ROM 20 can be rewritten through the bus interface circuit 90 and the internal bus 200 by the CPU 4. The ATM controller 8 contains a crystal oscillator (not shown), and each element of the controller is operated on the basis of the clocks of the oscillator.

Figure 4:
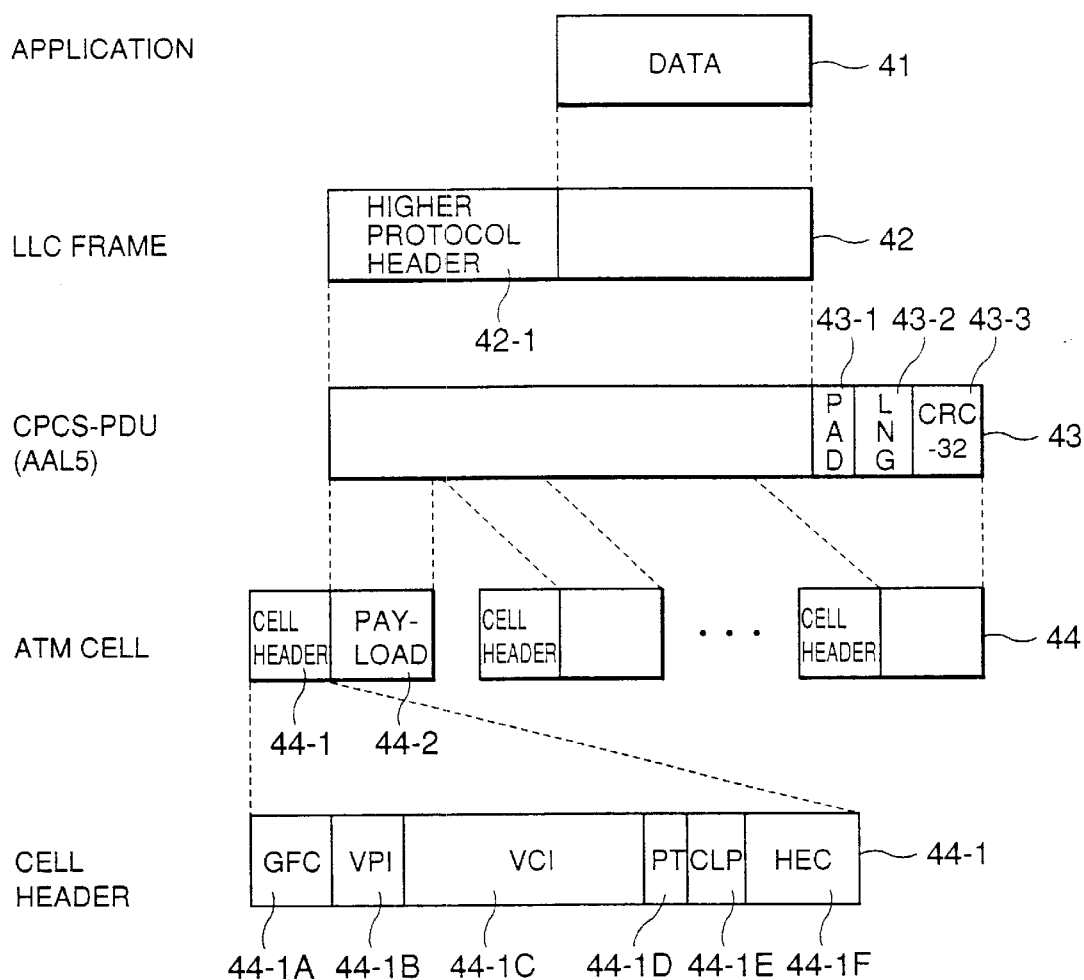
FIG. 4 is a diagram showing the format of a frame flowing in a network.

FIG. 4 is a diagram showing the format of an ATM cell transmitted through the cable 7. In FIG. 4, the terminal 1 adds variable-length data 41 to be transmitted with a higher (superordinate) protocol header 42-1 which is obtained through the processing of the LLC (Logical Link Control) layer and the other upper layers so as to generate an LLC frame 42. In the ATM communication control device 2, the LLC frame 42 is added with a CPCS trailer comprising a PAD field 43-1, an LNG field 43-2 and a CRC-32 field 43-3 in the processing of the AAL layer (AAL5) to generate a CPCS-PDU (Protocol Data Unit) 43. Further, in the processing of the ATM layer, the CPCS-PDU 43 is divided into 48-byte data pieces 44-2 (hereinafter referred to as "payload"), and then a cell header 44-1 is added to each of the payloads 44-2 thus obtained to obtain cells 44. Each cell thus generated is subjected to the processing of the PHY layer and then transmitted onto the cable 7. On the other hand, received cells are reassembled into an LLC frame according to the processing flow advancing backward of that described above. Here, the cell header 44-1 is constructed by a GFC (General Flow Control) field 44-1A used for a flow control, etc., a VPI (Virtual Path Identifier) field 44-1B serving as an identifier (index) for ATM connection, a VCI (Virtual Channel Identifier) field 44-1C, a PT field 44-1D indicating the payload type (containing an indication of the final call of a packet), a CLP (Cell Loss Priority) field 44-1E indicating priority of cell to be thinned out, and an HEC (Header Error Control) field 44-1F serving as error detection information for the cell header 44-1.

FIG. 5 is a diagram showing the format of the payload of a cell on a payload (call type) basis. In FIG. 5, the cell is classified into a data cell 45 for carrying payload (user data), an OAM (Operation Administration and Maintenance) cell used for maintenance/service of a network, and a RM (Resource Management) cell 47 used for controlling the cell rate of the data cell. These types are identified by the PT field 44-ID in the call header 44-1.

Figure 6:
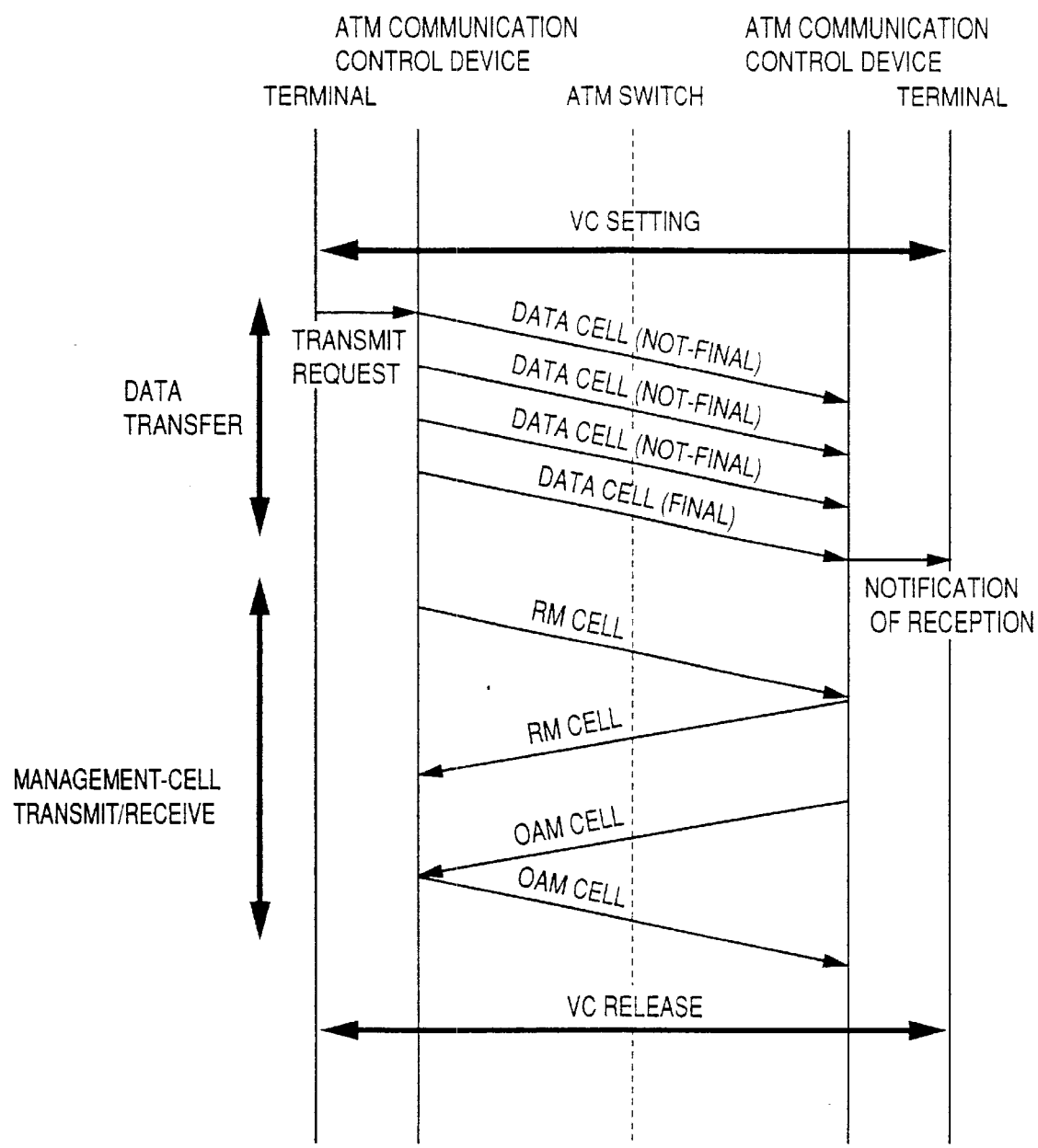
FIG. 6 is a diagram showing a communication sequence of the ATM protocol.

FIG. 6 shows an example of a cell transmit/receive sequence concerning the ATM communication control device. The terminal 1 first sets an ATM connection (hereinafter referred to as "VC (Virtual Connection)") with another terminal 1 which is a communication target. The setting and release of the VC is executed by the signaling processing of the terminal 1. A packet transmitted from the terminal 1 is divided into cells in the ATM communication control device 2, and then transmitted to the cable 7. In the ATM communication control device 2 at the reception side, the received cells are reassembled into a packet, and then transferred to the terminal 1. In addition to the transfer operation of the data cell, the ATM communication control device 2 transmits/receives management cells such as OAM cells and RM cells to/from another ATM communication control device 2 and ATM switch 3. After the cell transmission, the VC is released and the communication is ended.

FIG. 7 is a table showing an example of the function sharing status of the ATM protocol processing in the ATM controller 8.

As shown in FIG. 7, in the ATM communication control device 2, the processing which is performed by the MPU 100 is limited to those kinds of processing for which the alteration of the processing content is more greatly required, such as the management-cell generating/analysis processing, the interface processing with the terminal 1 which occurs on a CPCS-PDU basis, etc. On the other hand, those kinds of processing for which the increase of a processing speed is more preferably required to the alteration of the processing content, such as the calculation of CRC (Cyclic Redundancy Check), the segmentation and reassembly of the cell, etc., are processed by the wired logic. As described above, by dividing the various kinds of processing between the MPU 100 and the wired logic as described above, the processing load of the MPU 100 is reduced.

Figure 8:
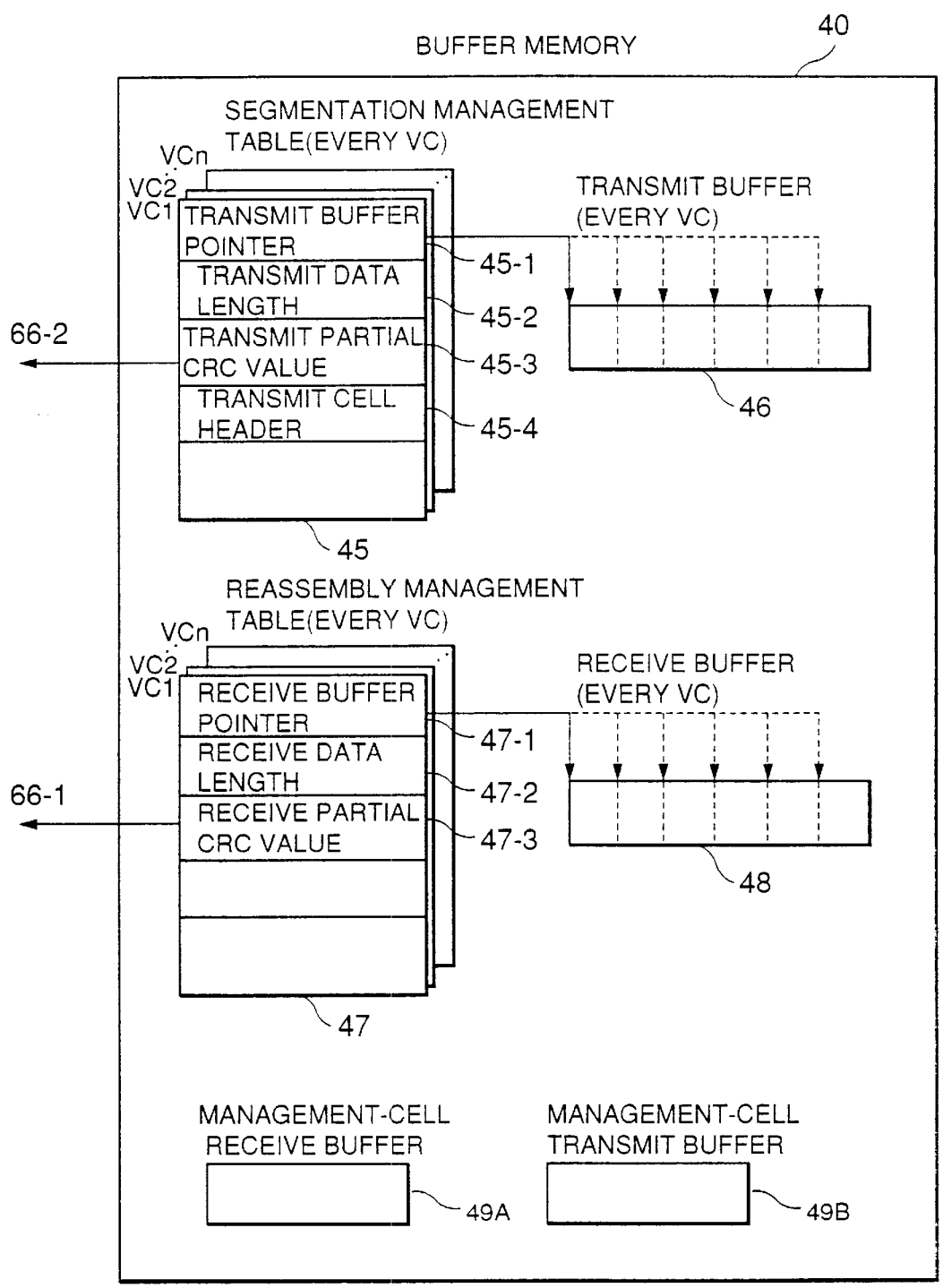
FIG. 8 is a diagram showing a table defined in a buffer memory.

FIG. 8 is a diagram showing the construction of a table defined in the buffer memory 40.

In FIG. 8, in the buffer memory 40, a segmentation management table 45 for holding management information which is used in the cell segmentation (transmission) processing by the SAR·DMAC 60, a reassemble management table 47 for holding management information which is used in the cell reassemble (receive) processing by the SAR·DMAC 60, a transmit buffer 48 for storing CPCS-PDU which is a transmit target, a receive buffer 48 for storing received CPCS-PDU thus reassembled, a receive buffer 49A for management cells, and a transmit buffer 49B for management cells are set. These tables and the buffers are provided every VC.

The segmentation management table 45 includes a transmit buffer pointer 45-1 for storing the storage position (address) of the payload 44-1 to be transmitted in the transmit buffer 46, a transmit data length 45-2, a transmit partial CRC value 45-3 for holding the value of a CRC calculation which is altered every cell transmission, and a transmit cell header 45-4 for holding a template of the cell header 44-1 to be added to payload 44-2. The reassemble management table 47 is constructed by a receive buffer pointer 47-1 for holding the address of a cell to be next received in the receive buffer 48, a receive data length 47-2, and a receive partial CRC value 47-3 for holding the result of the CRC calculation which is renewed every time the cell is received.

Figure 9:
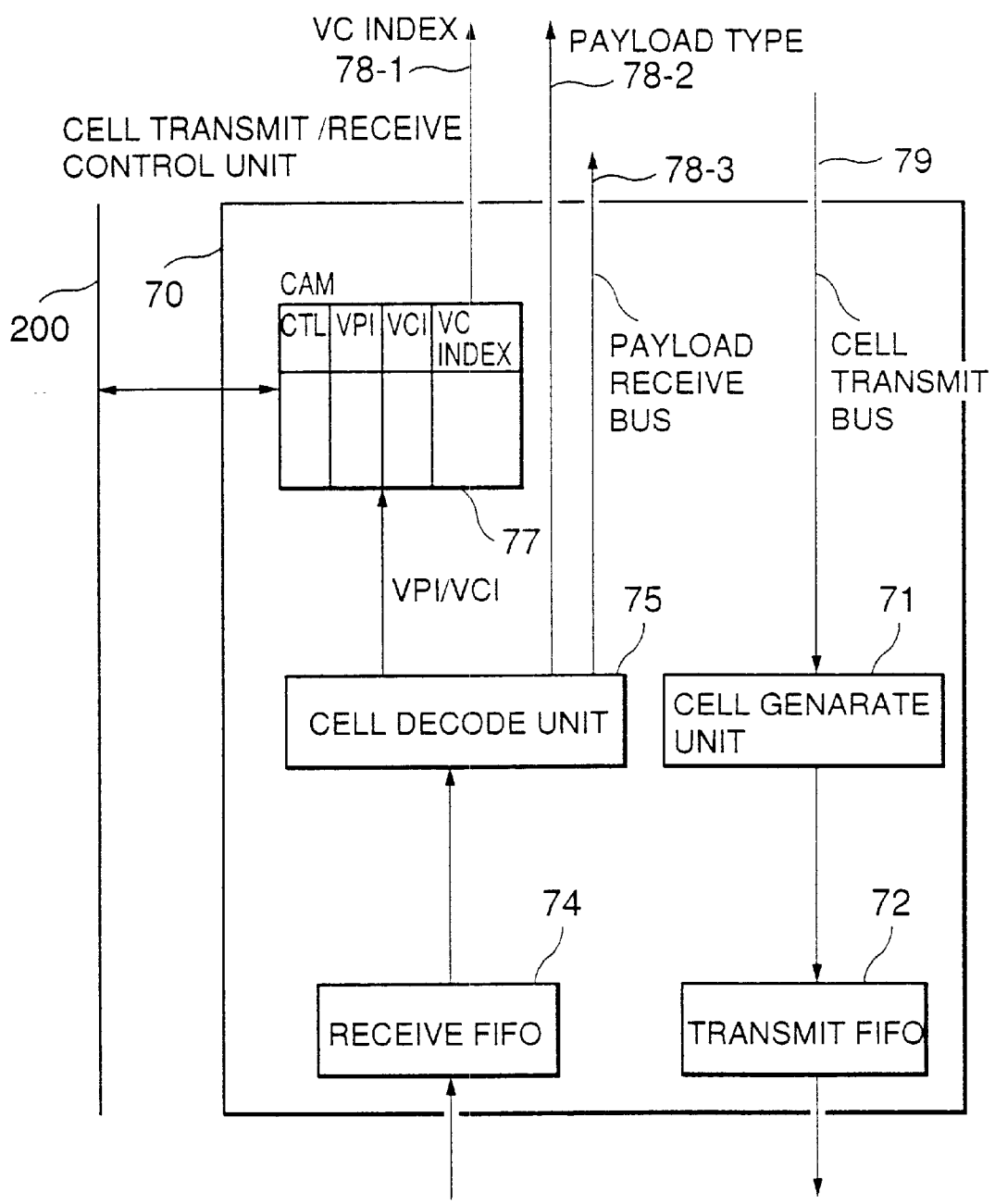
FIG. 9 is a block diagram showing the construction of a cell transmit/receive control unit.

FIG. 9 is a block diagram showing the construction of the cell transmit/receive control unit 70.

In FIG. 9, the cell transmit/receive control unit 70 includes a receive FIFO 74 for temporarily holding the received cell, a cell decode unit 75 for decoding and transferring the cell in the receive FIFO, a CAM (Contents Addressable Memory) 77 for performing conversion of path information of cells, a cell generate unit 71 for generating a transmit cell, and a transmit FIFO 72 for temporarily holding the generated transmit cell. The cell decode unit 75 transfers the payload of the cell and the PT field 44-1D (payload/cell type) in the header to the SAR·DMAC 60 and transfers the VPI field 44-1B and the VCI field 44-1C to the CAM 77. In the CAM 77, plural pairs of VPI, VCI and a VC index are registered by the MPU 100 in advance, and a pair which is coincident with VP144-1B and VC144-1C input from the cell decode unit 75 is searched to output the VC index of the coincident pair to the SAR·DMAC 60.

Figure 10:
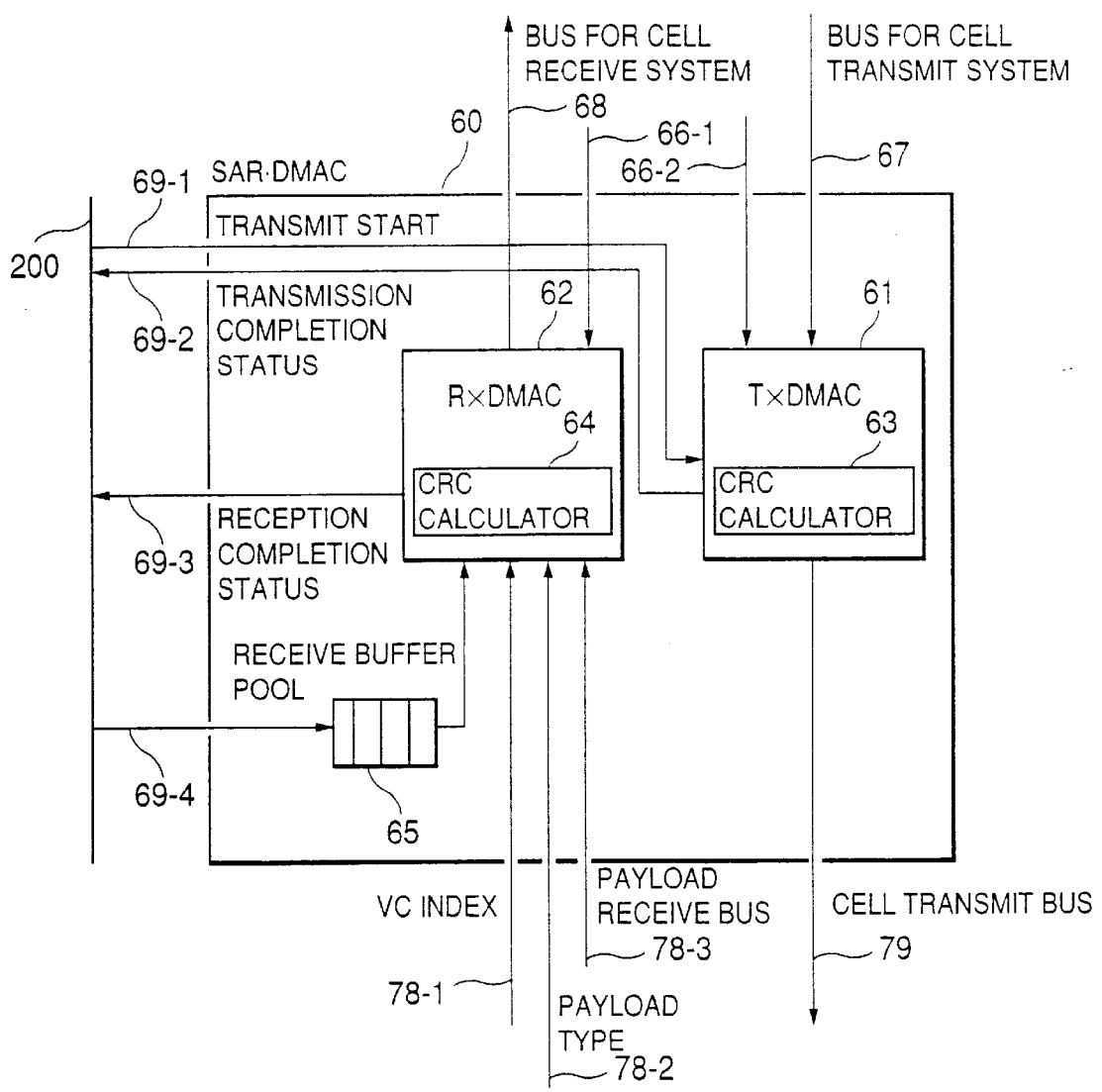
FIG. 10 is a block diagram showing the construction of SAR (Segmentation and Reassembly)·DMAC.

FIG. 10 is a block diagram showing the internal construction of the SAR·DMAC 60.

In FIG. 10, the SAR·DMAC 60 is constructed by RxDMAC 62 for receiving the information of the reassemble management table 47 through 66-1 and successively storing the received cells into the receive buffer 48. TxDMAC 61 for receiving the CPCS-PDU stored in the transmit buffer and the information of the segmentation management table 45 through 66-2 to divide the CPCS-PDU into cells and then successively transferring the cells, and a receive buffer pool 65 for holding the addresses of free buffers in plural receive buffers 48. Further, the RxDMAC 62 and the TxDMAC 61 contain therein CRC calculators 63 and 64 for performing an error detecting CRC calculation for a payload to be transferred.

Figure 11:
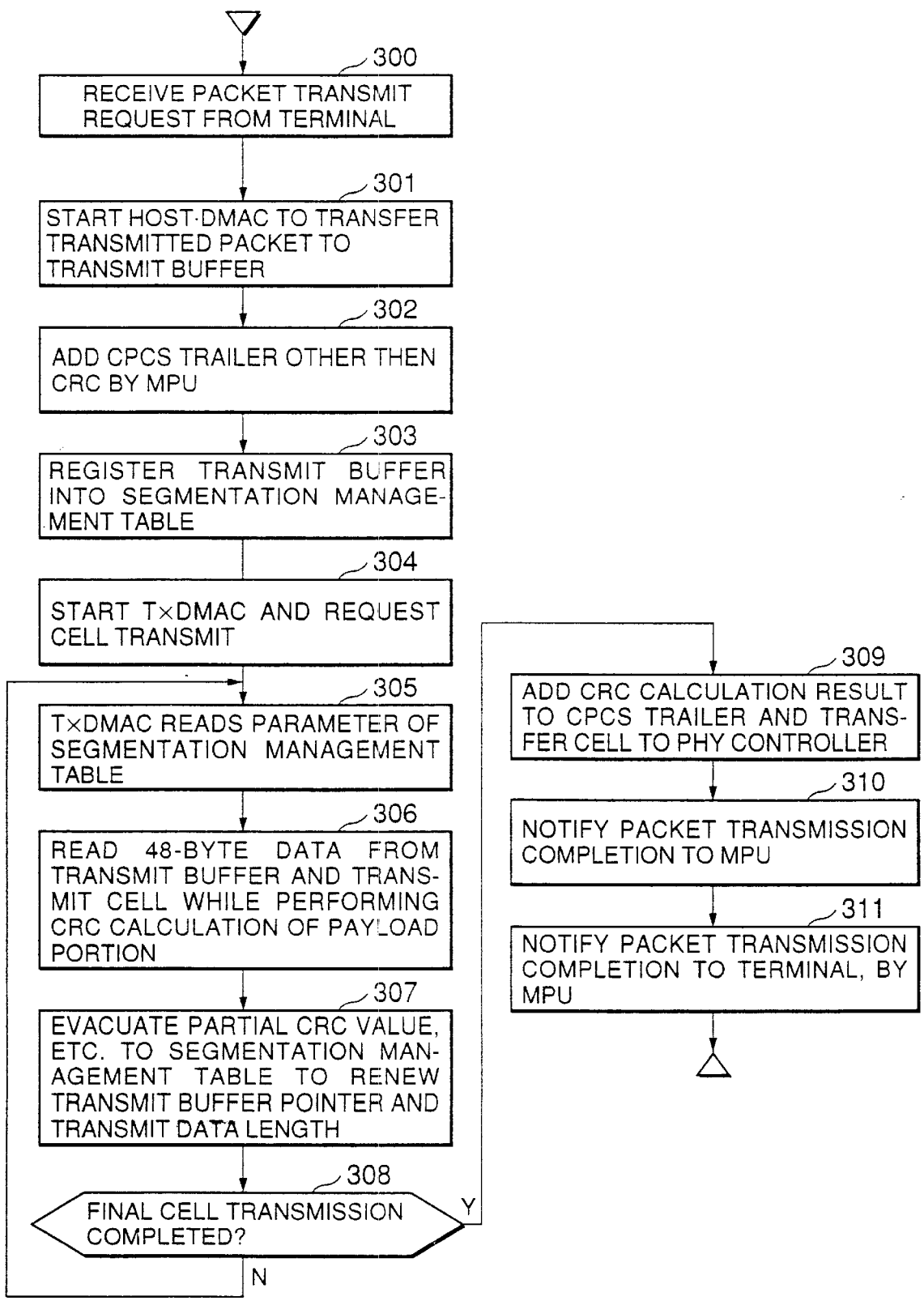
FIG. 11 is a flowchart showing a transmit processing flow of the ATM communication control device.

FIG. 11 is a flowchart showing the operation of the ATM communication control device 2 at the data transmission time.

When the MPU 100 receives a transmit request from the terminal 1 through the common memory 80 (step 300), the MPU 100 starts HOST·DMAC 50 to transfer a transmit packet (CPCS-PDU) stored in the main memory 5 to the transmit buffer 46 of the corresponding VC (301). The transmit packet (CPCS-PDU) transferred to the transmit buffer 46 is added with the CPCS trailer other than the CRC field 43-3 (302), and the head address of the transmit buffer 48, the transmit data length and the template of the cell header added to a cell to be transmitted are set in the segmentation management table 45 (303). Subsequently, the MPU 100 indicates a VC index indicating VC which is a transmit target to start TxDMAC 61, and requests the transmission of the cell (304). The TxDMAC 61 reads out the transmit buffer pointer 45-1, the transmit data length 45-2, the transmit partial CRC value 45-3 (initial value is equal to zero) and the transmit cell header 45-4 from the segmentation management table 45 corresponding to the indicated VC index (305). Next, the transmit data are read out every 48 bytes, and then added with the previously read out call header 45-4 to form a cell, the cell thus generated being thereafter transmitted (306). At this time, the CRC calculation is performed on the payload portion. After the cell transmission is completed, the result of the CRC calculation is evacuated to the segmentation management table, and the transmit buffer pointer 45-1 and the transmit data length 45-2 are renewed for a next cell transmission (307). Subsequently, the steps 305 to 307 are repeated until the transmit data length 45-2 is equal to zero (308). When the transmission of the final cell is completed, the result of the CRC calculation at that time is inserted into the CRC-32 field 43-3 of the CPCS trailer, and the CPCS-PDU is transmitted to the PHY controller 9 (309). When the transmission of CPCS-PDU is completed, the TxDMAC 61 notifies the MPU 100 of the CPCS-PDU transmit completion (310). Upon receiving this notification, the MPU 100 notifies the terminal 1 of the transmit completion (311).

Figure 12:
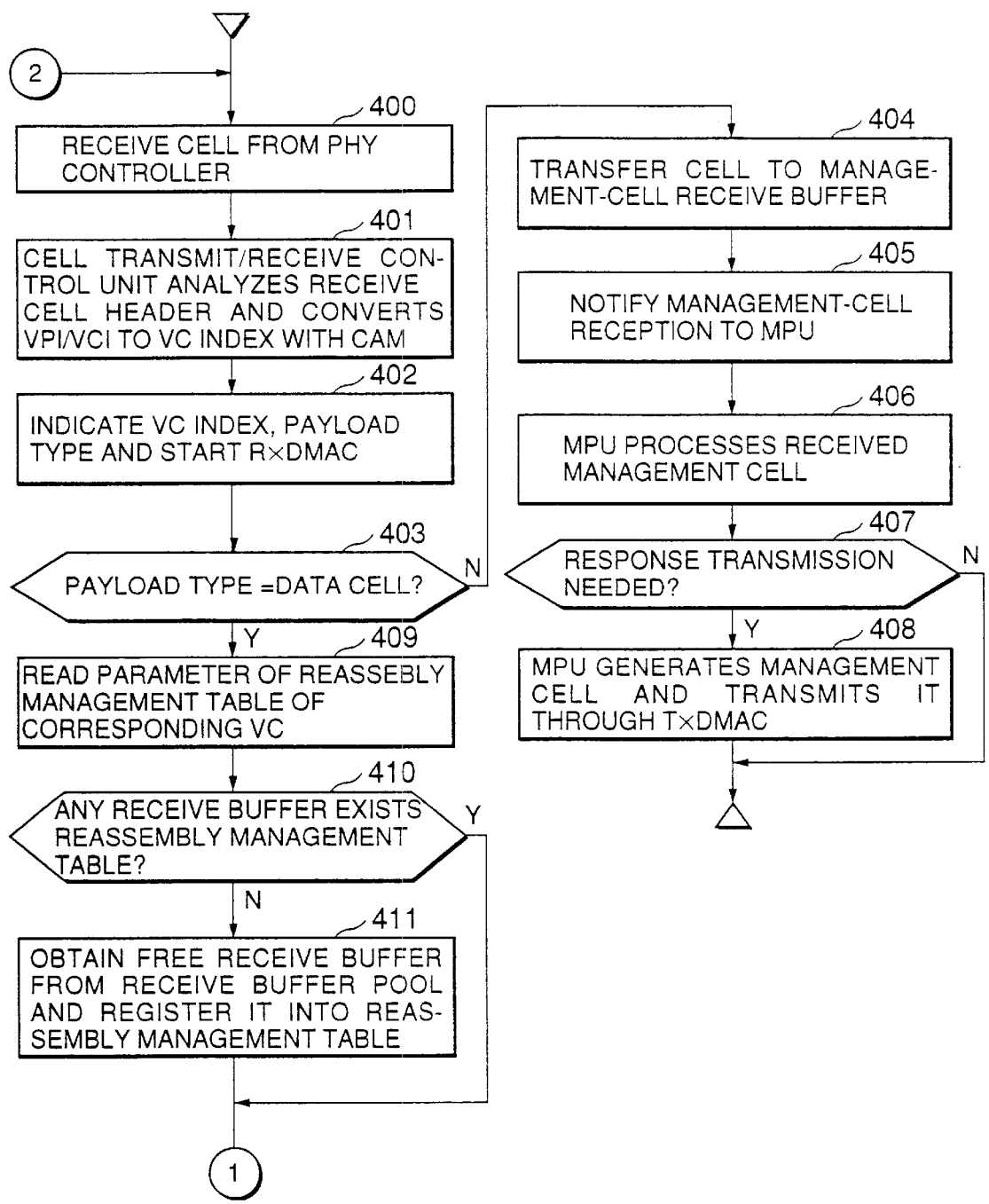
FIG. 12 is a flowchart showing a receive processing flow of the ATM communication control device.
Figure 13:
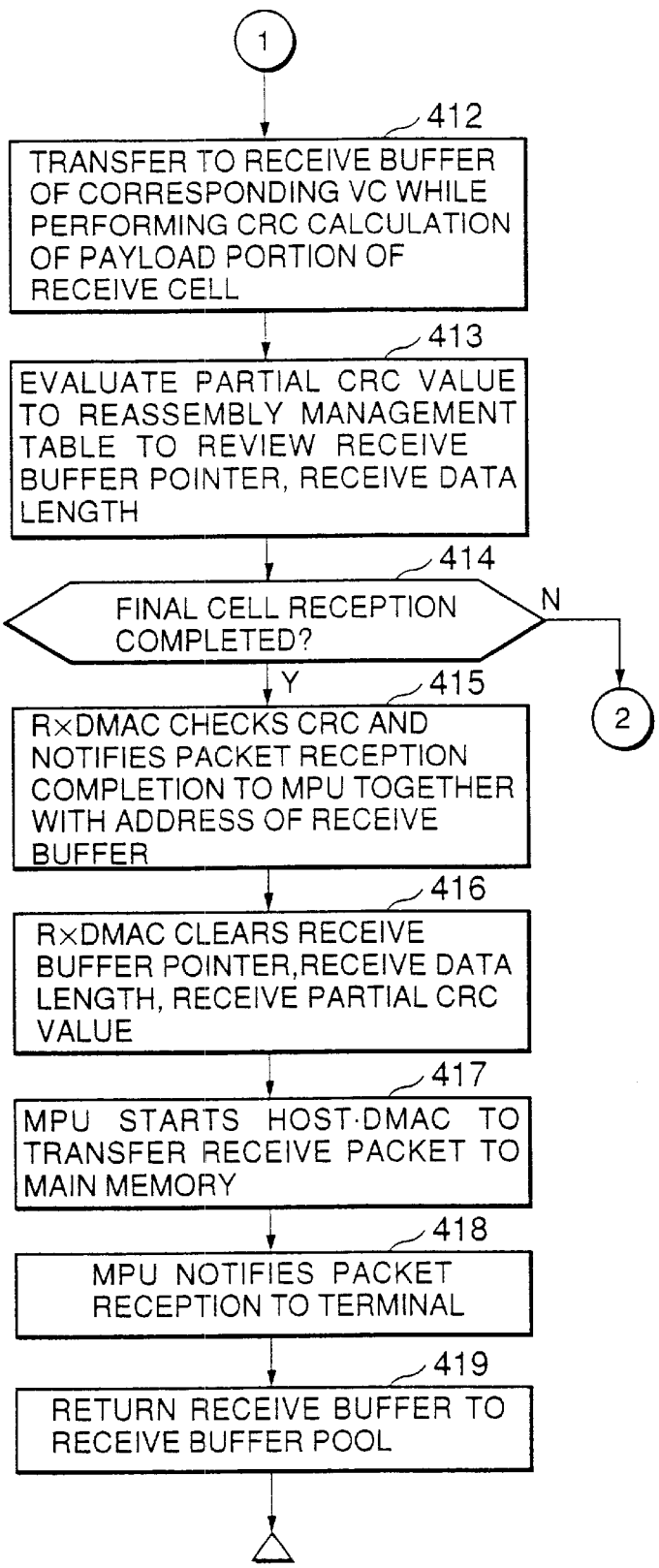
FIG. 13 is a flowchart showing a receive processing flow of the ATM communication control device.

FIGS. 12 and 13 are flowcharts showing the operation of the ATM communication control device 2 at the cell reception time.

In the cell transmit/receive control unit 70 of the ATM controller 8, when receiving a cell from the PHY controller 9 (step 400), the cell decode unit 75 analyzes the cell header of the received cell to identify the payload type 78-2, and at the same time it identifies the VC type by using the CAM 77 (401). The cell transmit/receive control unit 70 indicates the payload typo 78-2 and the VC index 78-1 to start the RxDMAC 62 (402). The RxDMAC 62 judges the payload type 78-1 (403) if the payload type 78-1 is judged not to be data cell 45, the cell is transferred to the management-cell receive buffer 49A (404), and the reception of the management cell is notified to the MPU 100 (405). When receiving the notification, the MPU 100 performs the processing corresponding to the received management cell (406). If occasion demands, the MPU 100 prepares a management cell for reply on the management-cell transmit buffer 49B, and starts the TxDMAC 61 to transmit the prepared management cell (407, 408).

In step 403, when the received cell is judged to be the data cell 45, the parameter is read out from the reassemble management table 47 corresponding to the identified VC (409). If the receive buffer 48 is not registered in the receive buffer pointer 47-1, the head address of a free receive buffer is taken out from the receive buffer pool 65 and registered in the receive buffer pointer 47-1 of the reassemble management table 47 (400, 411). The payload portion of the received cell is transferred to the address indicated by the receive buffer pointer 47-1 while performing the CRC calculation (412). When the transfer is completed, the RxDMAC 62 evacuates the CRC calculation result to the receive partial CRC value 47-3, and renews the receive buffer pointer 47-1 and the receive data length 47-2 for the next cell reception (413). Subsequently, the steps 400 to 413 are repeated until the reception of the final cell is recognized by the PT field 44-1D of the received cell header 44-1, whereby the received calls are reassembled to form the CPCS-PDU on the receive buffer 48 (414). Thereafter, when the reception of the final cell is recognized, the RxDMAC 62 checks "normality" on the basis of the CRC calculation result, and notifies the MPU 100 of the address of the receive buffer and the receive data length as packet reception completion information (415). Thereafter, the receive buffer pointer 47-1, the receive data length 47-1 and the receive partial CRC value 47-3 field are cleared for the next reception (416). When receiving the packet reception completion notification, the MPU 100 starts the HOST·DMAC 50 to transfer the CPCS-PDU (received packet) to the main memory 5 (417). After the transfer is completed, the MPU 100 notifies the terminal 1 of the reception completion of the packet through the common memory 80 (415). Finally, the MPU 100 registers again the head address of the receive buffer 48 which becomes an empty area due to the transfer, into the receive buffer pool 65 (419).

Figure 14:
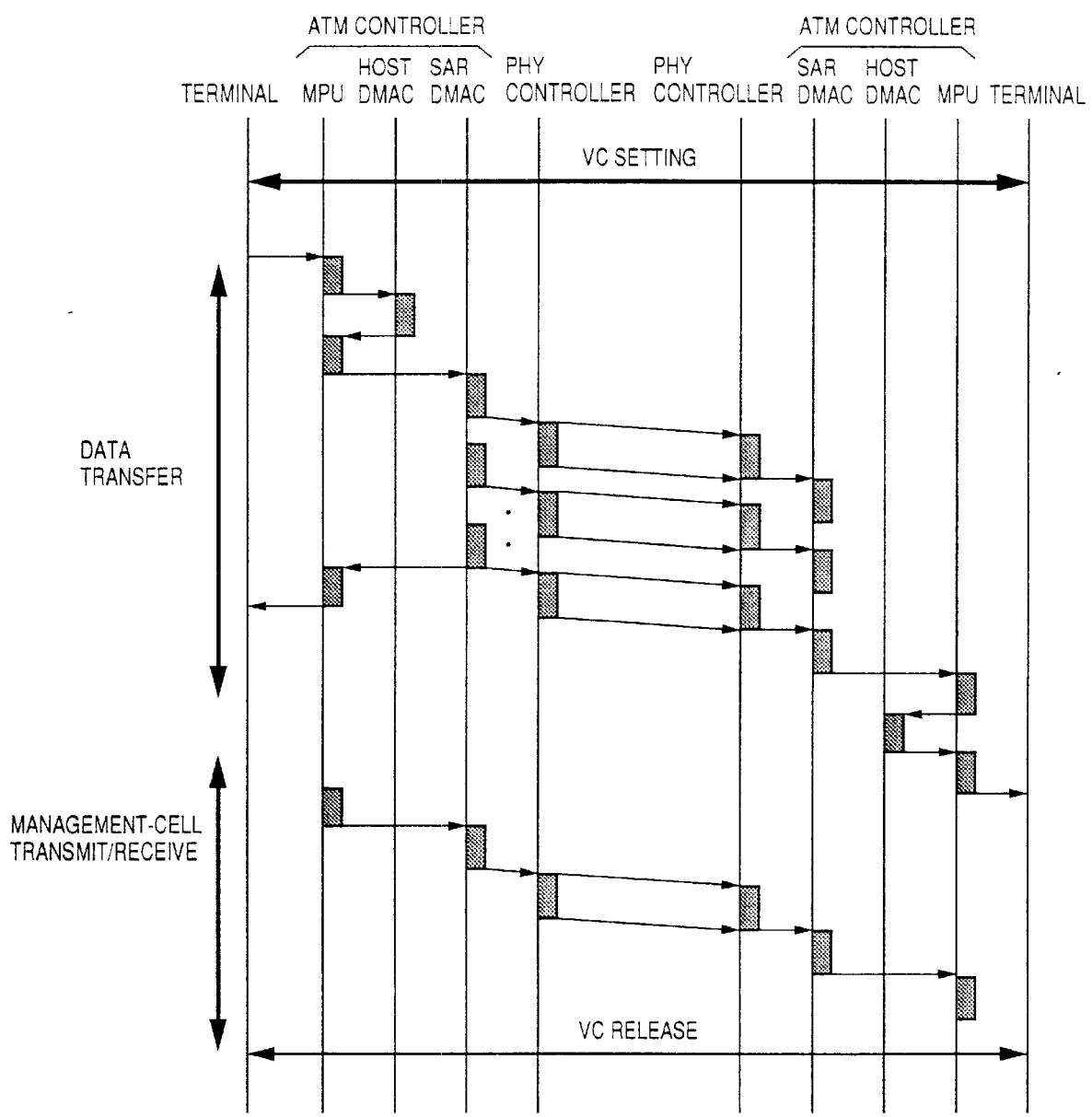
FIG. 14 is a timing chart showing the operation of the ATM communication control device.

FIG. 14 is a time chart showing the operation of the ATM communication control device 2 when the ATM protocol processing is performed according to the flowchart of FIGS. 11 to 13. FIG. 14 shows a one-way communication, however, the actual communication is performed bidirectionally.

Figure 15:
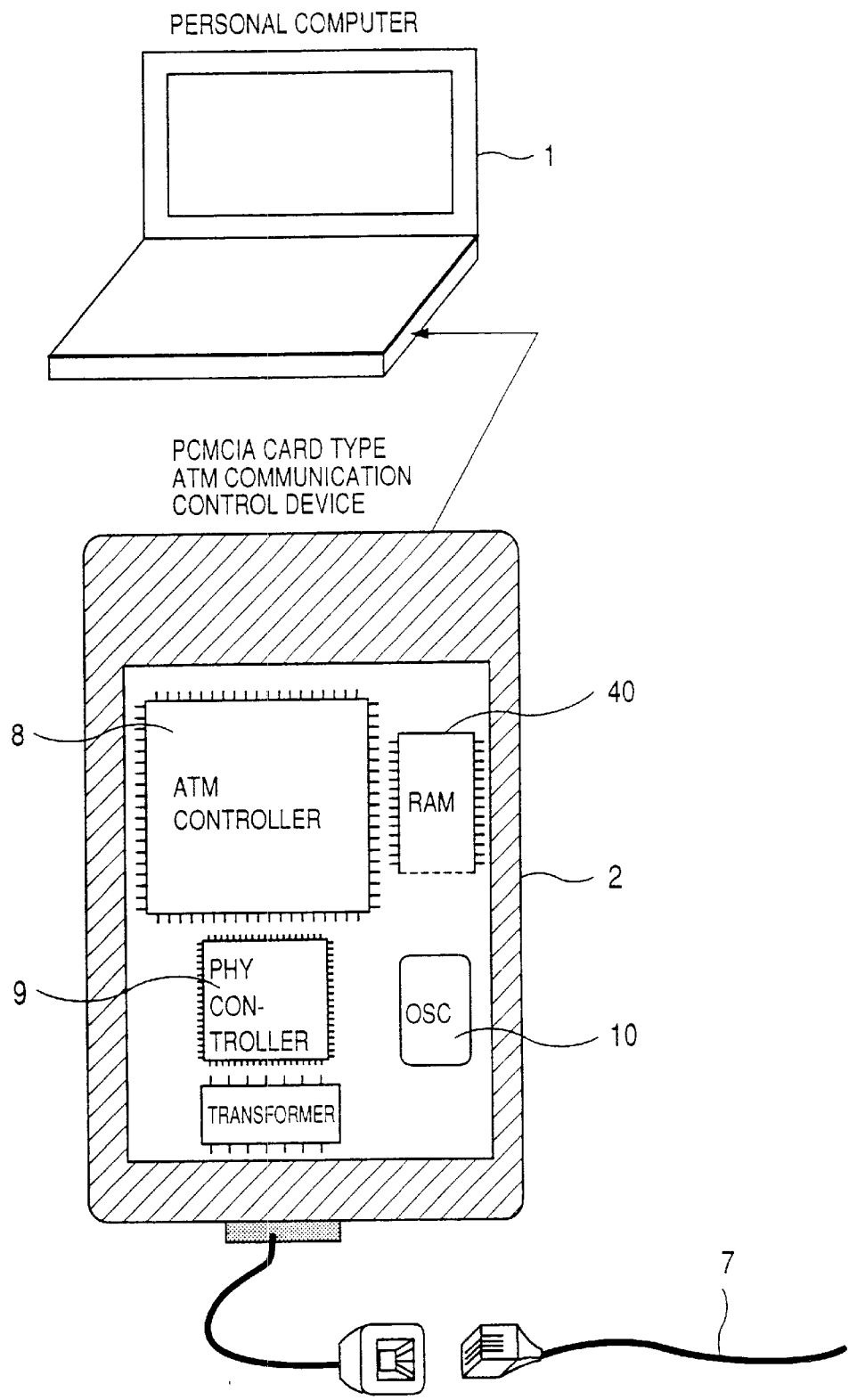
FIG. 15 is a diagram showing a mount status of a PCMCIA card type ATM communication control device.

FIG. 15 is a diagram showing the ATM communication control device when the ATM communication control device is designed to be of a PCMCIA card type. The ATM communication control device 2 comprises an ATM controller 8 which is achieved by one-chip LSI, a conventional one-chip PHY controller 9, a RAM 40, a crystal oscillator 10, and a line connecting transformer, which are mounted in a PCMCIA card.

As described above, in the ATM controller 8 of this embodiment, the ATM protocol processing which is charged by the MPU 100 is limited to those kinds of processing which are flexible to the alteration of the processing content thereof, and the other kinds of processing are charged by the wired logic (i.e., these kinds of processing are performed by the wired logic). Since the processing loads of the MPU 100 is more reduced as compared with the prior art, the ATM controller having low cost and low power consumption can be achieved. Further, since the ATM controller 8 can be achieved by one-chip LSI, the number of the parts of the ATM communication control device 2 is reduced, and thus the ATM communication control device 2 can be installed into a compact device such as a PCMCIA card or the like.

SECOND EMBODIMENT

Next, another embodiment according to the present invention will be described.

In the ATM communication control device according to the first embodiment, the segmentation and reassembly of all the cells to be transmitted and received are performed on the buffer memory 40, so that the access to the buffer memory 40 occurs frequently. Further, in view of the fact that plural connections are set at the same time, a high-speed and large-capacity expensive memory is required as the buffer memory 40. The ATM communication control device according to the second embodiment can reduce the access amount to the buffer memory 40.

Figure 16:
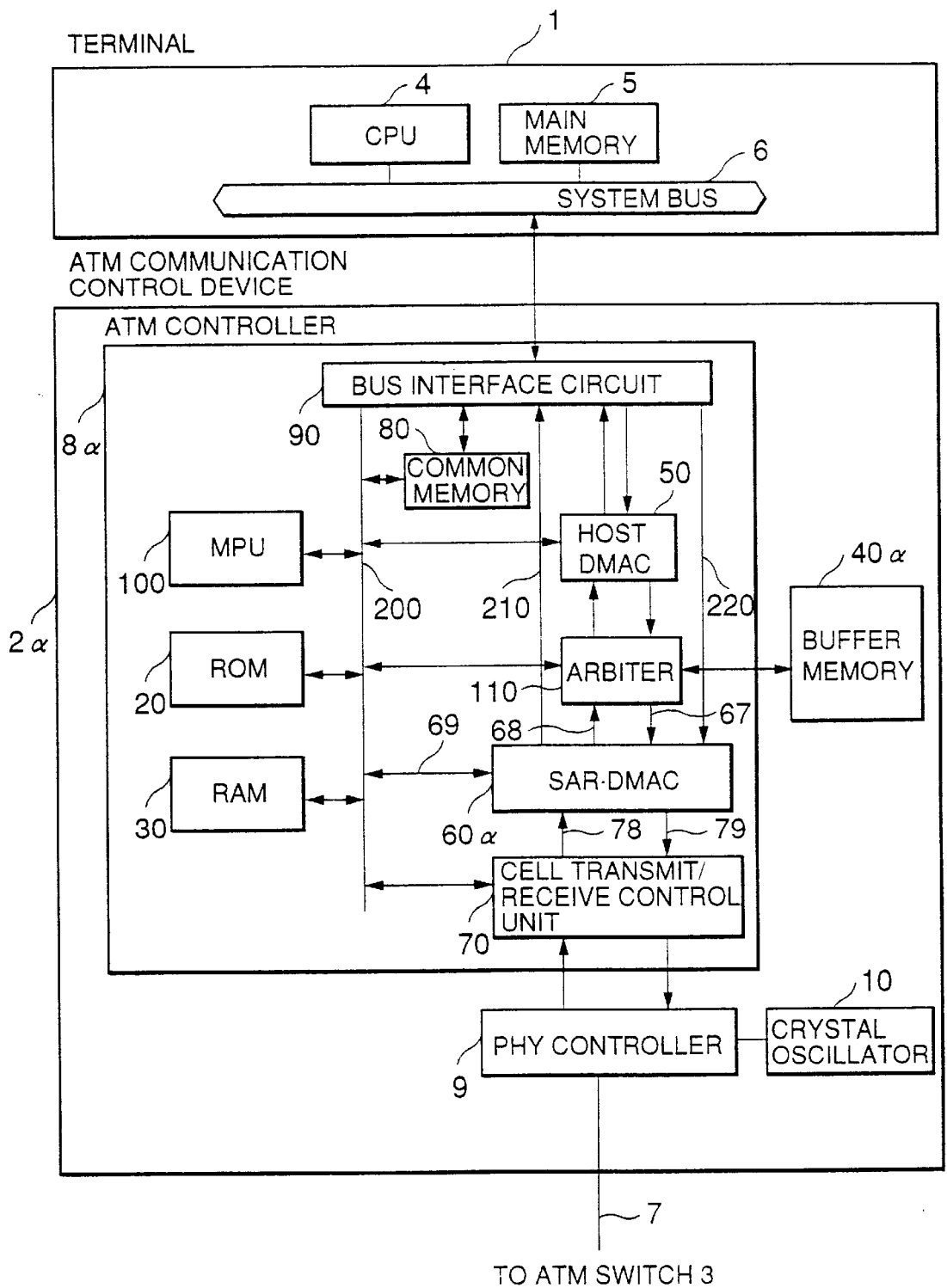
FIG. 16 is a block diagram showing another construction of the ATM communication control device.

FIG. 16 is a block diagram showing the construction of the ATM communication control device 2α according to the second embodiment.

The ATM communication control device 2α is designed so that the cell segmentation and reassembly are performed not only in the buffer memory 40, but also in the main memory 5 of the terminal 1. Specifically, it has an ATM controller 8α in which new data transfer passes 210 and 220 are added between the bus interface circuit 90 and the SAR·DMAC 60 of the ATM controller 8 of the first embodiment. In this construction, the SAR·DMAC 60 can directly transmit and receive the transmit/receive cells with the main memory 5 through the DMA passes 210 and 220 and the bus interface circuit 90.

Figure 17:
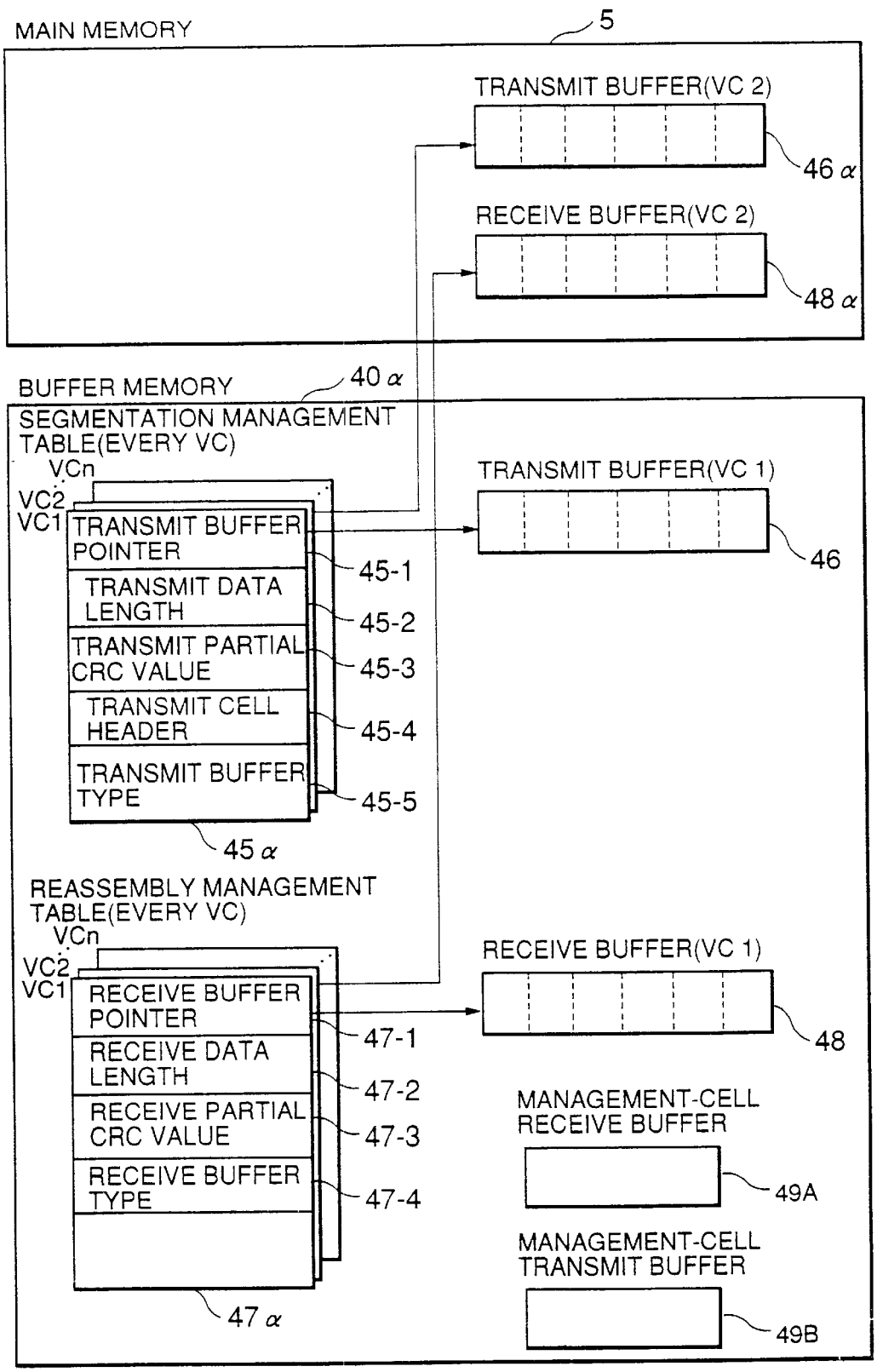
FIG. 17 is a diagram showing a table defined in a buffer memory.

FIG. 17 is a diagram showing the construction of tables and buffers which are defined in the buffer memory 40α of the communication control device 2α and in the main memory 5 of the terminal 1 respectively, and also showing the corresponding relationship therebetween. The transmit buffer pointer 45-1 defined in the segmentation management table 45α indicates a transmit buffer 46α defined in the main memory 5 as well as the transmit buffer 46 defined in the buffer memory 40. Further, the segmentation management table 45α is added with a transmit buffer type field 45-5 indicating one of the transmit buffers 46, 46α in which a CPCS-PDU serving as a transmit target is stored. With respect to the receive buffers, the receive buffer 48α defined in the main memory 5 and the receive buffer 48 defined in the buffer memory 40 are likewise designed so that the selection can be performed on these receive buffers.

Figure 18:
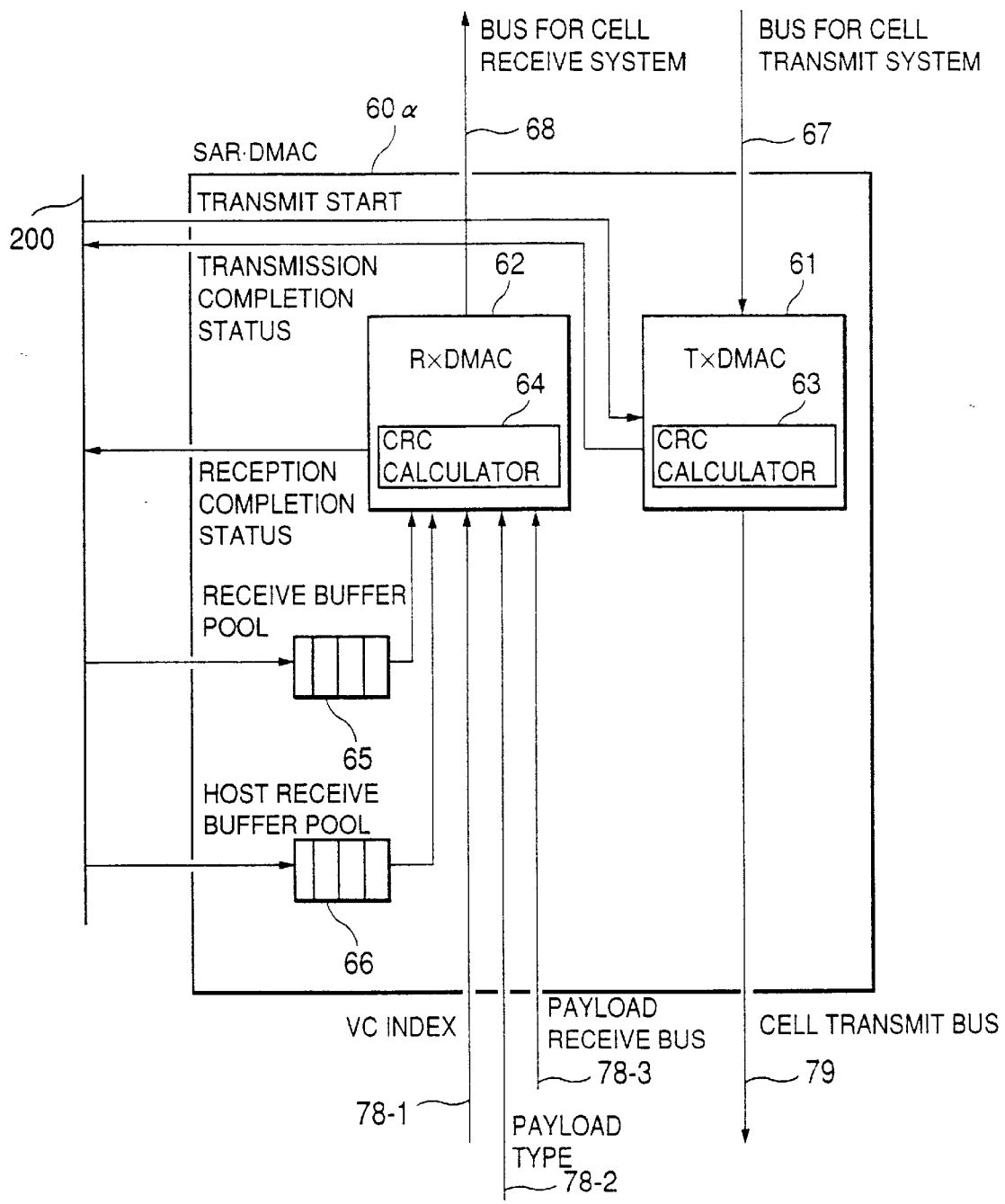
FIG. 18 is a block diagram showing another construction of SAR·DMAC.

FIG. 18 is a block diagram showing the construction of SAR·DMAC 60α in the ATM controller 8α. In addition to the constituent elements of the SAR·DMAC 60 of the first embodiment, the SAR·DMAC 60α is further equipped with a host receive buffer pool 66 for holding the address of an empty area of the receive buffer 48α defined in the main memory 5.

Only the different portion in the operation of the communication control device 2α according to this embodiment from that of the first embodiment will be described hereunder.

Figure 19:
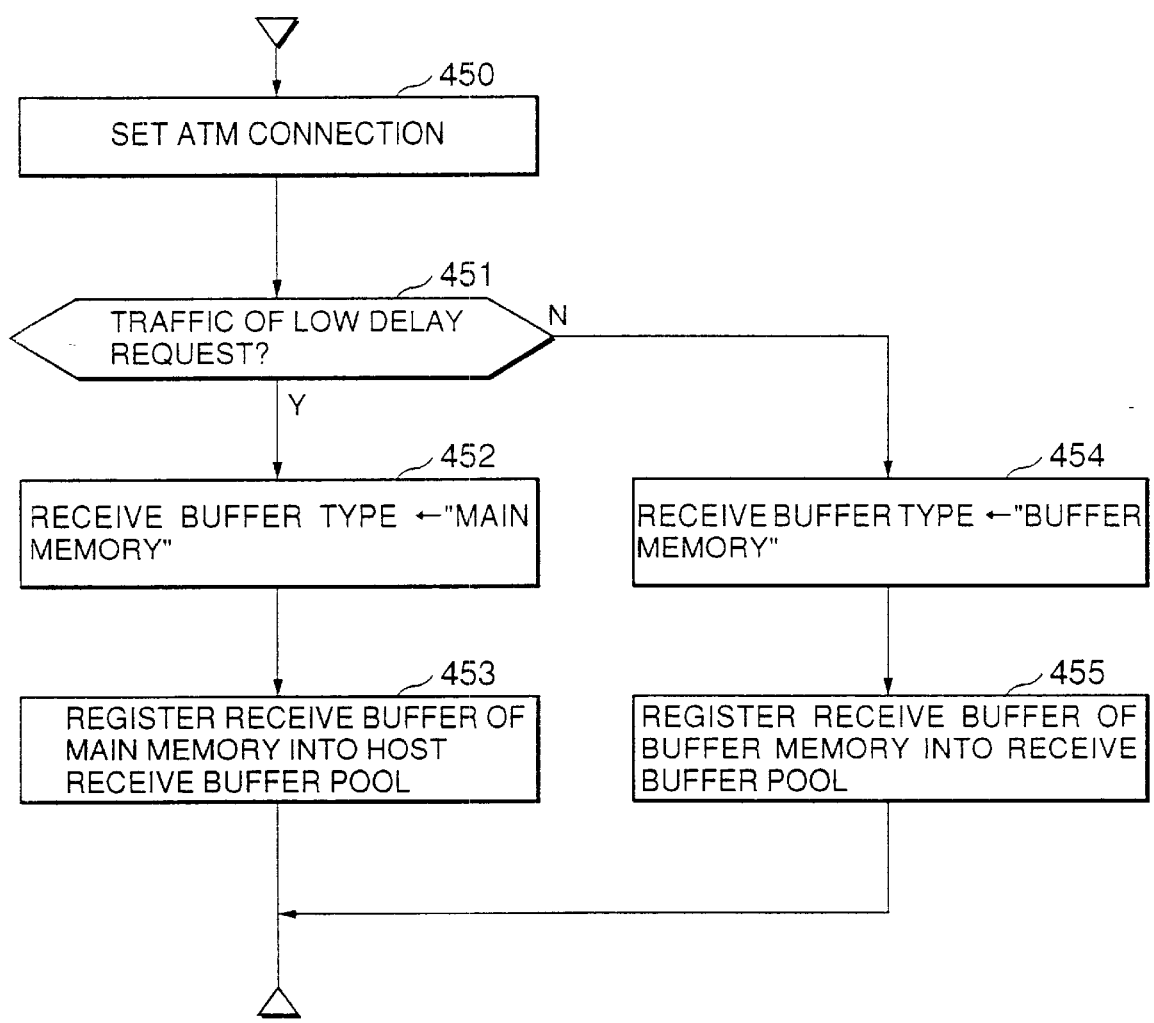
FIG. 19 is a flowchart showing a buffer selection processing flow of MPU.

FIG. 19 is a flowchart showing an example of the processing of selecting a receive buffer in the controller 8α.

At the start time of the communication, the MPU 100 first sets an ATM connection (step 450). If the set ATM connection deals a traffic which requires high-speed transfer, "main memory" is set in the receive buffer type field 47-4 of the reassemble management table 47α (452), and the address of the receive buffer 48α defined in the main memory 5 is registered in the host receive buffer pool 66 in the SAR·DMAC 60α (453). If the set ATM connection deals a traffic which has little effect of delay at the transfer time, "buffer memory" is set in the receive buffer type field 47-4 of the reassemble management table 47α (454), and the address of the receive buffer 48 defined in the buffer memory 40 is registered in the receive buffer pool 65 in the SAR·DMAC 60α (455). The same selection is made on the transmit buffers 46, 46α according to the same procedure under the same condition.

Figure 20:
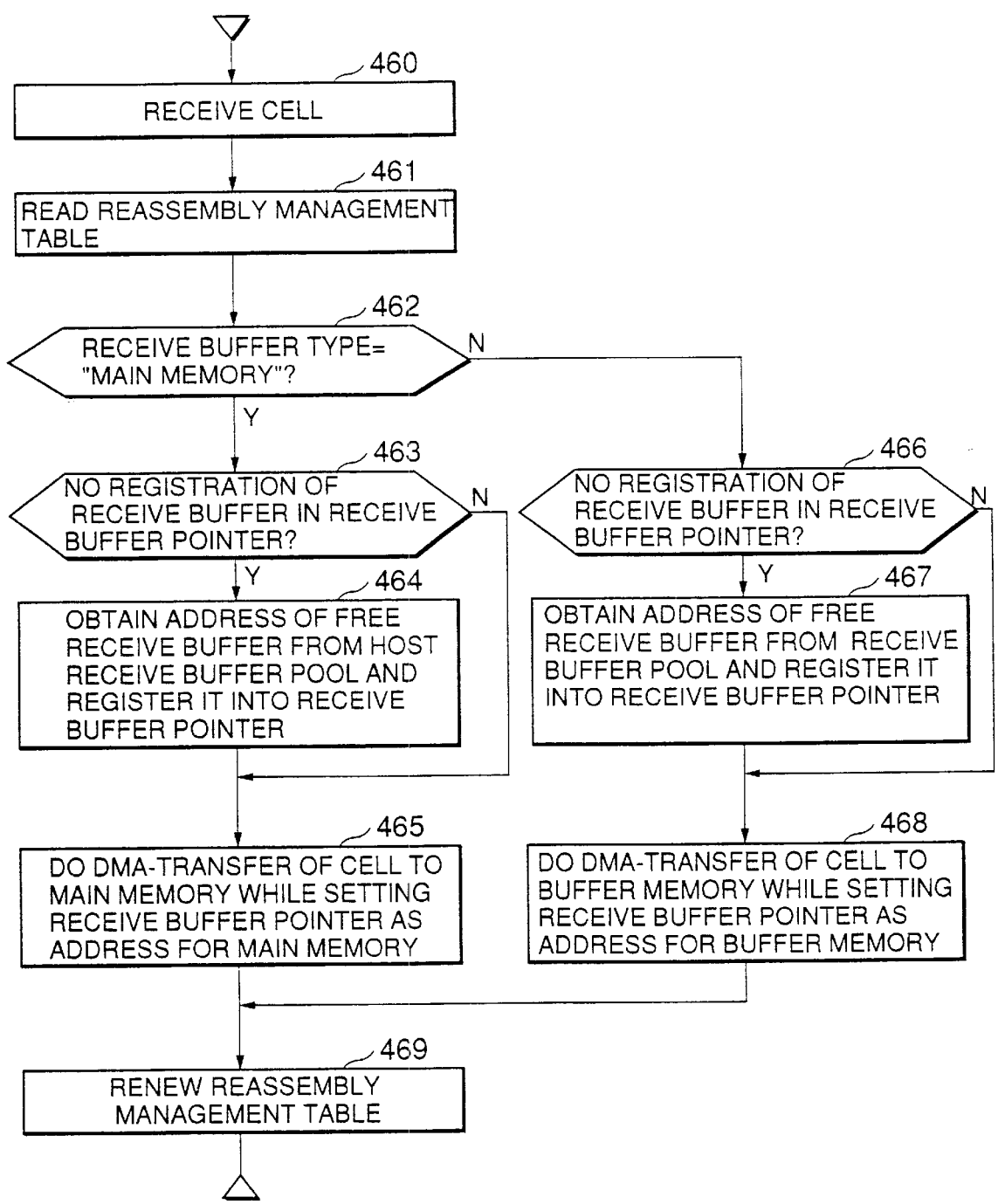
FIG. 20 is a flowchart showing a cell transmit control flow of an ATM controller.

FIG. 20 is a flowchart showing the operation of the RxDMAC 62 at the reception time of the data cell. Upon receiving a cell (step 460), the RxDMAC 62 reads the parameter of the reassemble management table 47α of the corresponding VC (461) to check the receive buffer type field 47-4 (462). If "main memory" is set in this field and any receive butter is not registered in the receive buffer pointer 47-1, the address of a free receive buffer is obtained from the host receive buffer table pool 66 and registered in the receive buffer pointer 47-1 (463, 464). Thereafter, the received cell is transferred to the receive buffer 48α of the main memory 5 (485). If "buffer memory" is set in the field 47-4 and any receive buffer is registered in the receive buffer pointer 47-1 in the processing of step 452, the address of a free receive buffer is obtained from the receive buffer pool 65 and registered in the receive buffer pointer 47-1 (466, 467). The received cell is transferred to the receive buffer 48 of the buffer memory 40 which is indicated by the receive buffer pointer 47-1 (468), and the reassemble management table 47α is renewed (469).

In the cell transmission processing, the selection is made on the transmit buffers 46 and 46α according to the same procedure.

Figure 21:
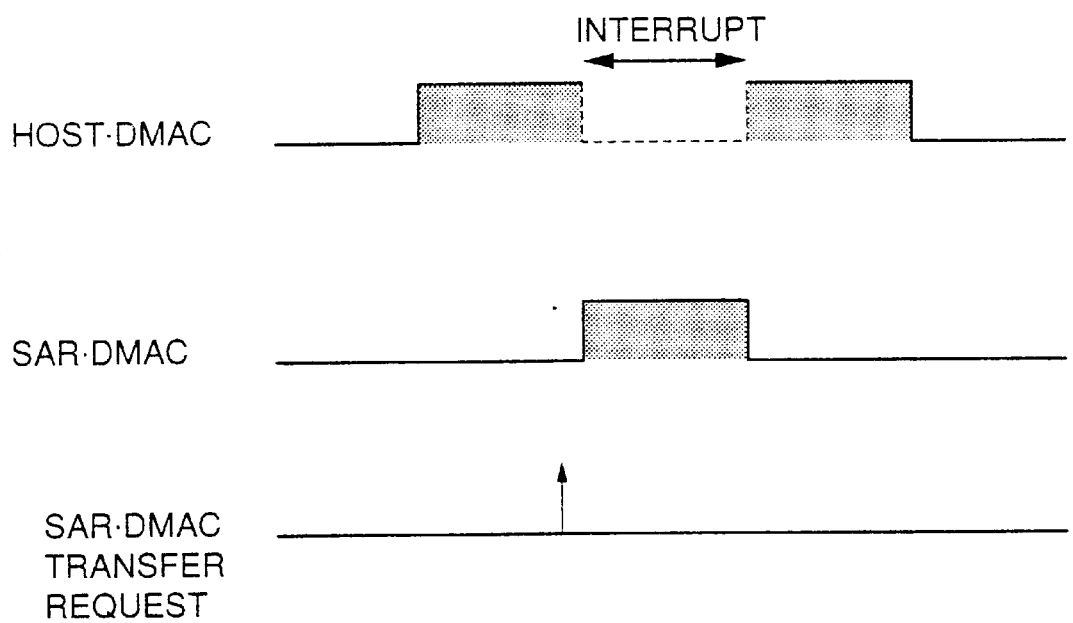
FIG. 21 is a time chart showing the operation of a bus interface circuit.

FIG. 21 is a timing chart showing the scheduling of the DMA (Direct memory Access)-transfer to the HOST·DMAC 50 and the DMA-transfer for the SAR·DMAC 60α in the bus interface circuit 90 of the ATM controller 8α. As shown in FIG. 21, the bus interface circuit 90 of the communication control device 2α allows the transfer processing of the SAR·DMAC 60α to be preferentially performed, thereby reducing the transfer time of a transmit/receive cell for which the delay at the transfer time is required to be reduced.

As described above, in the ATM communication control device 2α according to this embodiment, the cell segmentation and reassembly processing is performed on the main memory 5 for those VCs which has a great effect of delay at the transfer time, so that a lower-speed and smaller-capacity cheap memory may be used as the buffer memory 40. Further, the transmit/receive cell can be directly transmitted between the main memory 5 and the SAR·DMAC 60α, so that the data transmit time can be shortened and the processing loads of the MPU 100 which is relating to the transfer can be reduced.

In the device according to this embodiment, one of the main memory 5 and the buffer memory 40α is selected as a transfer destination every VC in accordance with the property of a traffic to be dealt, however, the selection may be made on the basis of other rules. For example, the transfer destination may be selected in accordance with the traffic amount, not in accordance with the property of the traffic or the unit of the VCs. Further, the transfer destination may be selected in accordance with a data cell type, such as for management and for user.

THIRD EMBODIMENT

Next, a third embodiment according to the present invention will be described.

According to the ATM communication control device of the third embodiment of the present invention, the segmentation and reassembly processing of all the transmit/receive cells is performed on the main memory 5, and no buffer memory 40α is needed in the ATM communication control device 2 of the second embodiment.

Figure 22:
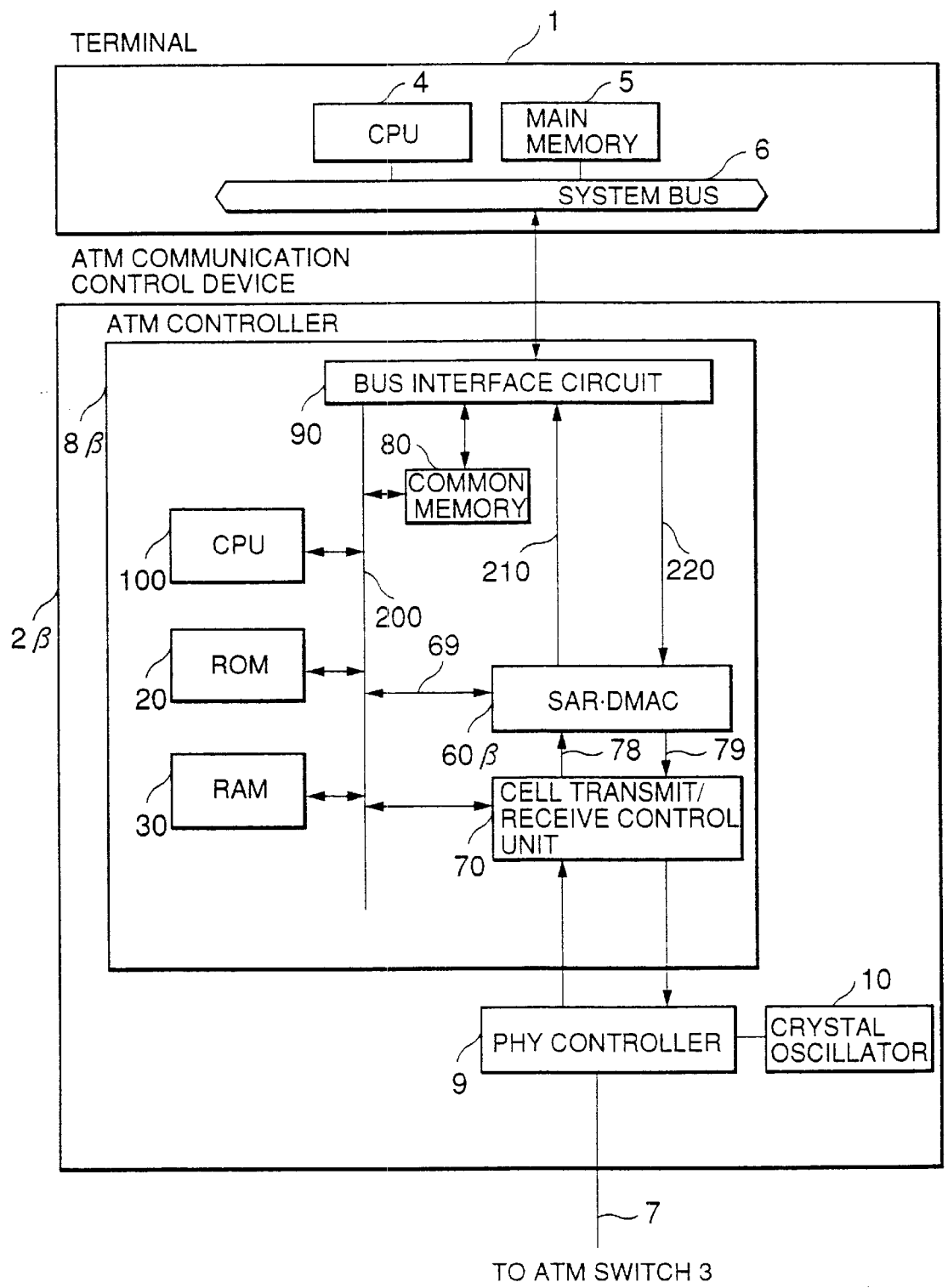
FIG. 22 is a block diagram showing another construction of the ATM communication control device.

FIG. 22 is a block diagram showing the construction of an ATM communication control device 2β according to a third embodiment of the present invention. SAR·DMAC 60β in the ATM controller 8β is designed so as to access the RAM 30 through the pass 69.

Figure 23:
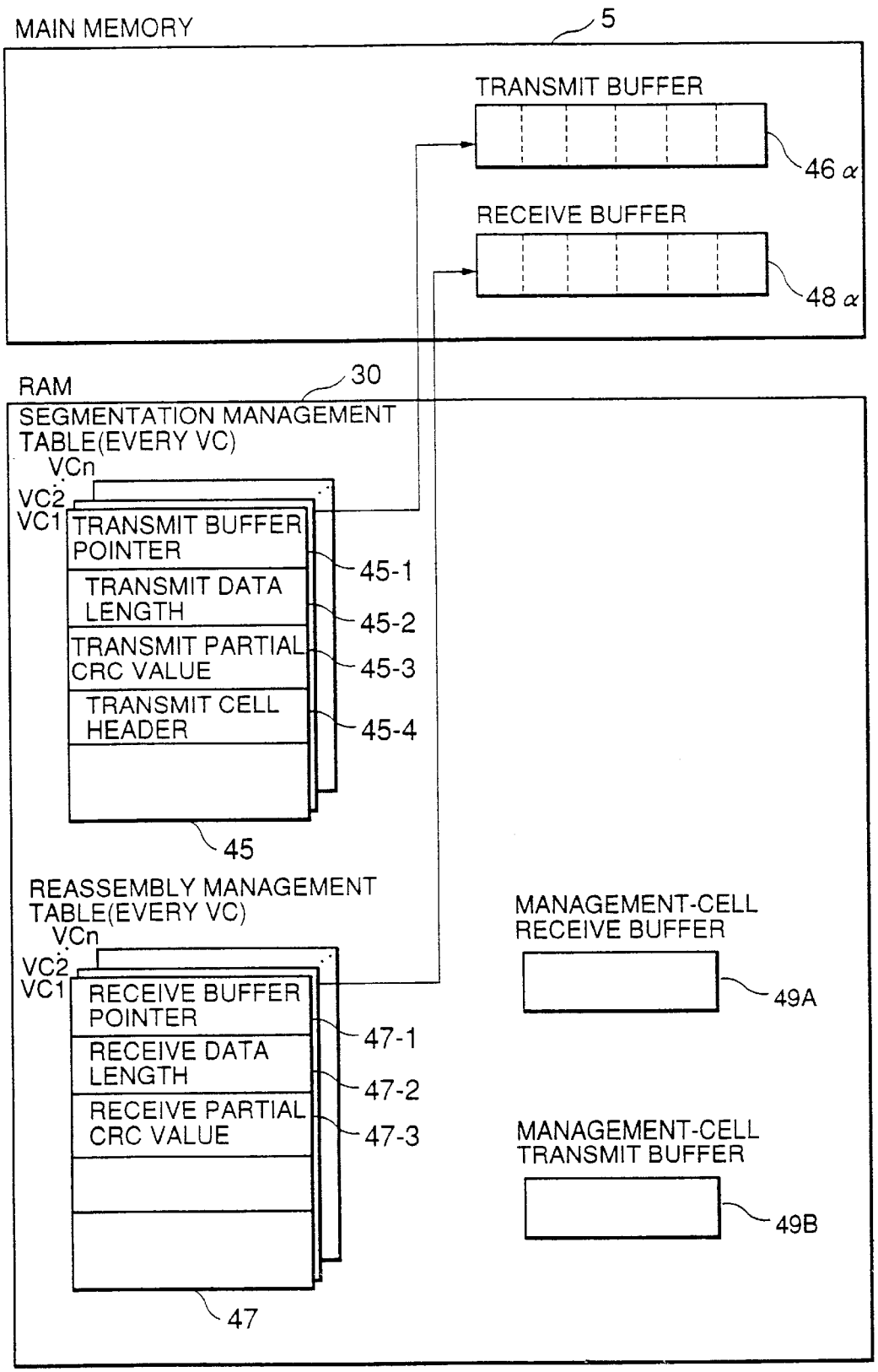
FIG. 23 is a diagram showing the structure of a table defined in a RAM.

FIG. 23 shows the structure of a table defined in the RAM 30 and the relationship with the buffer memory.

In the RAM 30, the segmentation management table 45, the reassemble management table 47, the management cell receive buffer 49A and the management-cell transmit buffer 49B are defined, which are defined on the buffer memory 40 in the first and second embodiments. The transmit buffer 46α and the receive buffer 48α are defined in the main memory 5, and indicated by the transmit buffer pointer 45-1 of the segmentation management table 45 and the receive buffer pointer 47-1 of the reassemble management table 47. The SAR·DMAC 60β transmits the transmit CPCS-PDU set in the transmit buffer 46α of the main memory 5 according to the segmentation management table 45 defined in the RAM 30 while segmenting the transmit CPCS-PDU into cells. Further, it reassembles the receive cells into CPCS-PDU according to the reassemble management table 47 in the receive buffer 48α of the main memory 5.

Figure 24:
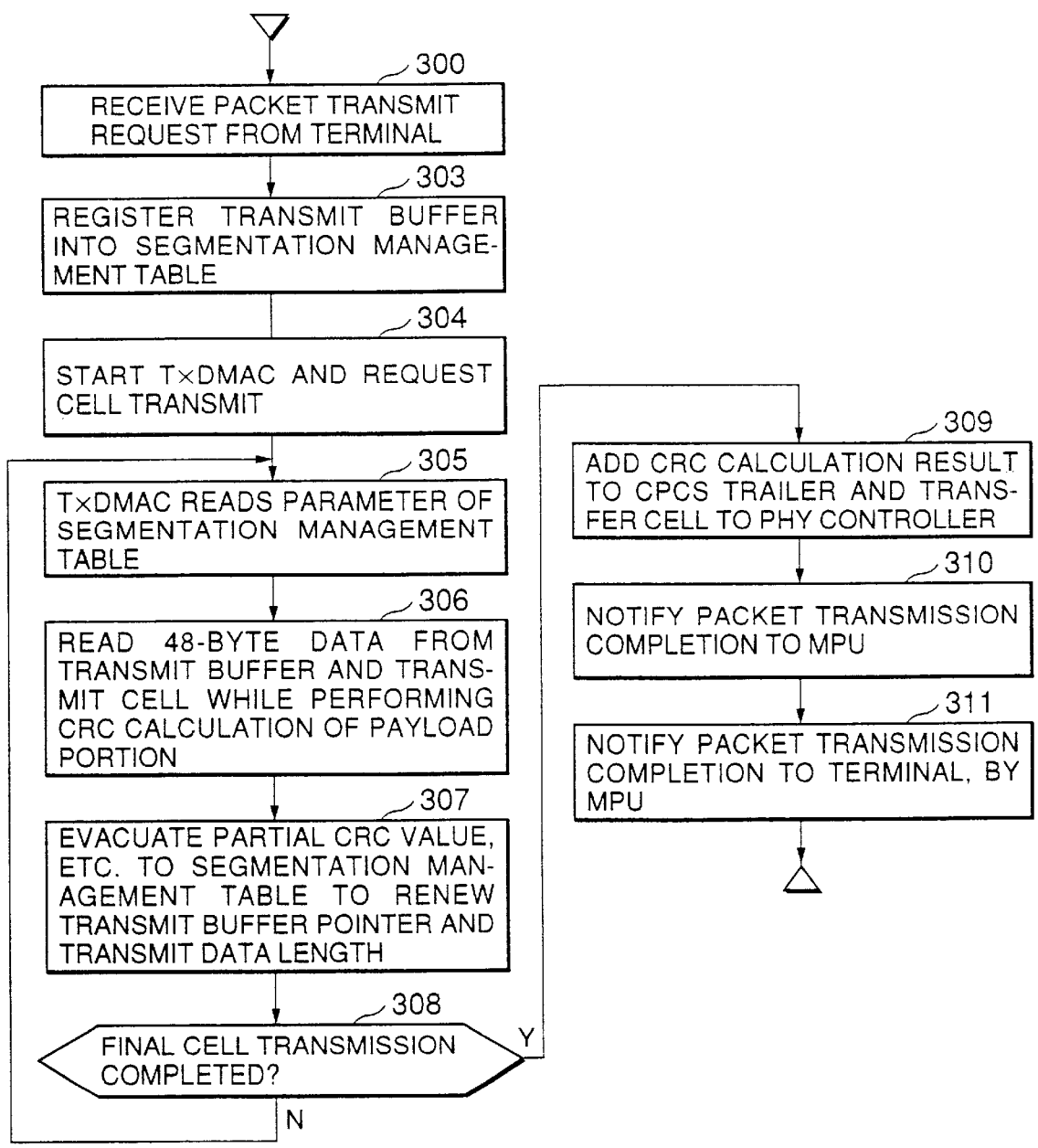
FIG. 24 is a flowchart showing another transmit flow of the ATM communication control device.

FIG. 24 is a flowchart showing the operation on the transfer processing of the ATM communication control device 2β according to this embodiment. The flowchart shown in FIG. 24 is similar to the flowchart of the first embodiment except that the data transmission to the main memory by the HOST·DMAC 50 is not required and the addition of the CPCS trailers other than the CRC is performed by the CPU.

Figure 25:
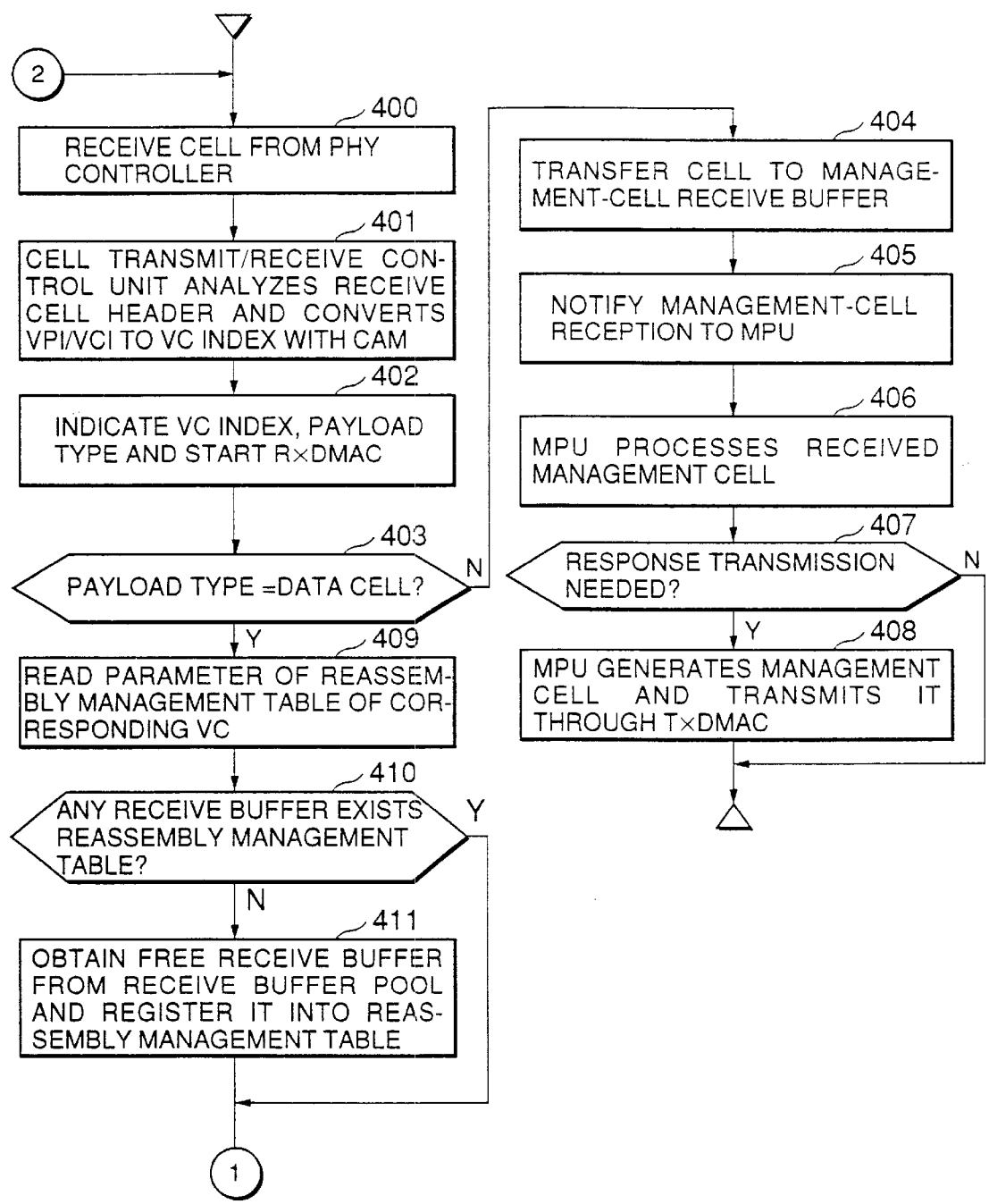
FIG. 25 is a flowchart showing another receive flow of the ATM communication control device.
Figure 26:
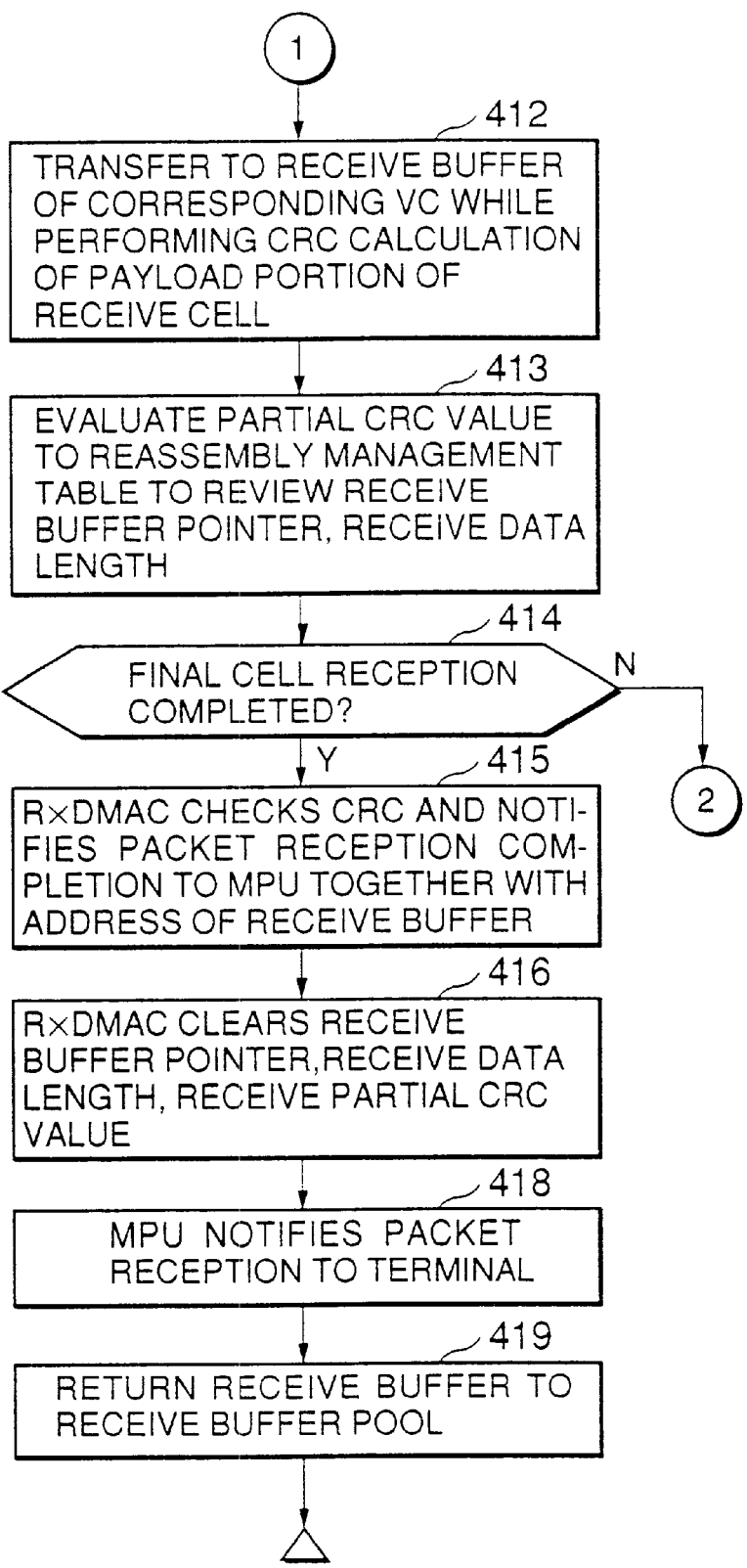
FIG. 26 is a flowchart showing another receive flow of the ATM communication control device.

FIGS. 25 and 26 are flowcharts showing the operation on the reception processing of the ATM communication control device 2β of this embodiment. The flowchart of this embodiment is similar to the flowchart of the first embodiment except that the data transfer to the buffer memory by HOST·DMAC 50 is not required.

Figure 27:
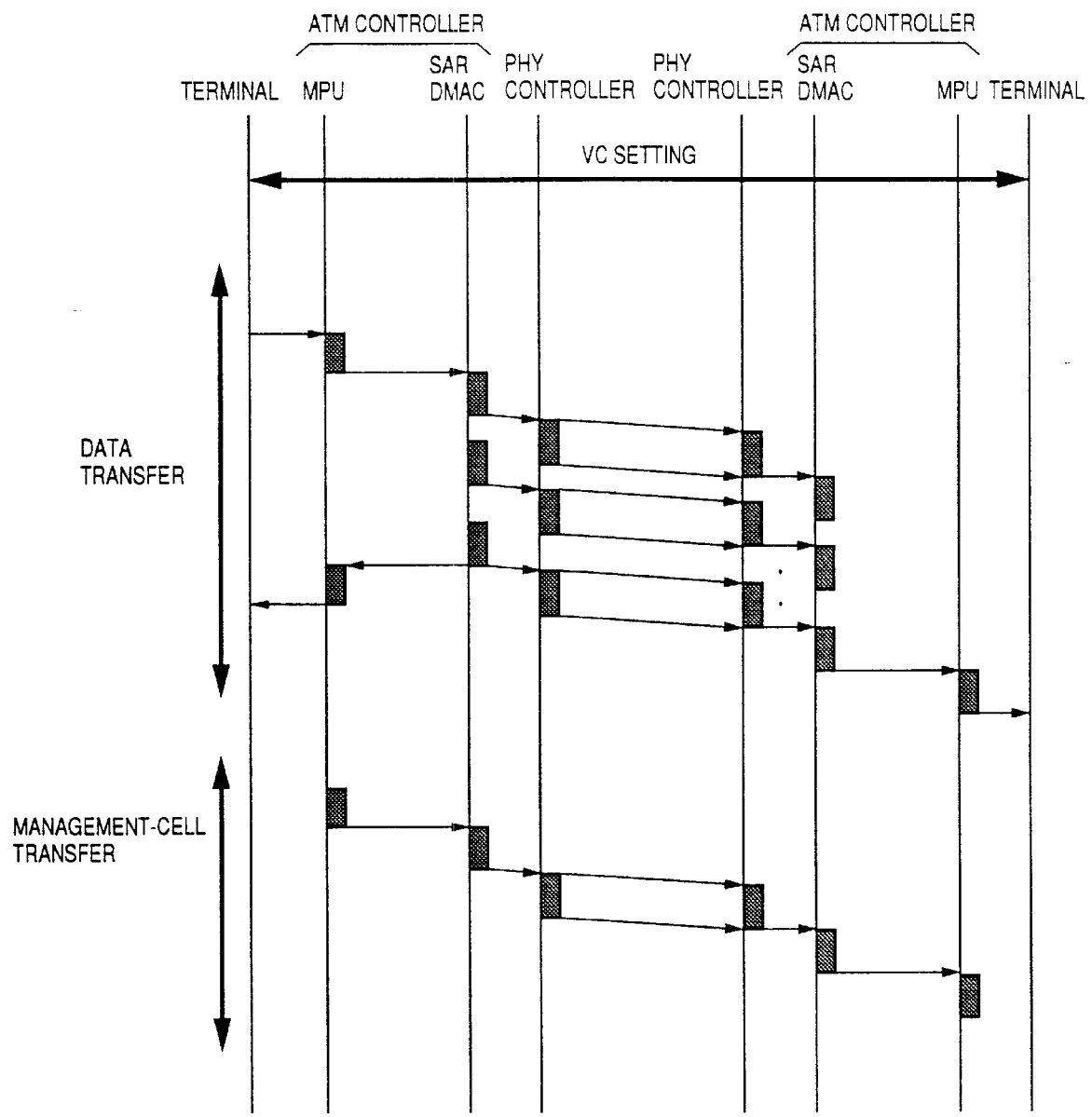
FIG. 27 is a timing chart showing another operation of the ATM communication control device.

FIG. 27 is a timing chart showing the operation of the ATM communication control device 2β when the processing is performed according to the flow shown in FIGS. 24 to 26. As shown in FIG. 27, according to this embodiment, the processing loads of the MPU 100 is less than that of the first and second embodiments.

As described above, in the ATM communication control device 2β of this embodiment, the cell segmentation and reassembly processing is performed on the buffer which is defined on the main memory 5, and the management information necessary for the segmentation and the reassembly is arranged on the RAM 30, so that the buffer memory 40 used in the first and second embodiments is not required. Further, the processing loads of the MPU 100 is further reduced. Accordingly, the ATM communication control device 2β can be designed in compact size and at low price.

According to the present invention, there can be provided an ATM controller which can support the setting and alteration of the protocol processing, and also further reduce the processing loads of firmware.

FOURTH EMBODIMENT

The transmit of cell to an ATM switch from the ATM communication control device will be described in detail with reference to FIGS. 28 to 40.

Figure 28:
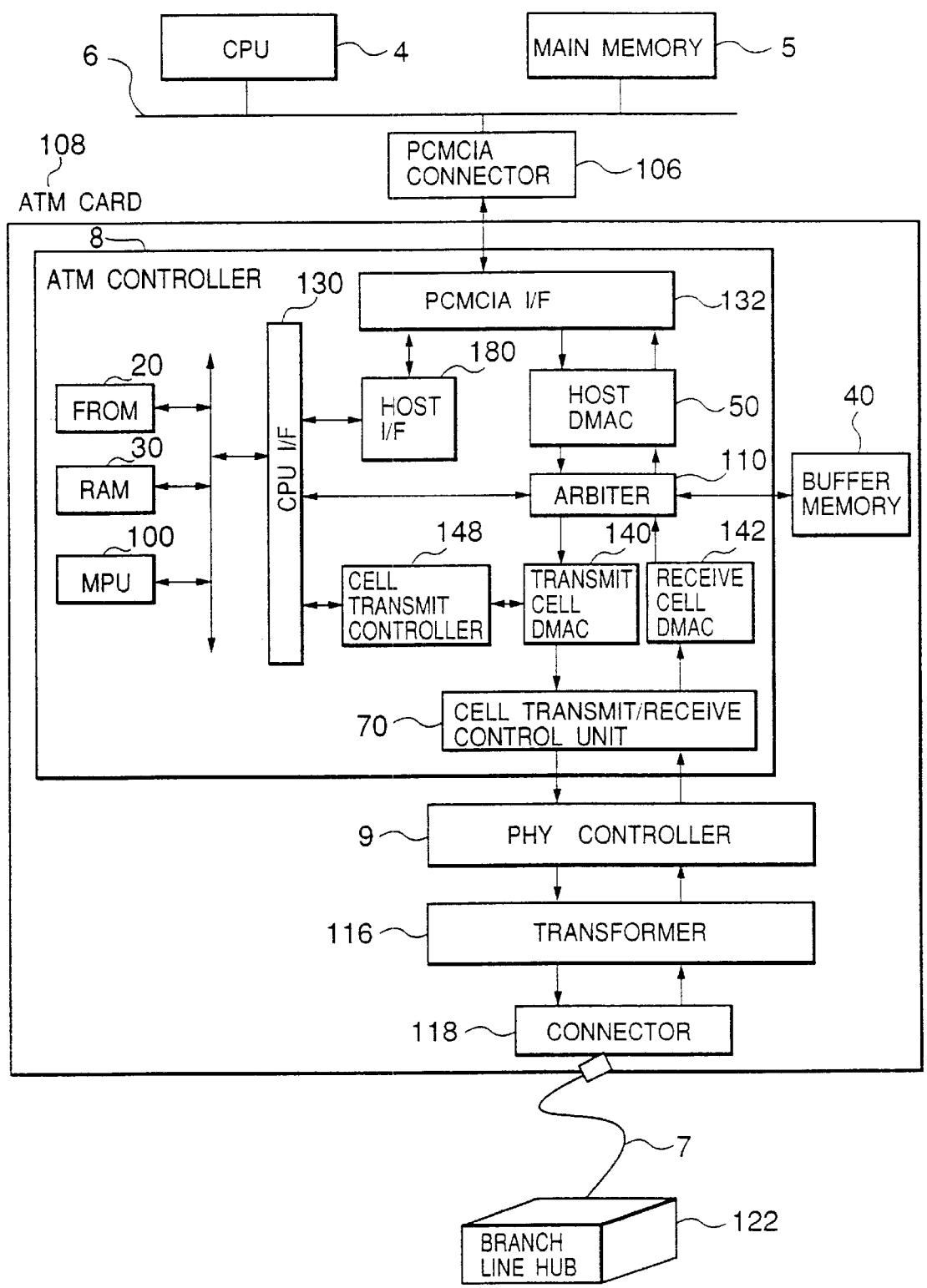
FIG. 28 is a diagram showing the ATM communication control device in which the ATM controller of the present invention is mounted.

FIG. 28 is a block diagram showing the construction of an ATM communication control device 2 which contains an ATM controller 8 of the present invention and is adapted to connect a terminal to ATM-I AN. The terminal comprises CPU 4 and a main memory 5, and is connected to the ATM communication control device 2 through a bus 6 and a PCMCIA connection unit 106. The ATM communication control device 2 includes an ATM controller 8 having an interface function for a computer and an AAL/ATM function, a PHY controller 9 having a PHY function, a buffer memory 40 used for the cell segmentation and reassembly, a transformer 116, and a connector 118 for a cable. It is connected to a branch line HUB 122 through the cable 7 to construct ATM-LAN. The ATM controller 8 comprises a PCMCIA I/F unit 132 for achieving a physical interface as PCMCIA, a host I/F (interface) 80 for receiving control information such as a transmit request from the CPU and a receive completion report from the ATM communication control device, a HOST·DMAC 50 for performing data transfer between the main memory 5 and the buffer memory 40, a transmit cell DMAC 140 for performing call transmission between the buffer memory 40 and the PHY controller 9, a receive cell DMAC 142 for performing cell reception, a cell transmit/receive control unit 70, an arbiter 110 for controlling an access competition of DMACs 50, 140, 142 or the MPU 100 to buffer memory 40, a cell transmit controller 148 which is a hardware circuit for performing the traffic shaping function at the cell transmission time, an MPU I/F 130 for connecting the processor and the MPU 100, a FROM (Flush ROM) 20 for storing firmware which is executed by the MPU 100, and a RAM 30 in which tables, etc. managed by the MPU are arranged.

Figure 29:
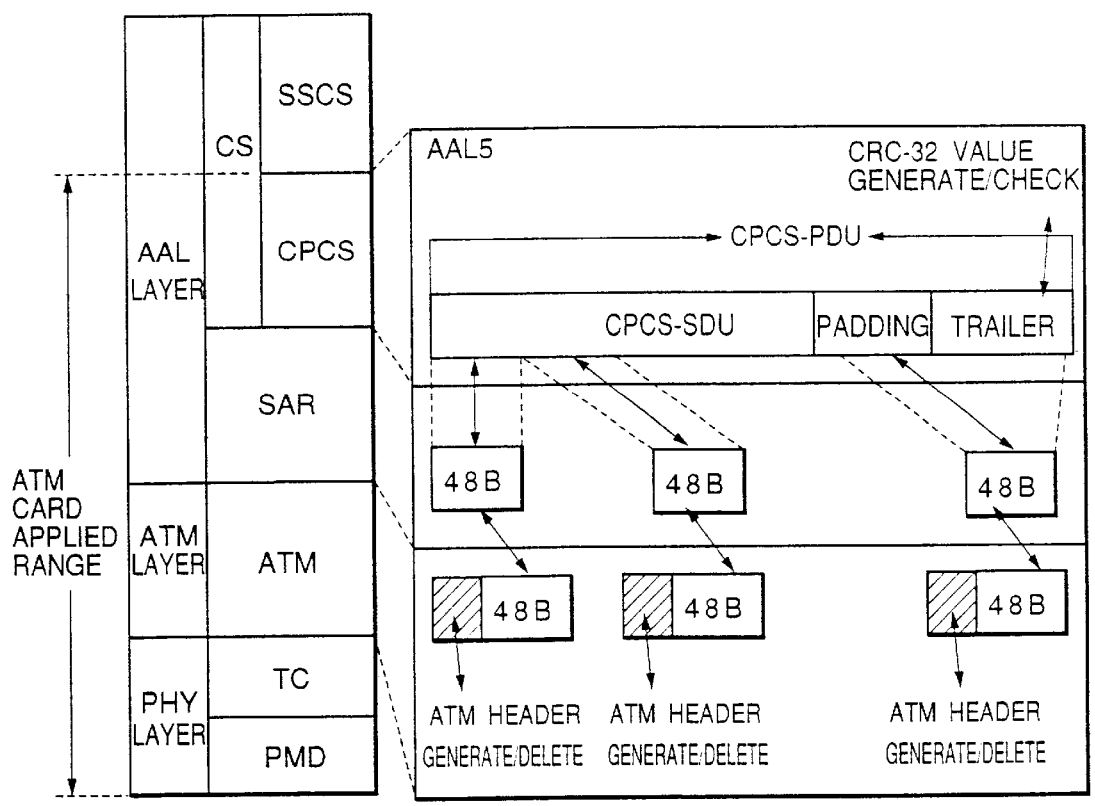
FIG. 29 is a diagram showing an example of the construction of the communication protocol of ATM and a processing operation defined in the communication protocol.

FIG. 29 is a diagram showing the structure of the ATM protocol layer in ATM and the processing defined in the communication protocol. In this embodiment, application of AAL5 as AAL layer is assumed. In the ATM communication control device 2, the protocol processing of the CPCS (Common Part Convergence Sublayer) and lower layers of the AAL layer is performed by the ATM controller 8 and the PHY controller 9.

The transmission processing and the reception processing will be described hereunder.

Upon receiving the transmit request from the CPU 4, the ATM controller 8 performs the DMA transfer of transmit CPCS-PDU (Protocol Data Unit) prepared on the main memory 5 by the CPU 4 to the buffer memory 40 by using the host DMAC 50. Thereafter, the CPCS-PDU on the buffer memory 40 is segmented into cells every 48 bytes, the segmented data are added with cell headers, and then the transmit request is made to the PHY controller 9. In the transmit cell DMAC 140, the CRC 32 is calculated while transmitting the cells, and the calculation result of the CRC (Cyclic Redundancy Check) 32 is inserted into the trailer of CPCS-PDU.

Upon receiving the receive completion report from the PHY controller 9, the ATM controller 8 deletes the cell headers from the received calls, and reassembles CPCS-PDU on the buffer memory 40. In the receive cell DMAC 142, the CRC 32 is calculated while receiving the cells, and the CRC 32 is checked at the time when the reassembly of the CPCS-PDU is completed. When the reassembly of the CPCS-PDU is completed, in the HOST·DMAC 50, the receive CPCS-PDU is subjected of the DMA-transfer to the buffer memory 40 onto the main memory 5 which is indicated by the CPU 4. After the transfer is completed, the reception completion is informed from the ATM controller 8 to the CPU 4 by an interrupt or the like.

Figure 30:
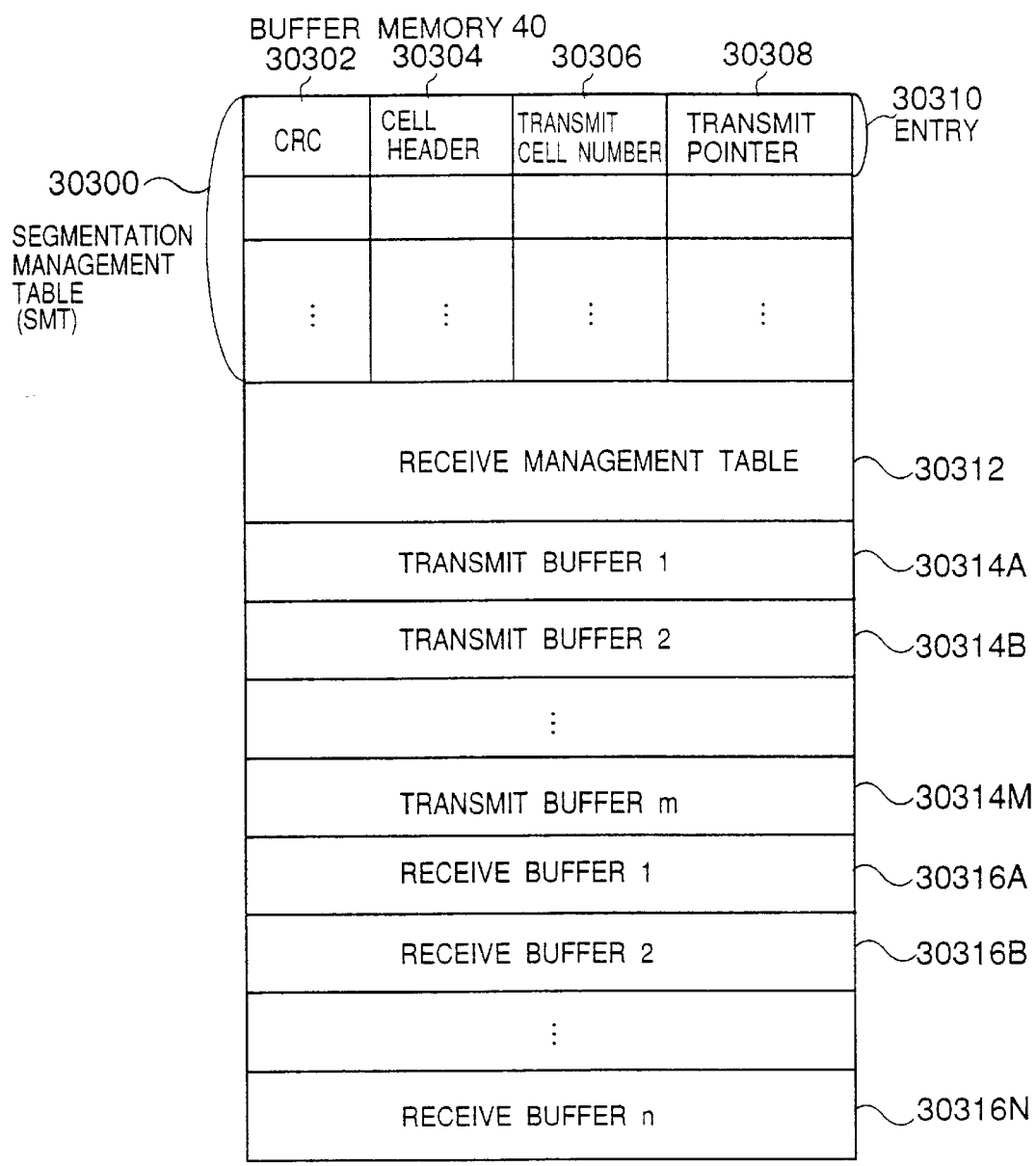
FIG. 30 is a diagram showing an example of the construction of a buffer memory.

FIG. 30 shows the structure of the buffer memory 40. The buffer memory 40 comprises a segmentation management table 30300 which is used to perform the cell transmit processing by the ATM controller 8, a receive management table 30312 used for the cell receive processing, plural transmit buffers 30314 (30314A, 30314B, 30314M) for storing transmit CPCS-PDU, and plural receive buffers 30318 (30316A, 30316B, 30316N) for storing receive CPCS-PDU. The entry 30310 of the segmentation management table 30300 is prepared in conformity to the virtual connection (VC) which is identifiable by VPI, VCI of the cell header, and it comprises an area 30302 to which the CRC calculation result is evacuated, a cell header 30304 which is added at the cell transmit time, a transmit cell number 30306 which is continuously transmitted by the ATM controller 8, and a transmit pointer 30308 for indicating the position of a cell payload to be next transmitted on the transmit buffer. The ATM controller 8 performs the traffic shaping in the cell transmit controller 148 by using the registration content of the segmentation management table 30300.

Figure 31:
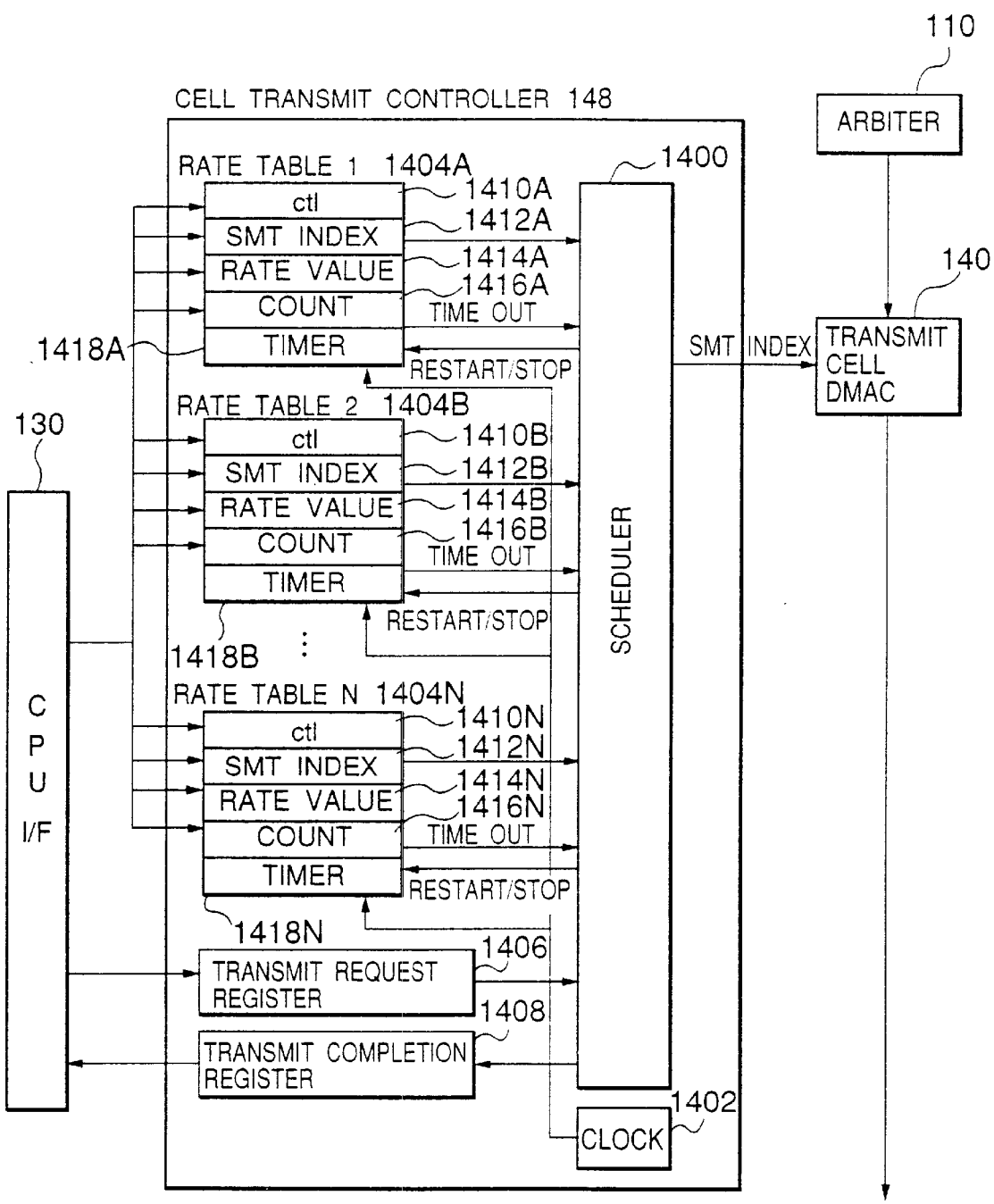
FIG. 31 is a diagram showing an example of the construction of a cell transmit controller.

FIG. 31 is a block diagram showing the function of the cell transmit controller 148 according to the present embodiment.

In the cell transmit controller 148, the cell-transmit interval is managed for each VC, and a cell transmit request is issued to the cell transmit DMAC when the cell transmit time has come, whereby various cell rates (cell number per second) each of which is defined every VC are supported, and cell multiplication is performed on plural VCs to perform the traffic shaping. The cell transmit controller 148 comprises rate tables 404 (1404A, 1404B, 1404N) for managing the cell-transmit interval in accordance with each VC, a transmit request register 1406 for receiving a single cell transmit request from the MPU 100 to perform flexible traffic control, clock 1402 for managing the cell-transmit interval, a scheduler 1400 for scheduling the plural rate tables 404 or the cell transmit request from the MPU 100, and a transmit completion register 1408 for reporting the cell transmit completion to the MPU. The rate table number corresponds to the VC number which can be managed simultaneously by the cell transmit controller. Each rate table 404 comprises four registers of a ctl register 1410 (1410A, 1410B, 1410N) for starting the cell-transmit interval management, an SMT index register 1412 (1412A, 1412B, 1412N) for setting a positional information (index) (SMT index) of the segmentation management table (SMT) 30300 provided on the buffer memory, a rate value register 1414 (1414A, 1414B, 1414N) for setting the cell-transmit interval, and a count register 1416 (1416A, 1416B, 1416N) being a work area for managing the cell transmit interval, and a timer 1418 (1418A, 1418B, 1418N) for the cell-transmit management by using the count register 1416. When the cell-transmit interval management is started, the setting of the four registers as described above is required to be performed by the MPU 100.

Next, the traffic control processing which is performed by using the cell-transmit controller 148 will be described with reference to the flowchart of FIGS. 32 to 37. Through this flow, the processing of the timer 1418 of the cell transmit controller 148, the scheduler 1400 and the transmit cell DMAC 140 will be described.

Figure 32:
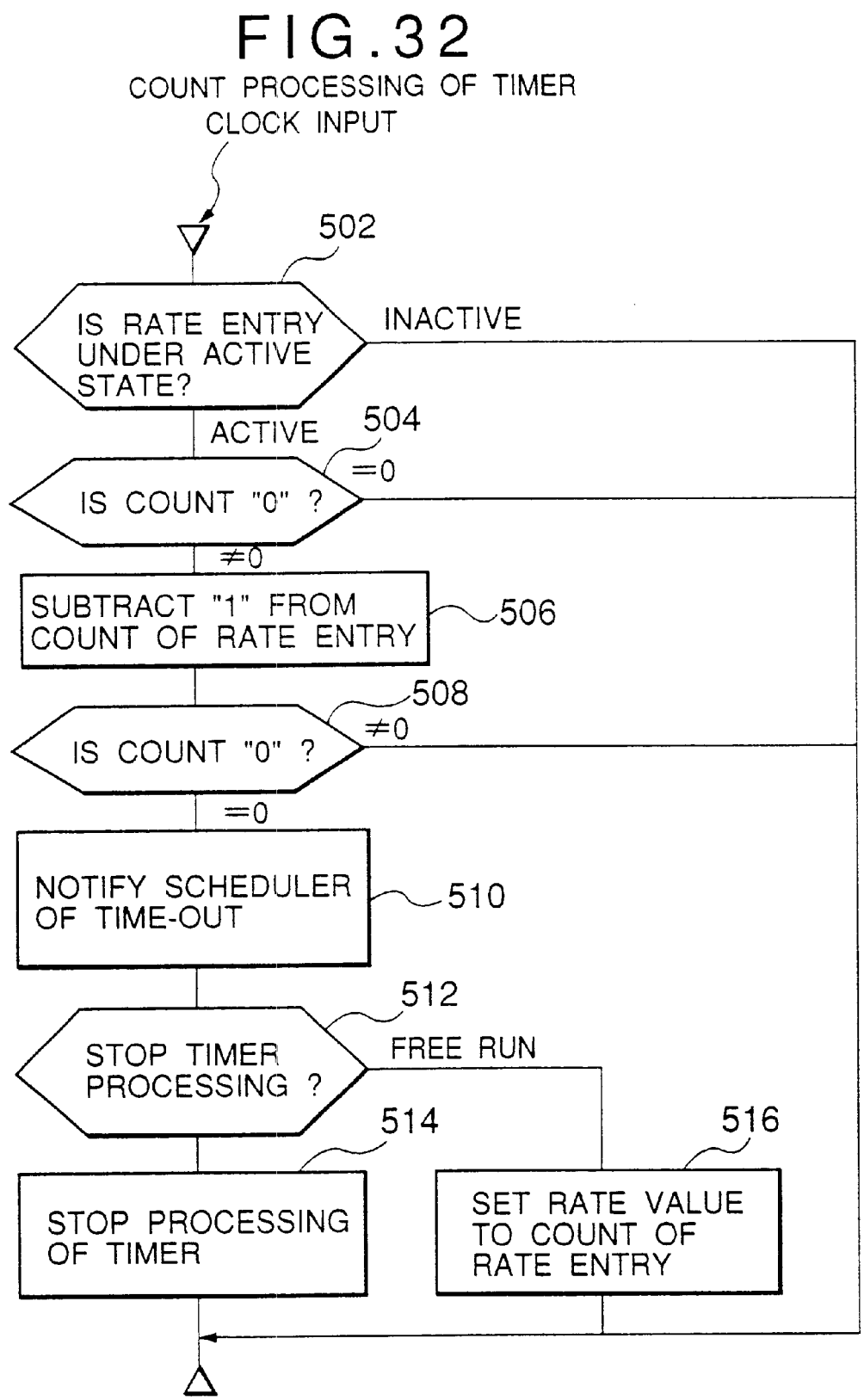
FIG. 32 is a flowchart showing count processing in a timer.

FIG. 32 is a flowchart showing the count processing of the timer 1418.

Upon input of a signal from the clock 1402 every fixed time, for example, 1 microsecond, the timer 418 checks it on the basis of the set value of the ctl register whether a start request is output to the rate table 1404 (502). If no start request is output, the processing is ended. On the other hand, if the start request is output, the set value of the count register 1416 is checked. If the set value is "0", the processing is ended (504). If the set value is not "0", "1" is subtracted from the set value of the count register 1416 (506). Thereafter, it the set value of the count register 1416 is checked again (508). If the set value is "0", a time-out signal is output to the scheduler 1400 (610). At the same time, the SMT index is delivered to the scheduler 1400 (510). The timer 1418 stops its processing until the start request is output from the scheduler 1400 (614).

Figure 33:
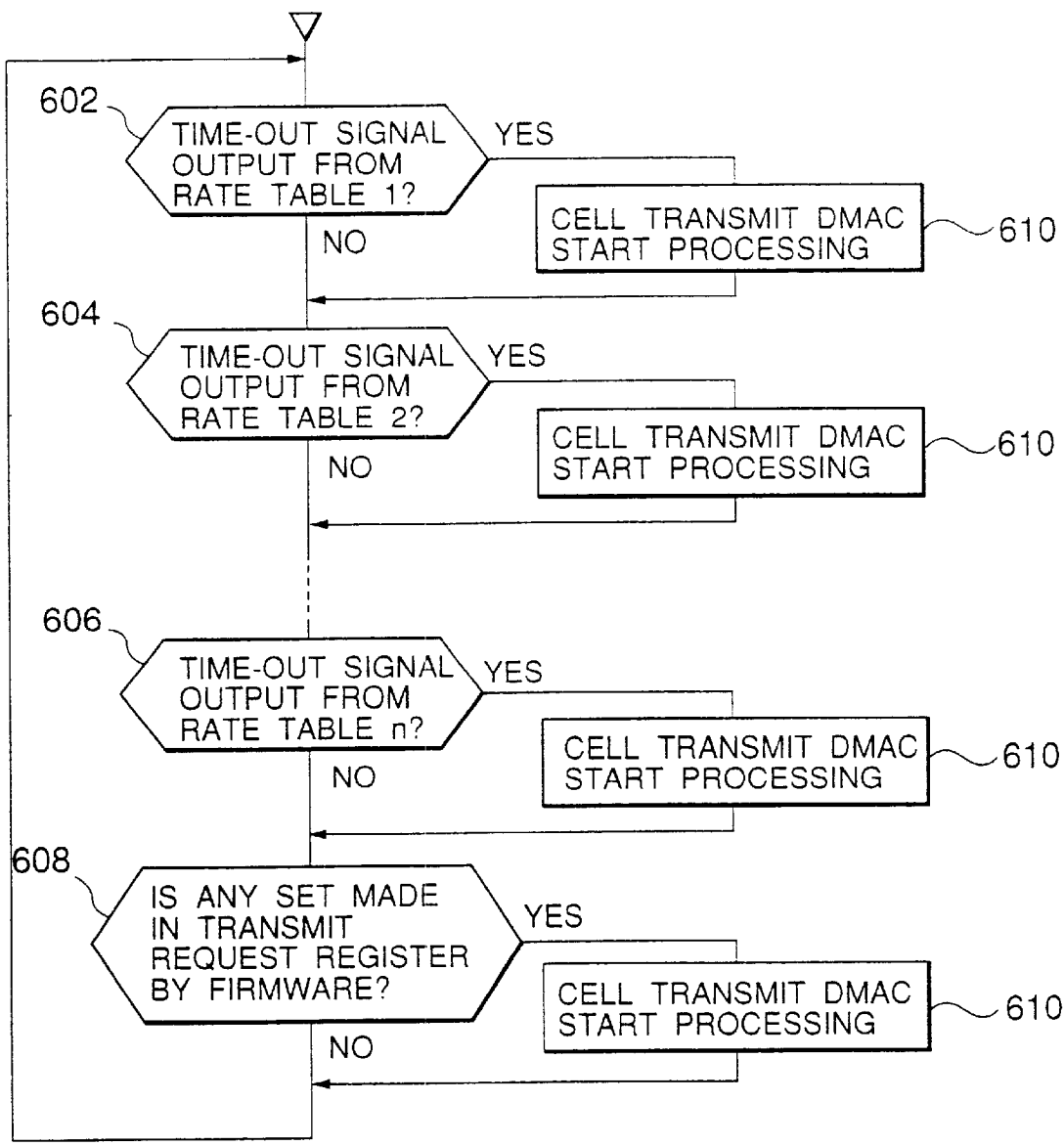
FIG. 33 is a flowchart showing a random scheduling processing in a scheduler.
Figure 34:
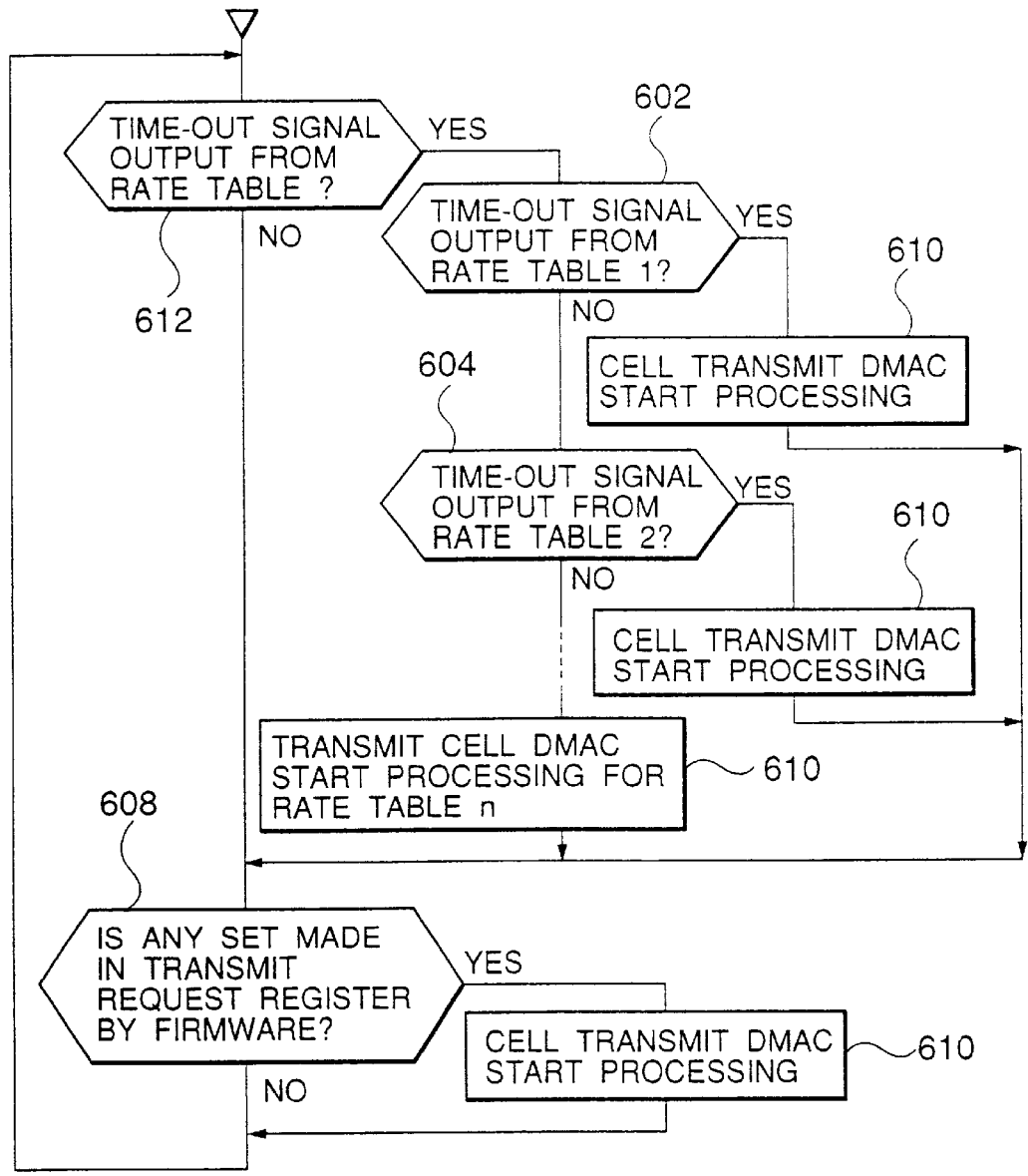
FIG. 34 is a flowchart showing scheduling processing with priority in the scheduler.

FIGS. 33 and 34 are flowcharts showing the scheduling processing of the scheduler 1400.

FIG. 33 is a flowchart when random scheduling processing of starting the cell transmission is performed. The scheduler 1400 continues to check whether a time-out signal from the timer 1418 of each rate table 1404 (602, 604, 606) exists and whether the transmit request register 1406 is set by the MPU 100 (608) in this order. If there is a cell transmit request, the transmit cell DMAC 140 is started (610). By repetitively performing the scheduling processing as described above, the plural time-out signals from the timers 1418 of the respective rate tables 1404 and the cell transmit request due to the setting of the transmit request register by the MPU are randomly received, whereby the cell transmit requests for the plural VCs are treated equally.

FIG. 34 is a flowchart when scheduling processing with a priority function to start the cell transmission in the scheduler 1400. The priority rank is assumed to be set so that as the number of the rate table 1404 is smaller, the priority rank thereof is higher (the rate table 1, 1404A has a higher priority rank than the rate table 2, 1404B, and the rate table n−1, 1404-N-1, has a higher priority rank than the rate table n, 1404N). In the scheduler 1400, the time-out signal from the timer 418 of the rate table 404 is first chocked (612). When there is no time-out signal, it is checked whether the transmit request register 1406 is set by the MPU 100 (608). If there is any cell transmit request, the transmit cell DMAC 140 is started (610). When there is a time-out signal, the presence or absence of the time-out signal is successively checked in the order from the rate table 1 (602, 604). If there is any cell transmit request, the transmit cell DMAC 140 is started (610). After the transmit cell DMAC 140 is started for a rate table, it is checked whether the transmit request register 1406 is set by the MPU 100 (608). If there is any cell transmit request, the transmit cell DMAC 140 is started (610). The cell transmit based on the time-out signal from the timer 418 of the rate table 1404 and the cell transmit based on the setting of the transmit request register 1406 by the MPU 100 are alternately performed. By repeating the above processing, the scheduling processing which supports the priority rank can be performed.

Figure 35:
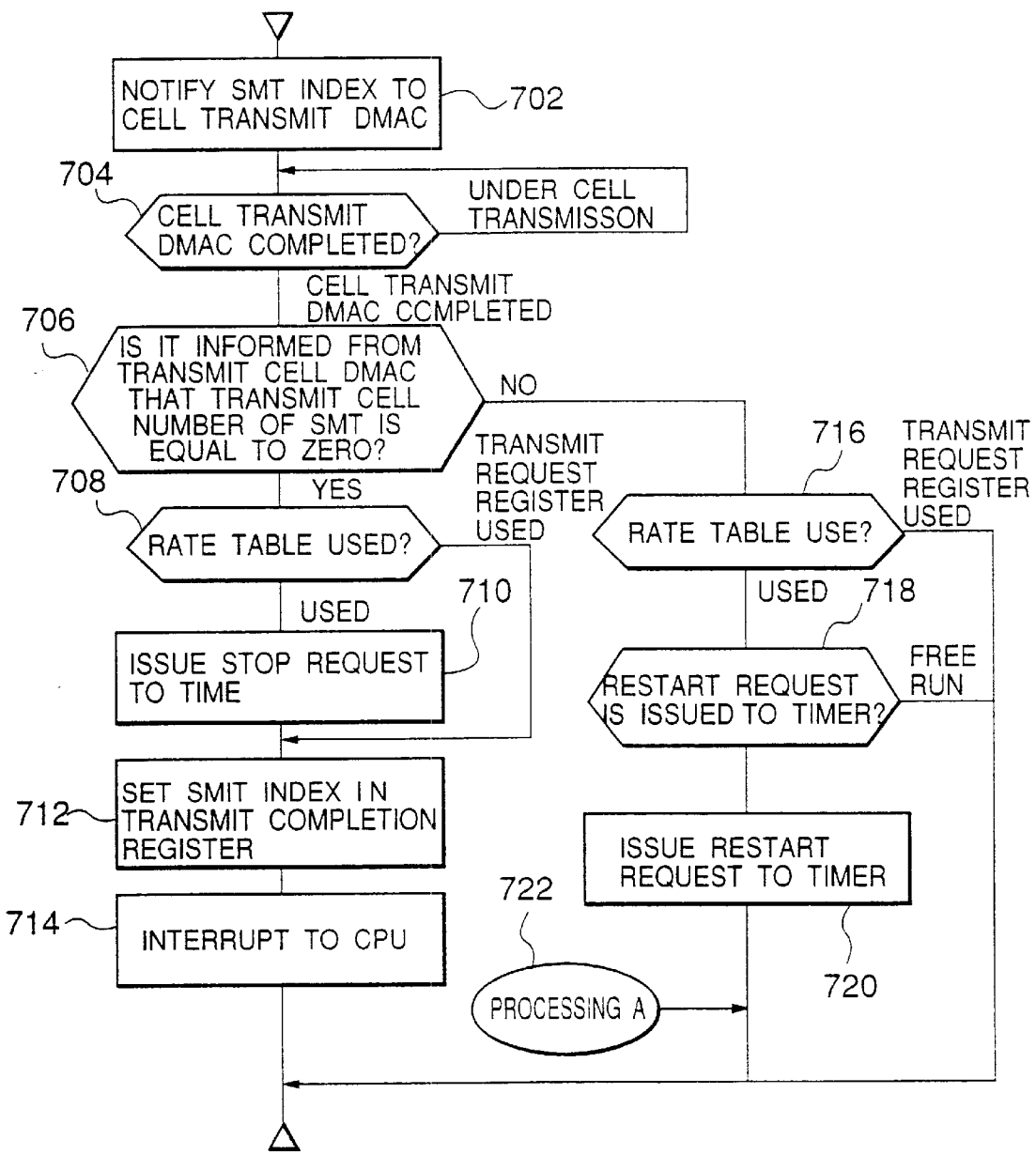
FIG. 35 is a flowchart showing a cell transmit DMAC start processing in the scheduler.

FIG. 35 is a flowchart showing the cell transmit DMAC start processing of the scheduler 1400.

The scheduler 1400 supplies the SMT index to the transmit cell DMAC 140 to start the transmit cell DMAC 140 (702), and then waits until the transmission of one cell is completed (704). When receiving from the transmit cell DMAC 140 a signal indicating that the cell transmission is completed and a signal representing that the transmit cell number of SMT is reduced to "0", a stop request is issued to the timer (706, 708, 710). An interrupt signal is issued to load the SMT index to a transmit completion register 1408 (712) and inform the MPU 100 of it (714). When only the signal representing the cell transmit completion is received from the transmit cell DMAC 140, a re-start request is issued to the timer (716, 718, 720).

Figure 36:
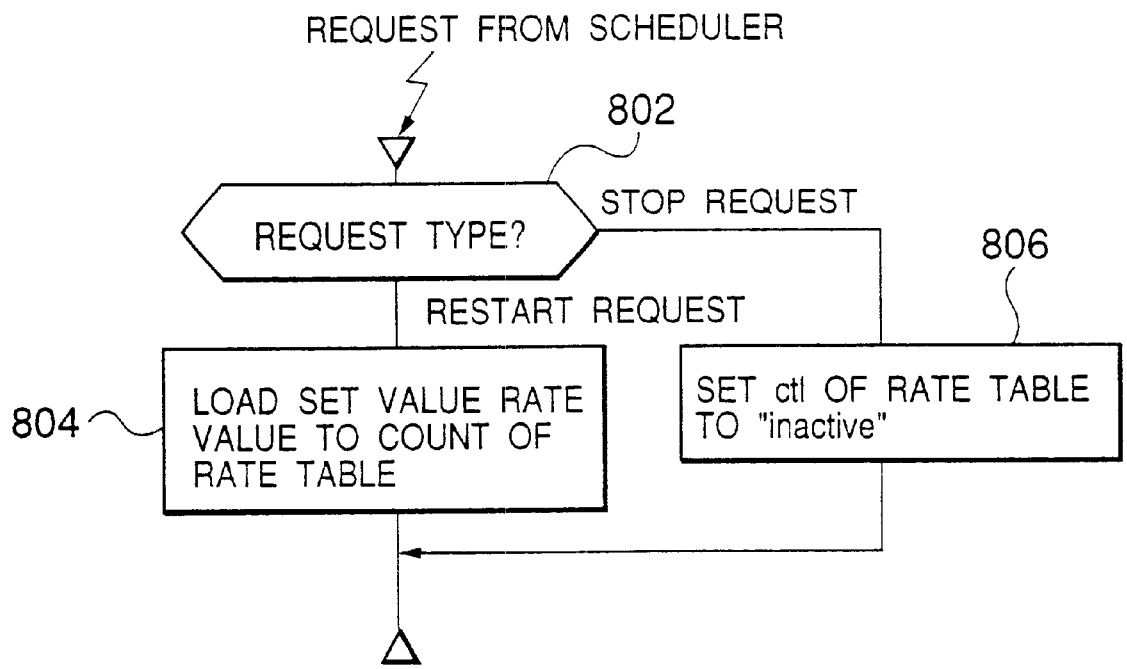
FIG. 36 is a flowchart showing a cell transmit completion processing in the timer.

FIG. 36 is a flowchart showing the cell transmit completion processing of the timer 418.

Upon receiving the request from the scheduler 1400, the timer 1418 restores from its stop state according with the type of the request. If the request type is the re-start request, the set value of the rate value register 1414 of the rate table 1404 is loaded to the count register 1416 (804). If the request type is the stop request, the ctl register 1410 of the rate table 1404 is set to be "inactive" (806).

Figure 37:
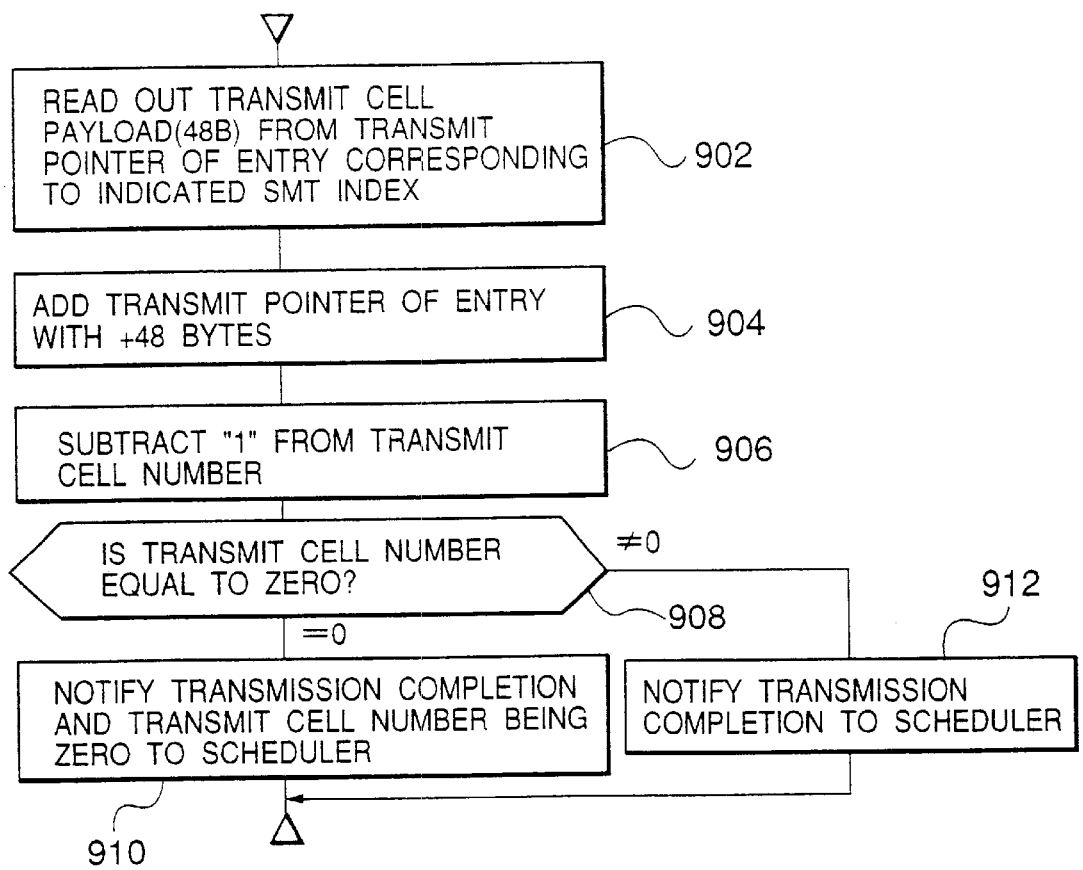
FIG. 37 is a flowchart showing cell transmit processing in the cell transmit DMAC.

FIG. 37 is a flowchart showing the processing of the transmit cell DMAC 140 which is started by the scheduler 1400. The transmit cell DMAC 140 reads out 48 bytes in accordance with the transmit pointer 30308 in the entry 30310 of the SMT 30300 which is indicated by the SMT index indicated by the scheduler 1400, adds a cell header 30304 to the front side of the read-out data to form a cell, and then performs DMA-transfer of the cell to the cell transmit/receive control unit 70 (902). "48" are added to the transmit pointer 30308 in the entry 30310 (904), and "1" is subtracted from the transmit cell number 30306 (906). The value of the transmit cell number 30306 is checked (908). It the value is equal to zero, it is informed to the scheduler 1400 that the transmission 13 completed and the transmit cell number is equal to 0. If the value is not equal to 0, only the transmit completion is informed to the scheduler 1400 (912).

Next, the processing flow of the firmware which is executed by the MPU 100 when the function of the cell transmit controller 148 is used will be described with reference to FIGS. 38 to 40.

Figure 38:
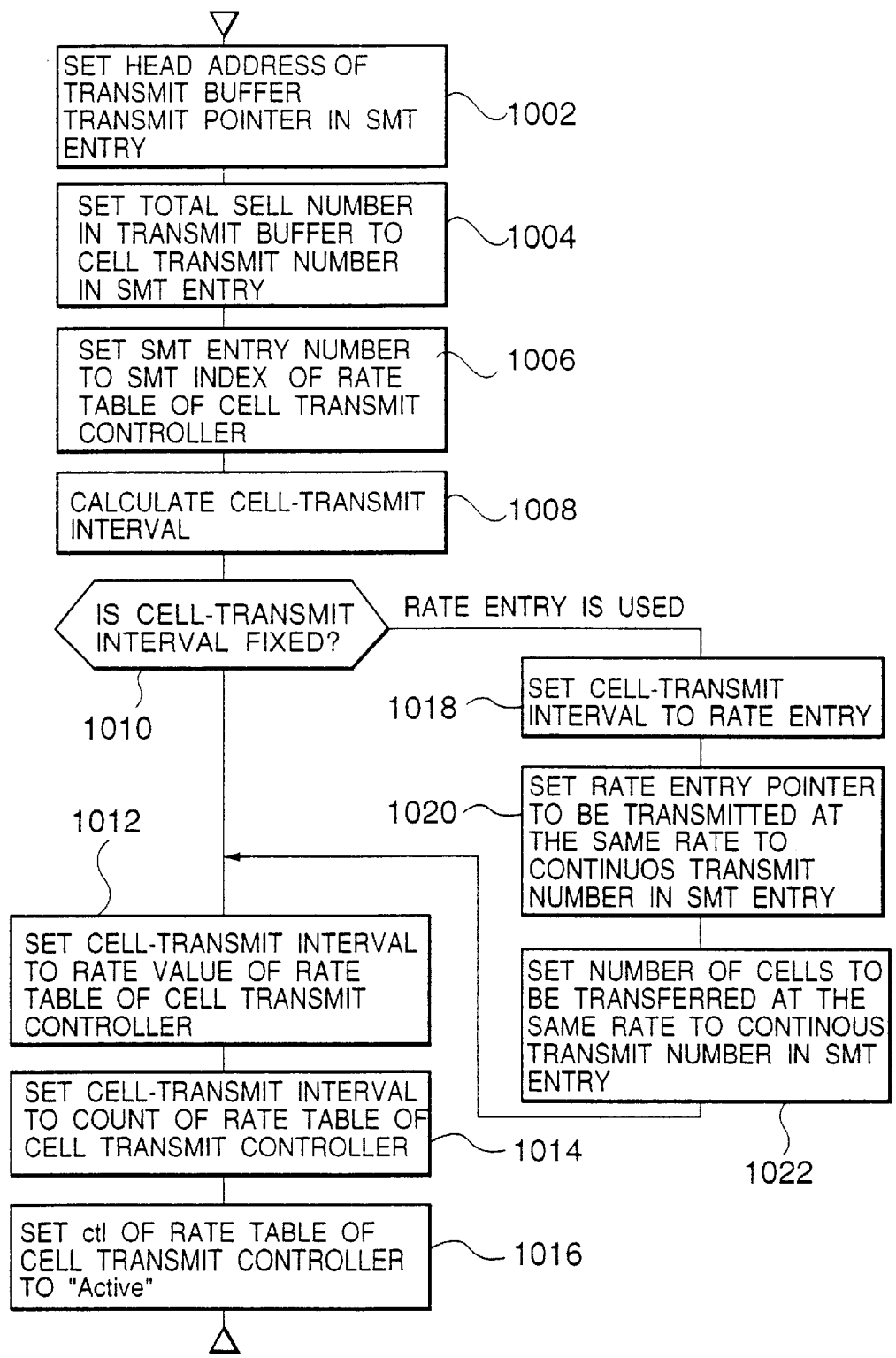
FIG. 38 is a flowchart showing the processing when a rate table is used in a firmware which is executed by an MPU.

FIG. 38 is a flowchart of the firmware when the cell transmit control for the VC is performed by using the rate table 1404. In this processing, the head address of the transmit buffer 30314 is set in the transmit pointer 30308 of the entry 30310 corresponding to the VC in the SMT 30300 on the buffer memory 40 (1002), and the total transmit cell number in the transmit buffer 30314 is set as the transmit cell number 30306 (1004). The position information of the entry 30310 of the SMT 30300 is set in the SMT index register 1412 of the rate table 1404 (1006). The cell-transmit interval is calculated (1008), and the calculation value is set in the rate value register 1414 and the count register 1416 of the rate table 1404 (1010, 1012, 1014). Thereafter, "Active" is set in the ctl register 1410, and the cell transmit control is performed by the timer 1418 (1016).

Figure 39:
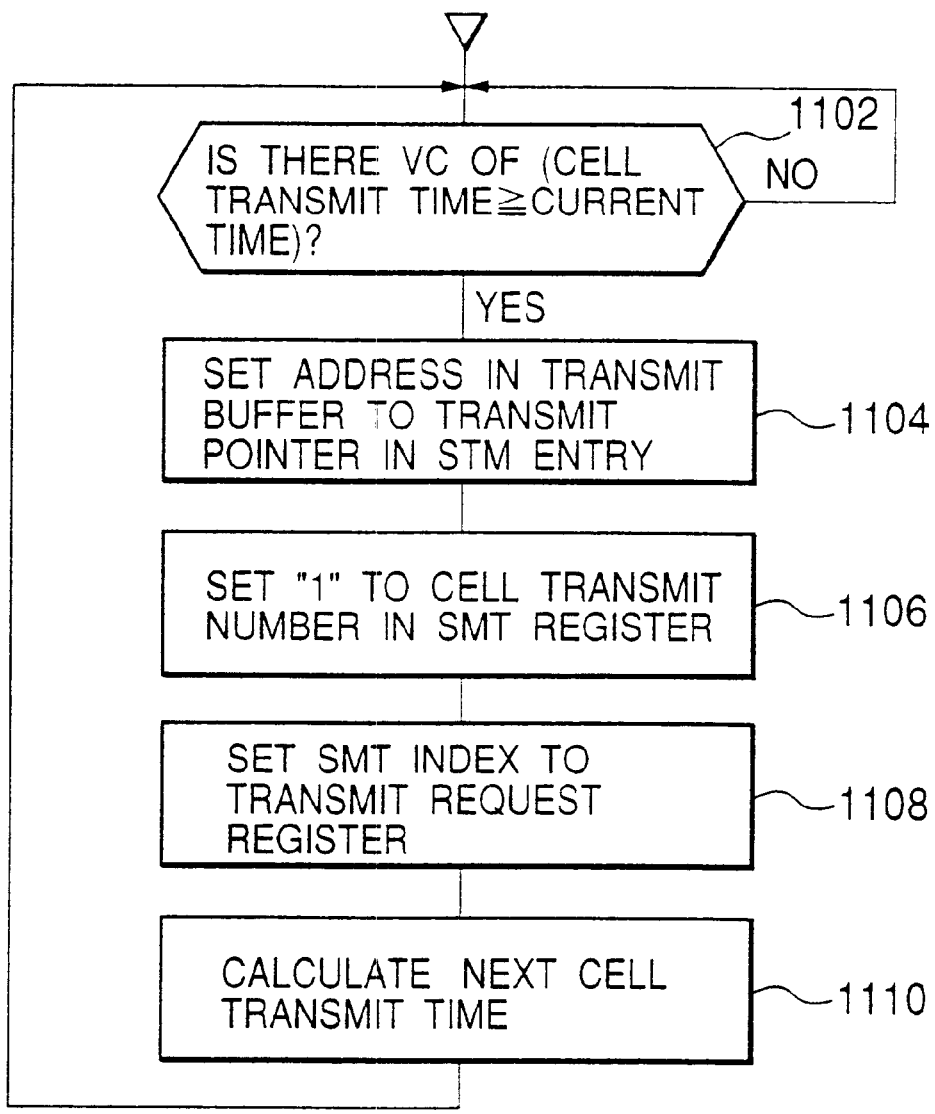
FIG. 39 is a flowchart showing the cell transmit control processing in the firmware which is executed by the MPU.

FIG. 39 is a flowchart when the cell transmit control is performed by the firmware.

In this processing, the time is defined by the firmware, and a next cell transmit time is beforehand calculated on the basis of the cell rate. One-cell transmit processing is performed on a VC in which a time to send the next cell is beyond the present time (1102). The address of the stored data which is to be transmitted is set in the transmit pointer 30308 of the entry 30310 corresponding to the VC of the SMT 30300 (1104), and "1" is set in the transmit cell number 30306 (1106). The SMT index is set in the transmit request register 1406, and the cell transmit DMAC start request is output to the scheduler 1400 of the cell transmit controller 148 (1108). Thereafter, if any cell to be transmitted exists, a next cell transmit time is calculated on the basis of the cell rate (1110).

Figure 40:
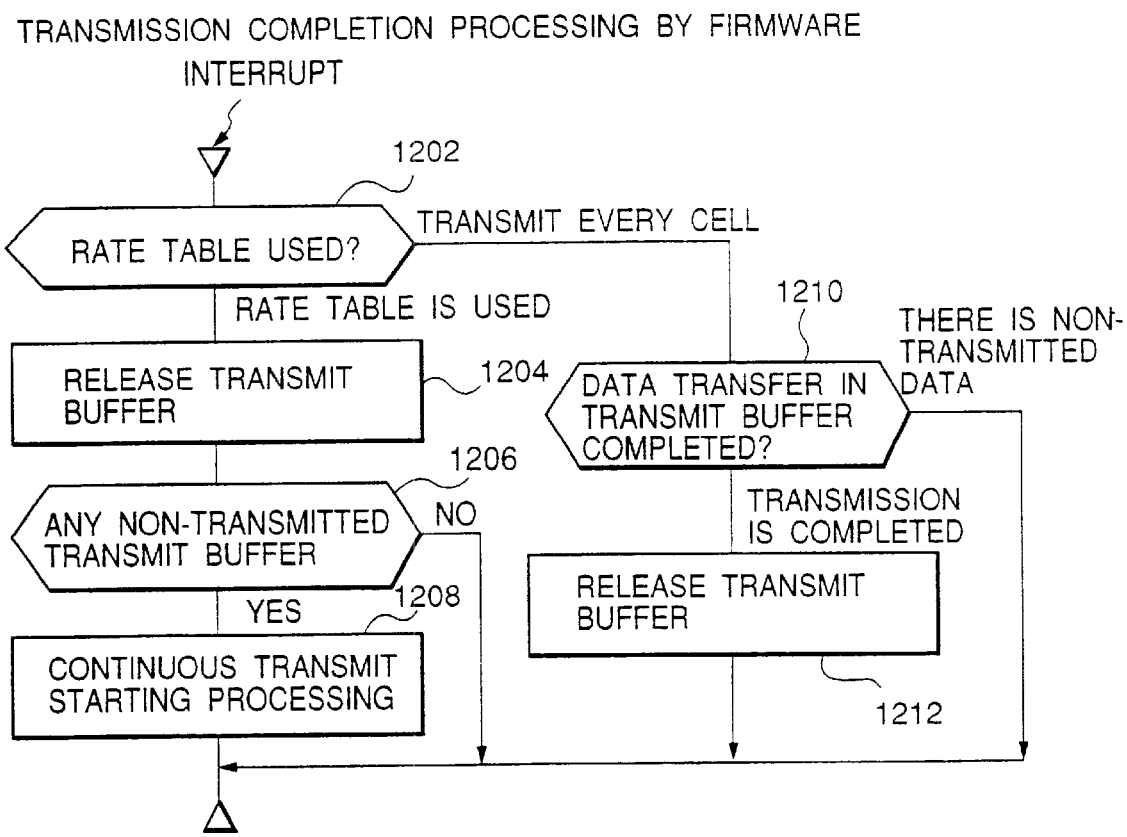
FIG. 40 is a flowchart showing the transmit completion processing in the firmware which is executed by the MPU.

FIG. 40 is a flowchart of the firmware when an interruption is made by the cell transmit controller 148.

In this processing, when the cell transmit control is performed by using the rate table 1404, the transmit buffer 30314 is released to be set to a free state (1202, 1204), Further, if there is any transmit buffer which has not yet performed the transmission operation, the call transmission is performed on the transmit buffer by using the rate table 1404 (1206). If the rate table 1404 is not used (when the cell transmission is requested from the transmit request register according to FIG. 38), if all the data in the transmit buffer 30314 have been transmitted, the transmit buffer is released (1202, 1208, 1210). The next cell transmission is performed according to the flow of FIG. 39.

As described in this embodiment, according to the ATM controller 8 in which the cell transmit controller 148 having the function as described is mounted, the traffic shaping can be performed on both the call transmission of VCs which is managed by the cell transmit controller 148 and the cell transmit based on the firmware which is executed by the MPU. Therefore, the cell transmit control for VCs having high cell rate is performed by using the cell transmit control function of the cell transmit controller 148, and the cell transmit control for VCs having low cell rate is performed by using the firmware. Further, because the firmware can request the cell transmission, a number of simultaneous transmissions whose the number exceeds the number of VCs corresponding the number of the rate tables owned by the cell transmit controller 148 can be performed, so that the number of VCs which can be transmitted simultaneously does not limited by hardware.

FIFTH EMBODIMENT

A fifth embodiment according to the present invention will be described with reference to FIGS. 32, 35 and 41.

FIG. 41 is a diagram showing a control system of the cell-transmit interval in the call transmit controller 148. The control system of the timer of the cell transmit controller shown in the forth embodiment corresponds to a restart system of FIG. 41. In this system, upon receiving the restart request from the scheduler 1400 which receives a cell transmit completion notification from the transmit call DMAC 140, the timer 1418 starts again a counting operation of the cell-transmit interval. When the time-out signals to the scheduler 1400 are simultaneously issued from two rate tables 1404 (the rate table 1, 1404A and the rate table 2, 1404B in FIG. 41), in response to the transmit request of the rate table 2, 1404B, the cell is transmitted by the scheduling function of the scheduler 1400 as shown in FIG. 41, and then the cell of the rate table 1, 1404A is transmitted. Therefore, when two time-out signals occur at the same time, the interval at which the cell is actually transmitted is delayed by Δt than the cell-transmit interval registered in the rate table 1, 1404A. When the transmission rate of the line is equal to 155 Mbps, Δt is equal to about 2.7 μsec.

The restart system in which after a delay occurs, a counting operation of a cell-transmit interval is newly started from the occurrence time of the delay, is conformed with the Virtual Scheduling Algorithm defined in UNI (Union Network Interface). In the case of transmission of continuous data such as audio, moving pictures or the like, some degree of variation is permitted to the cell-transmit interval, however, a periodical transmission of cell at a fixed interval from the start time of the transmission is required at all times as shown in a free run system of FIG. 41. The free run system which achieves the fixed cell-transmit interval shown in FIG. 41 will be described with reference to the processing flow of the timer 1418 and the scheduler 1400 of FIGS. 32 and 35.

FIG. 32 is a flowchart showing the count processing of the timer 1418. Upon receiving the signal from the clock 1402, the timer 1418 starts the processing as described in the fourth embodiment (502, 504, 506, 508). After the time-out signal is issued to the scheduler 1400 (510), when a VC using the rate table 404 requests the free run system, the set value of the rate value register 414 is loaded to the count register 1416 without stopping the timer, and subsequently the count processing is performed (512, 51B).

FIG. 35 is a flowchart showing the start processing of the cell transmit DMAC in the scheduler 1400. When the signal indicating the cell transmit completion from the transmit cell DMAC 140 is received (the transmit cell number of the SMT 30300 is not equal to "0"), in the case of the free run system, the timer has already started the count operation of a next cell transmit time, and thus it is unnecessary to issue the restart request to the timer.

As shown in this embodiment, the time management of the cell-transmit interval based on the free run system is performed to perform the periodical transmission on the data such as audio data, moving picture data or the like.

SIXTH EMBODIMENT

Next, a sixth embodiment according to the present invention will be described with reference to FIGS. 42 to 45.

Figure 42:
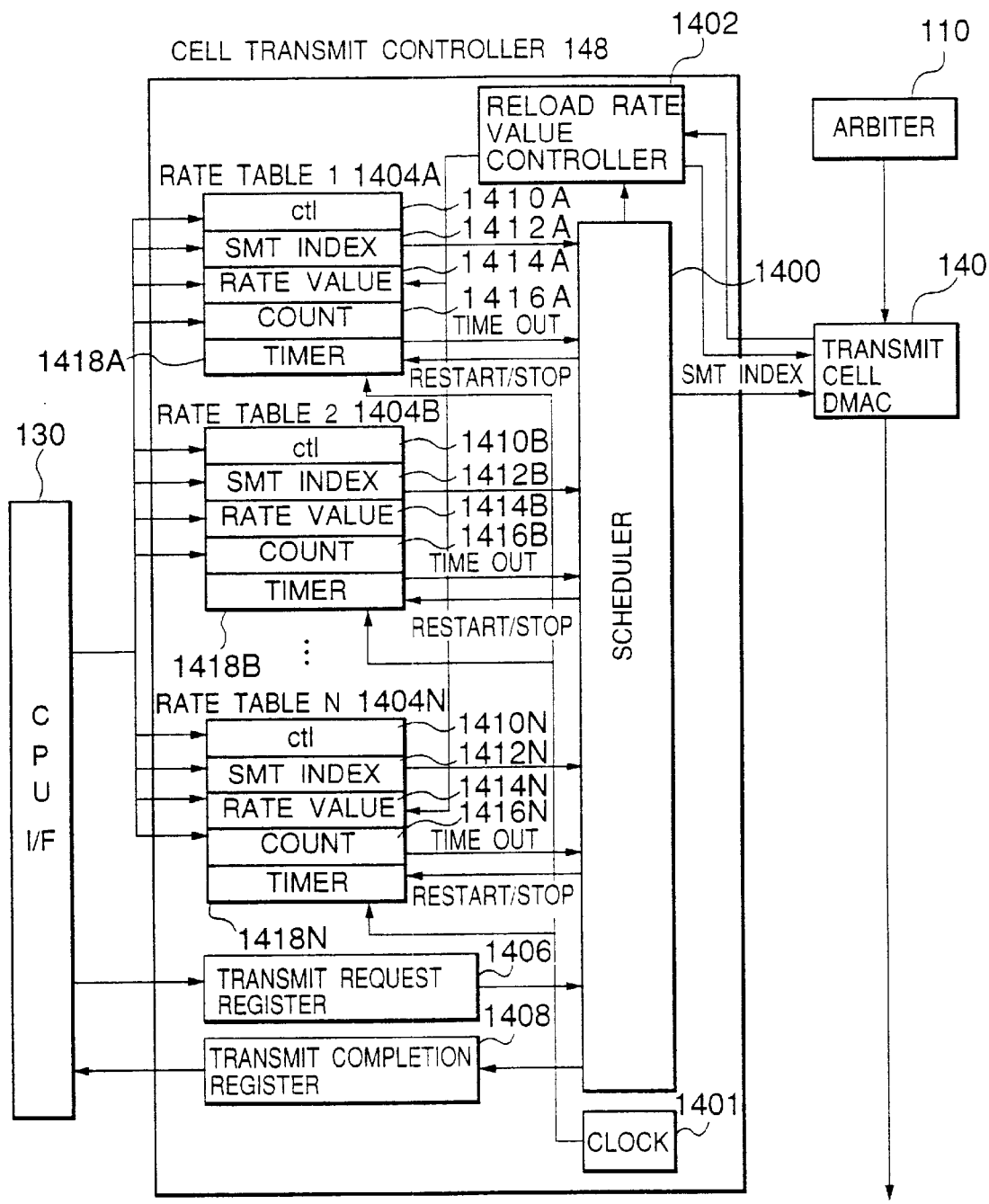
FIG. 42 is a diagram showing the construction of the cell transmit controller when the cell rate is altered every transmission of plural cells.

FIG. 42 is a diagram showing the construction of the cell transmit controller of this embodiment. The cell transmit controller 148 comprises plural rate tables 1404, a scheduler 1400, a transmit request register 1406, a transmit completion register 1408, a clock 1402, and a reload rate-value controller 1401 for loading a new cell-transmit interval to the rate value register 414 of the rate table every plural cells.

Figure 43:
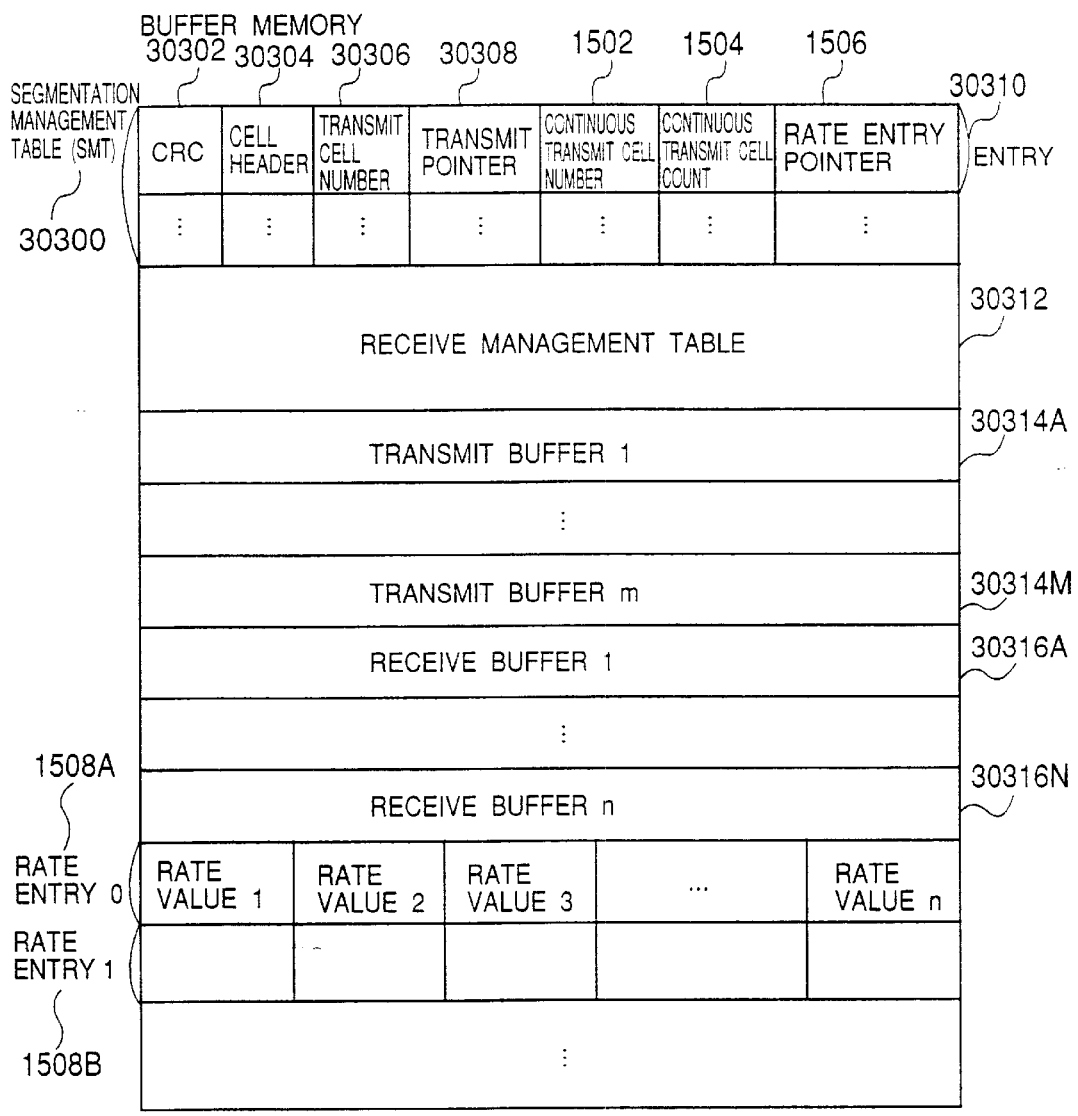
FIG. 43 is a diagram showing an example of the construction of a buffer memory when the cell rate is altered every transmission of plural cells.

FIG. 43 shows the construction of the buffer memory 40 of the present embodiment. The buffer memory 40 comprises a segmentation management table 30300, a receive management table 30312, plural transmit buffers 30314, plural receive buffers 30316, and a rate entry 1508 (1508A, 1508B) in which plural cell-transmit intervals each of which is altered every transmission of plural cells can be set. The rate entry 1508 is prepared on a VC basis, and the pointer information is managed on the basis of the entry 30310 of the SMT 30300 corresponding to the VC. The entry 30310 of the SMT 30300 comprises a CRC result 30302, a cell header 30304, a transmit cell number 30306, a transmission pointer 30308, a continuous transmit cell number 1502 for setting the number of cells every which the cell-transmit interval is altered, a continuous transmit cell counter 1504 which is used as a counter for the transmit cell number of the transmit cell DMAC 140, and a rate-entry pointer 1506 for managing the pointer information of the rate entry 1508.

When the cell transmit control is performed by using the rate table 404, the transmit pointer 30308 of the SMT 30300, the transmit cell number 30306 and the register of the rate table are set by the firmware which is executed by the MPU 100. In addition, when the cell-transmit interval is altered every transmit of plural cells, plural cell-transmit intervals are set in the rate entry 1508, and the head address of the rate entry is set in the rate entry pointer 1506 of the SMT while the number of cells which are transferred at the same cell transmit interval is set in the continuous transmit call number 1504. For example, when the cell-transmit interval is altered every time one cell is transferred, "1" is set to the continuous transmit number 1502 of the SMT 30300.

Figure 44:
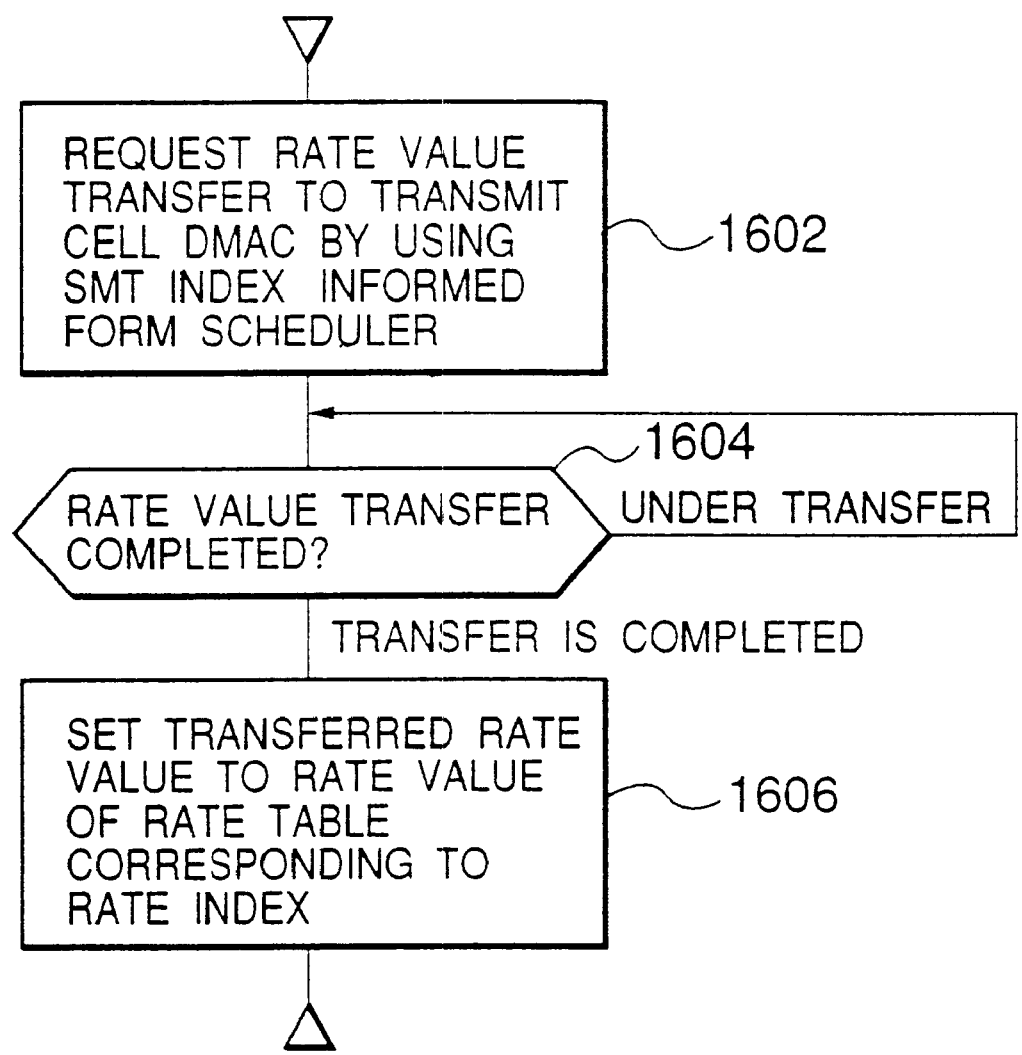
FIG. 44 is a flowchart showing the processing of a rate setting processor.

FIG. 44 is a flowchart showing the processing of the rate setting processor 1401 of the cell transmit controller 148.

In the scheduler 1400, the rate setting processor 1401 is started in the start processing of the transmit DMAC and delivers the STM index to the rate setting processor 1401. This processing is performed by the part of the processing A 722 of FIG. 35. In order to transmit the rate value in the rate entry 1508 on the buffer memory 40, upon receiving the SMT index, the rate setting processor 1401 delivers the SMT index to start the transmit cell DMAC 140 (1602). Upon transfer of the rate value, the rate setting processor 1401 loads the rate value into the rate value register 1414 of the rate table 1404 corresponding to the SMT index (1604, 1606).

Figure 45:
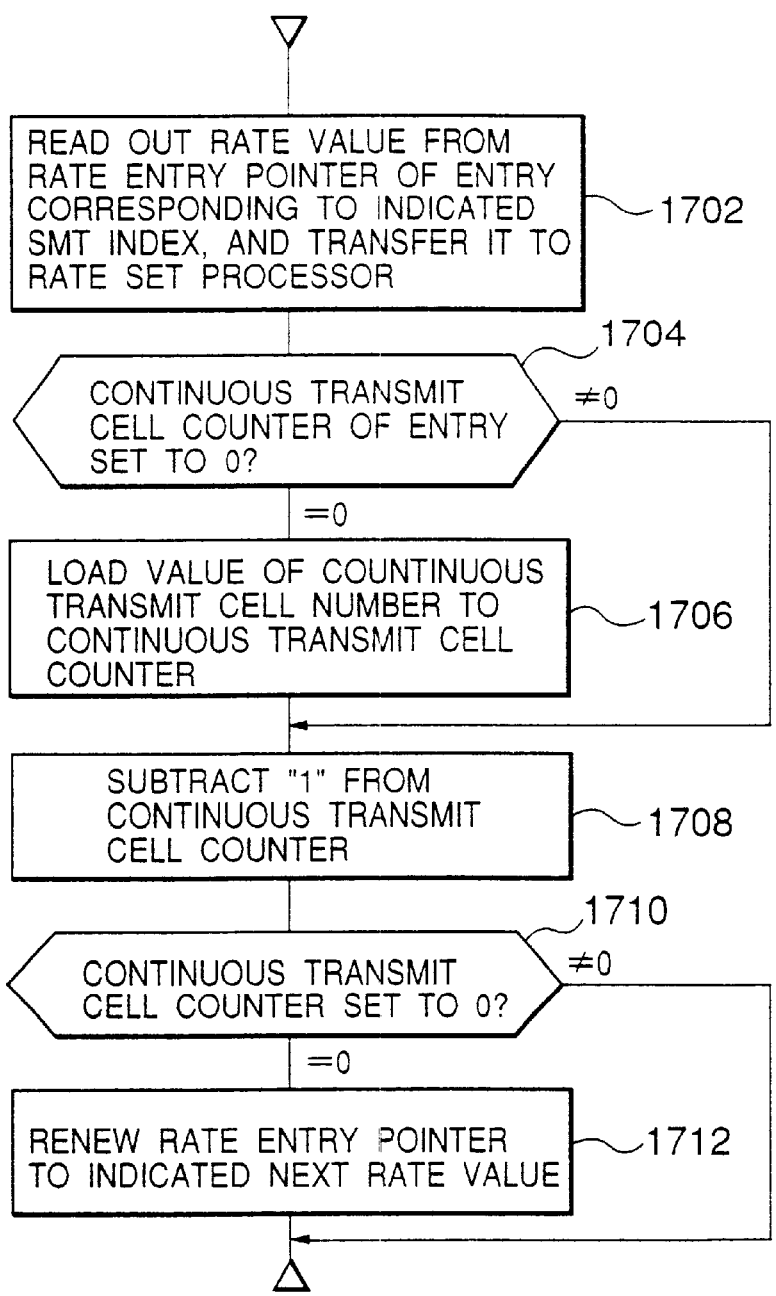
FIG. 45 is a flowchart showing a rate value transfer processing in the cell transmit DMAC.

FIG. 45 is a flowchart showing the rate value transfer processing by the transmit cell DMAC 140 which is started by the rate setting processor 1401. The rate value is read out from the rate entry pointer 1506 in the entry 30310 of the SMT 30300 which is indicated by the SMT index indicated from the rate setting processor 1401 to perform DMA-transfer of the read-out rate value to the rate setting processor 1401 (1702). It is checked whether the continuous transmit cell counter 1504 is set to "0" (1704). Only if it is set to "0", the set value of the continuous transmit cell number 1502 is loaded to the continuous transmit cell number counter 1504 (1706). "1" is subtracted from the continuous transmit cell counter 1504 (1708), and the rate entry pointer 1506 is renewed to indicate a next rate value only when the continuous transmit cell number counter 1504 is set to "0" (1710, 1712).

As described in this embodiment, the cell-transmit interval can be altered in the cell transmit controller every time plural cells are transmitted, so that the cell rate can be altered even during transfer of CPCS-PDU, thereby achieving a flexible traffic control.

SEVENTH EMBODIMENT

A seventh embodiment according to the present invention will be described with reference to FIGS. 46 to 48.

FIG. 46 is a diagram showing the construction of a traffic management table 1802 which is prepared on the RAM 30 to perform transmit traffic control on plural VCs in the firmware executed by the MPU 100. The traffic management table 1802 comprises an area 1804 for indicating a service category such as CBR, VBR or the like, every VC, an area 1808 for indicating a current cell rate, a continuous transmit cell number counter 1808, and a traffic management parameter group 1810 such as PCR (peak cell rate), SCR (Sustainable cell rate), ACR (Available cell rate), MCR (Minimum cell rate), burst tolerance, etc.

For example, when CBR is selected as a service category, for example, PCR is defined as a traffic management parameter 1810, and PCR is set as a current rate 1806. When VBR is selected as a service category, for example, PCR, SCR, burst tolerance are defined as the traffic management parameters 1810. The continuous transmit cell number 1808 is used to monitor the burst tolerance. Any of PCR and SCR is set as the current rate 1806. When ABR is selected, for example, MCR, PCR, ACR, etc. are defined as the traffic management parameters 1810. ACR is defined according to ABR, and MCR and PCR are defined so as to reflect the congestion state between MCR and PCR, and ACR at this time is set as the current rate 1806.

The traffic control which is performed by the firmware executed by the MPU 100 will be described with reference to FIGS. 47 and 48.

Figure 47:
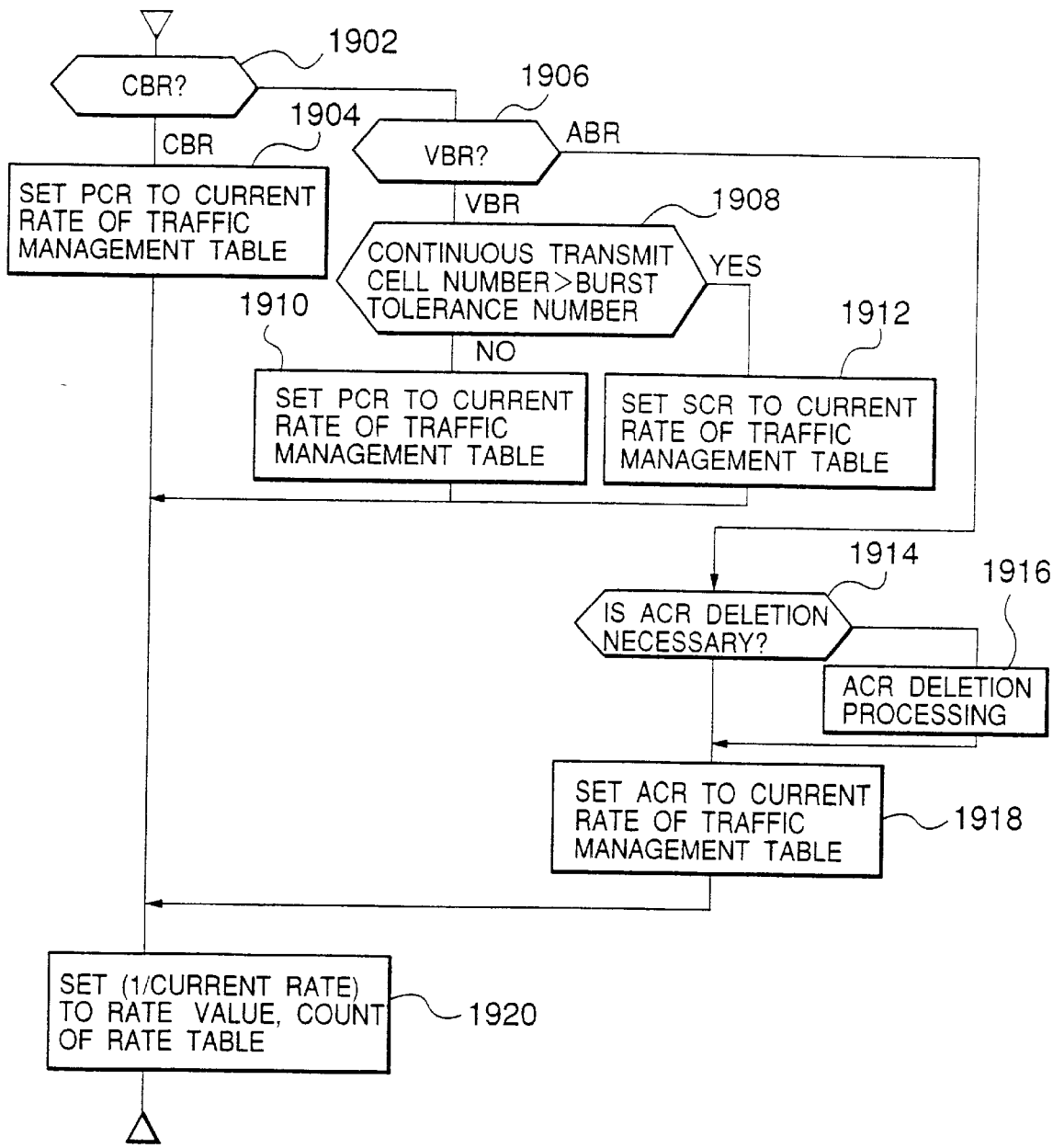
FIG. 47 is a flowchart showing the cell-transmit interval defining processing corresponding to a service category in the firmware executed in the MPU.

FIG. 47 is a flowchart showing the cell-transmit interval defining processing corresponding to the service category.

Upon receiving a transmit request of CPCS-PDU, the cell rate corresponding to the service category of the VC is selected as follows to calculate from the selected cell rate a cell-transmit interval which is set in the rate value register 414 and the count register 416 in the rate table 404 of the cell transmit controller 148 (1920). When the service category of the VC is CBR (1902), PCR is set to the current rate 1806 of the transmit traffic management table 1802 (1904). When the service category is VBR (1906), SCR is set to the current rate 1806 if the continuous transmit cell number 1808 is larger than the burst number (1908, 1912), and PCR is set to the current rate 1806 if not so (1910). When the service category is ABR, it is first checked whether the ARC has been deleted (1914). If occasion demands, ACR is deleted (1916), and ACR is set to the current rate 1806 (1918).

FIG. 48 is a flowchart showing the whole rate monitoring processing which is performed every time the ATM controller 8 receives the transmit request. In order to investigate whether the transmit of the current cell is performed on a VC which receives the transfer request, it is checked whether the current rate 1806 of the traffic management table 1802 is set to "0" (2002). If the transmission is carried out, the current cell rate is registered to the current rate 1806 of the traffic management table 1802. If no transmission is carried out, the cell rate is set to the current rate 1806 of the traffic management table 1802 (2004) according to the table in FIG. 46, and it is checked whether the total of the current rate 1806 of the traffic management table 1802 is below the transmission bandwidth (2006). If the transmission rate of the capable is equal to 15 Mbps, the transmission bandwidth is equal to about 365 K cells/second. When the total of the current rate is over the transmission bandwidth, the current rate is reset to all the VCs under transmission to guarantee the cell rate. When CBR is selected the current rate is not changed (2008). When VBR is selected, the current rate is set to SCR (2010, 2012). When ABR is selected, the current rate is set to MCR, and MCR is set to ACR of the traffic management parameter 1810 of the traffic management table 1802 (2014).

As shown in this embodiment, in the firmware which is executed by the MPU, the processing corresponding to various service categories can be performed by using the cell transmit controller 148. In addition, by controlling the total cell rate, the cell rate defined in correspondence to the VC can be guaranteed.

According to the present invention, the ATM controller which is installed into a terminal connected to ATM-LAN, and which has the SAR function of the AAL layer and the cell multiplexing/segmentation function of the ATM layer, has a cell transmit/receive function, means for managing the cell-transmit interval in accordance with the VC, means for scheduling a cell transmit request, a cell transmit controller serving as a hardware circuit having means for transmitting cells in response to a cell transmit request and an MPU, whereby the traffic control corresponding to the service category and cell rate declared every VC can be performed.

Further, the traffic shaping function which is matched to the cell rate which is defined every VC can be performed on plural VCs by both the cell transmit controller and the firmware which is executed by the MPU.

What is claimed is:

1. An ATM communication control device coupled to a terminal having a terminal memory and an ATM network, comprising:

a buffer memory;

an ATM connection management unit for registering an address of said terminal memory or said buffer memory as a reassemble buffer type to a reassemble management table for an ATM connection according to a traffic speed which is required for said ATM connection, said ATM connection being set upon receipt of a request for setting a connection from said terminal;

a cell identifying unit identifying an ATM connection by a cell header of the received cell when a cell is received from said ATM network; and a cell receiving controller for transferring (forwarding) said received cell to said registered address if the address of the reassembled buffer is already registered in the reassemble management table for said identified ATM connection and, if the address of the reassemble buffer is not registered, for registering an address in said terminal memory or an address in said buffer memory as an address of the reassemble buffer in accordance with the reassemble buffer type registered in the reassemble management table for said identified ATM connection, and for transferring (forwarding) the received cell to said registered address.

2. An ATM transmission controller according to claim 1, wherein said ATM connection management unit registers a transmission buffer type indicating whether said terminal memory or said buffer memory is to be used as a buffer for transmitting a cell to said terminal to a segment management table, when a transmission request is received from said terminal, on the ATM connection set upon receipt of a connection setting request from said terminal; and further comprising:

a cell transmit controller for identifying a transmission buffer type of said segment management table, at the timing of cell transmission, for reading out a cell of data from said terminal memory when said transmission buffer type indicates said terminal memory, and, alternatively, reading out a cell of data from said buffer memory, when said transmission buffer type indicates said buffer memory, for obtaining a cell header corresponding to the read-out data from said segment management table to add the cell header thus-obtained to said read-out data, and for transmitting the same to an ATM network.

3. An ATM connection control device according to claim 2, wherein said ATM connection management unit registers with the segment management table:

a transmission rate and a transmission cell header at the time of setting an ATM connection; and a buffer address used at the time of said transmission and said transmission buffer type, upon receipt of a transmission request from said terminal.

4. An ATM communication control device coupled to a terminal having a terminal memory and an ATM network, comprising:

a buffer memory;

an ATM connection management unit for registering a transmission buffer type indicating whether said terminal memory or said buffer memory is to be used as a buffer for transmitting a cell to said terminal to a segment management table, when a transmission request is received from said terminal, on the ATM connection set upon receipt of a connection setting request from said terminal; and a cell transmit controller for identifying a transmission buffer type of said segment management table, at the timing of cell transmission, for reading out a cell of data from said terminal memory when said transmission buffer type indicates said terminal memory, and, alternatively, reading out a cell of data from said buffer memory, when said transmission buffer type indicates said buffer memory, for obtaining a cell header corresponding to the read-out data from said segment management table to add the cell header thus-obtained to said read-out data, and for transmitting the same to an ATM network.

5. An ATM connection control device according to claim 4, wherein said ATM connection management unit registers with the segment management table:

a transmission rate and a transmission cell header at the time of setting an ATM connection; and a buffer address used at the time of said transmission and said transmission buffer type, upon receipt of a transmission request from said terminal.

* * * * *